US007110669B2

(12) United States Patent
Ofek et al.

(10) Patent No.: US 7,110,669 B2
(45) Date of Patent: *Sep. 19, 2006

(54) TIME DRIVEN WAVELENGTH CONVERSION-BASED SWITCHING WITH COMMON TIME REFERENCE

(75) Inventors: Yoram Ofek, Riverdale, NY (US); Mario Baldi, Cuneo (IT)

(73) Assignee: Synchrodyne Networks, Inc., Riverdale, NY (US)

( * ) Notice: Subject to any disclaimer, the term of this patent is extended or adjusted under 35 U.S.C. 154(b) by 721 days.

This patent is subject to a terminal disclaimer.

(21) Appl. No.: 09/960,668

(22) Filed: Sep. 21, 2001

(65) Prior Publication Data

US 2002/0021467 A1 Feb. 21, 2002

Related U.S. Application Data

(63) Continuation-in-part of application No. 09/120,700, filed on Jul. 22, 1998.

(60) Provisional application No. 60/235,765, filed on Sep. 27, 2000, provisional application No. 60/261,133, filed on Jan. 10, 2001.

(51) Int. Cl.
*H04J 14/02* (2006.01)
(52) U.S. Cl. .......................................... 398/47; 398/49
(58) Field of Classification Search .............. 398/47–50
See application file for complete search history.

(56) References Cited

U.S. PATENT DOCUMENTS

| 5,005,166 | A | * | 4/1991 | Suzuki et al. | 398/47 |
| 5,303,077 | A | * | 4/1994 | Bottle et al. | 398/46 |
| 6,674,754 | B1 | * | 1/2004 | Ofek | 370/389 |
| 2002/0063927 | A1 | * | 5/2002 | Ofek et al. | 359/128 |
| 2004/0156427 | A1 | * | 8/2004 | Ofek | 375/150 |

OTHER PUBLICATIONS

Harrington, "Synchronization Techniques for Various Switching Network Topologies" IEEE Transactions on Communications, vol. COM-26, No. 6, Jun.-1978, pp. 925-932.*

* cited by examiner

*Primary Examiner*—Leslie Pascal
(74) *Attorney, Agent, or Firm*—Sitrick & Sitrick

(57) ABSTRACT

A time frame switching method and system of data units that utilize a global common time reference, which is divided into a plurality of contiguous periodic time frames. The system is designed to operate with high-speed wavelength division multiplexing (WDM) links, i.e., with multiple lambdas. The plurality of data units that are contained in each of the time frames are forwarded in a pipelined manner through the network switches, wherein at every stage of the pipeline is tuned to a new wavelength by using a wavelength converter. Furthermore, the incoming wavelength of a time frame and wavelength determines to which output port the data units in this time frame will be switched, while the new wavelength and time frame determine to which output the data units in this time frame will be switched in the next switch on the route. The outcome of this switching method is called wavelength conversion based fractional lambda switching.

64 Claims, 35 Drawing Sheets

FIG. 5
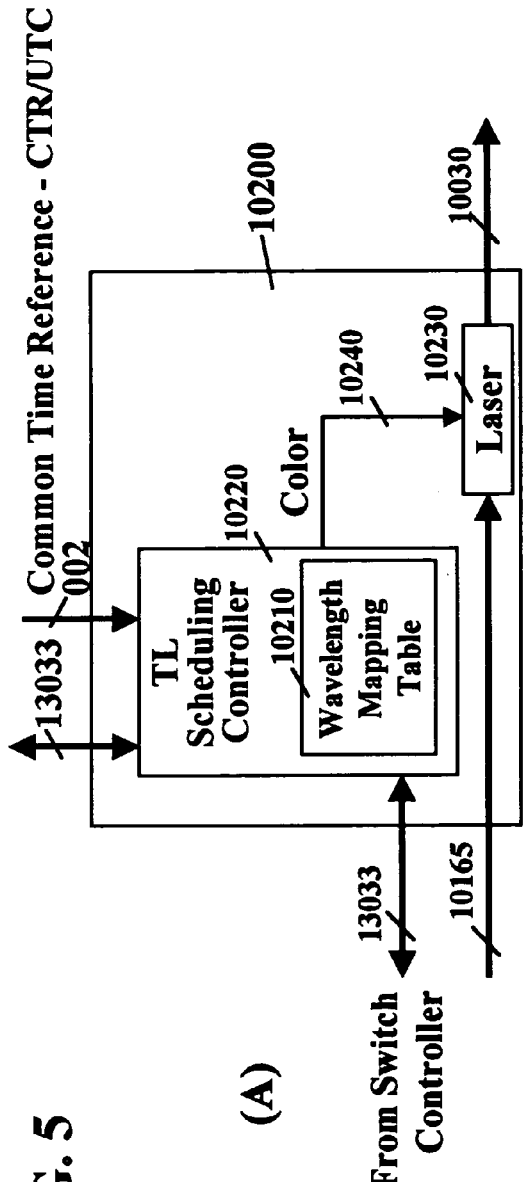
(A)
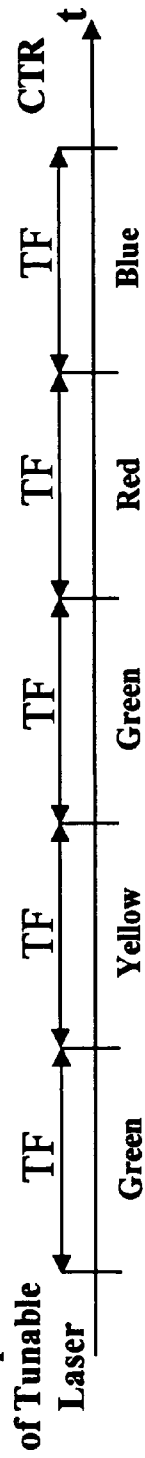
(B) Operation of a Time Driven Tunable Laser
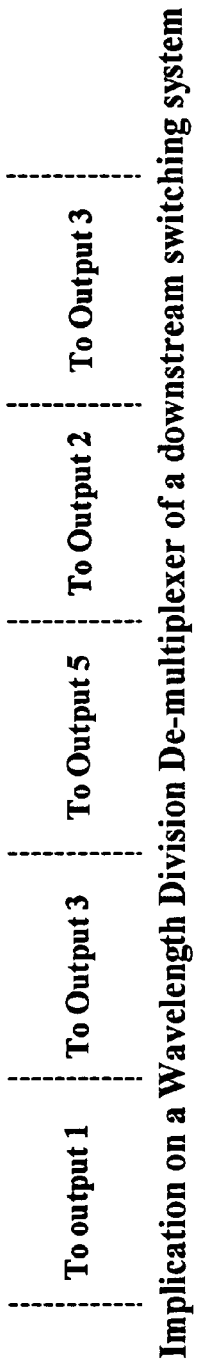
(C) Implication on a Wavelength Division De-multiplexer of a downstream switching system

FIG. 18
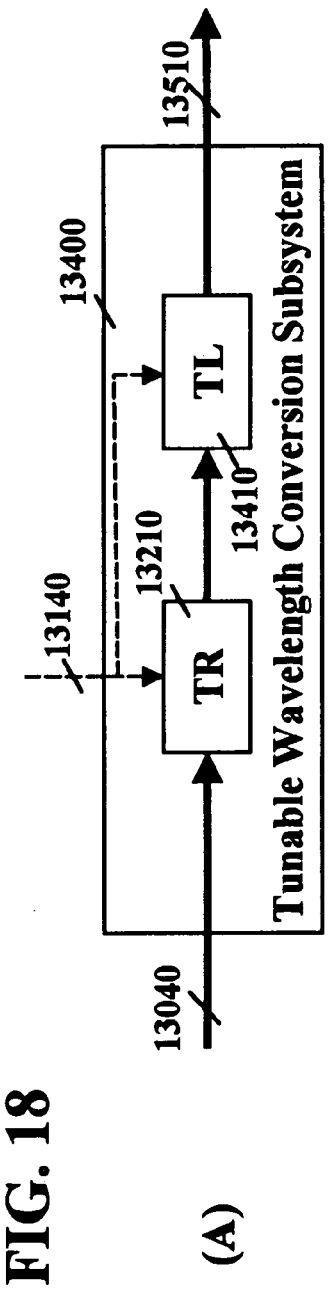
(A)
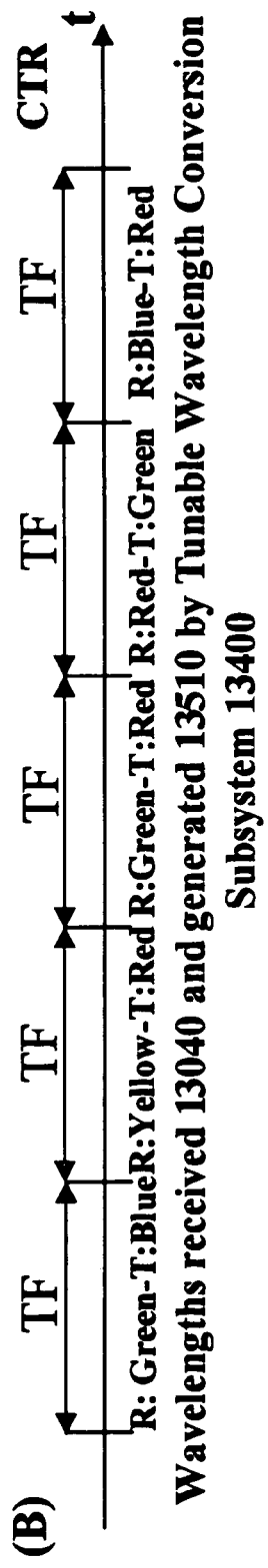
(B)
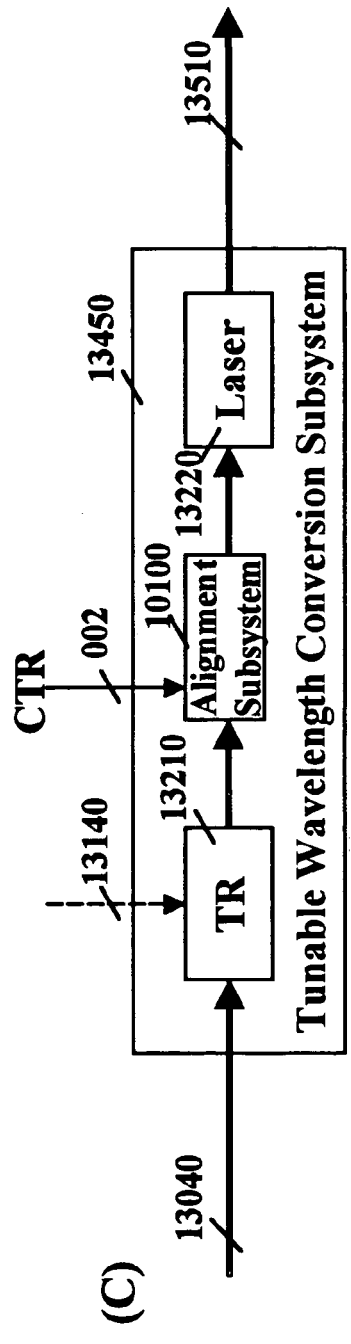
(C)

FIG. 22
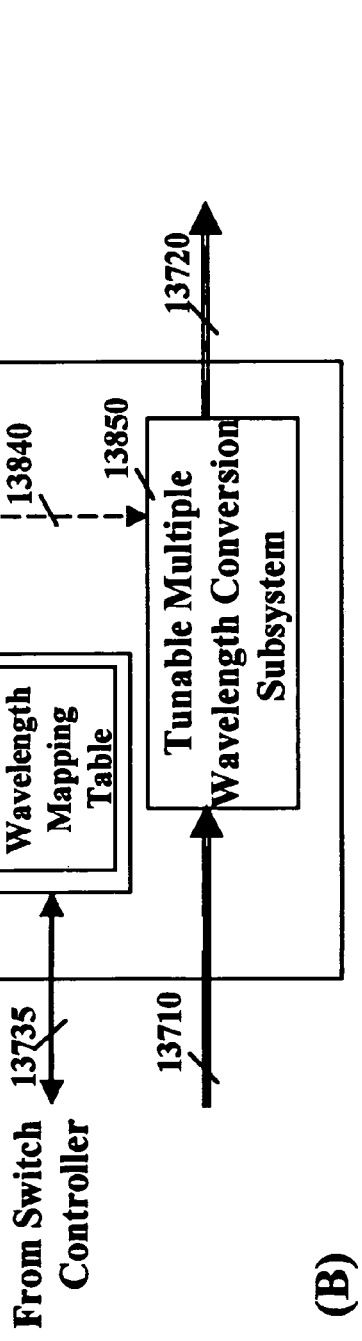
(A)
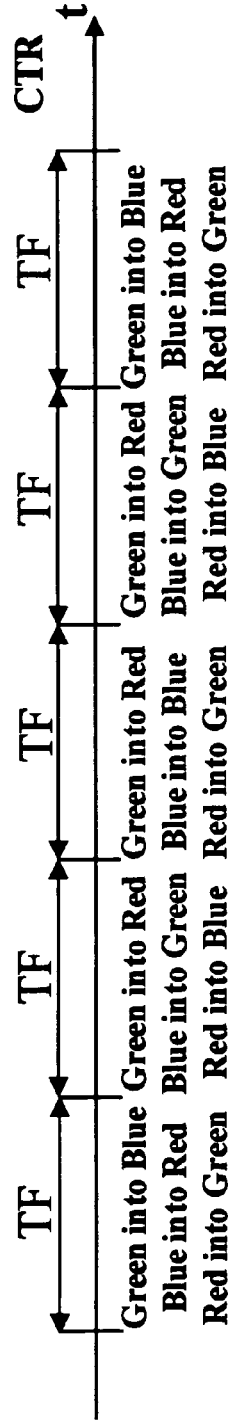
(B) Operation of a Time Driven Tunable Multiple Wavelength Conversion Subsystem 13850

FIG. 31    POSM: Programmable Optical Switching Matrix

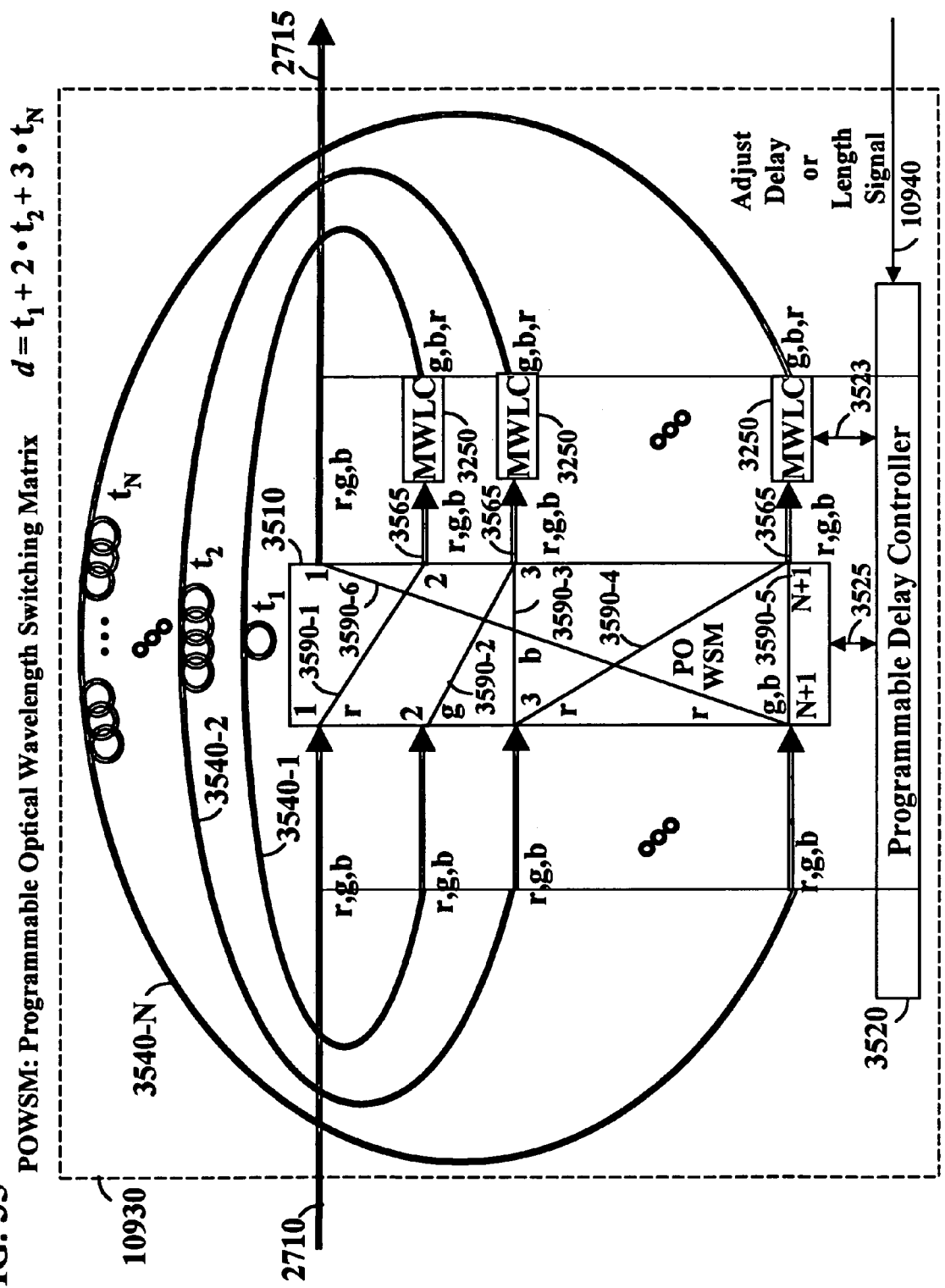
FIG. 35  POWSM: Programmable Optical Wavelength Switching Matrix  $d = t_1 + 2 \cdot t_2 + 3 \cdot t_N$

TIME DRIVEN WAVELENGTH CONVERSION-BASED SWITCHING WITH COMMON TIME REFERENCE

RELATED APPLICATIONS

This is a continuation-in-part application, under 37 C.F.R. §1.53, of pending prior application Ser. No. 09/120,700, filed on Jul. 22, 1998, "INTERCONNECTING A SYNCHRONOUS SWITCHING NETWORK THAT UTILIZES A COMMON TIME REFERENCE WITH AN ASYNCHRONOUS SWITCHING NETWORK," and further claims priority of pending provisional application Ser. No. 60/235,765, filed on Oct. 27, 2000, for "SWITCHING, GROOMING, AND DEGROOMING METHODS AND LINK TRANSMISSION CONTROL WITH COMMON TIME REFERENCE," and of pending provisional application Ser. No. 60/261,133, filed on Jan. 10, 2001, for "SWTICHING METHODS WITH COMMON TIME REFERENCE AND PLURALITY OF TIME FRAME DURATIONS."

FEDERALLY SPONSORED RESEARCH OR DEVELOPMENT

Not Applicable.

BACKGROUND OF THE INVENTION

This invention relates generally to a method and apparatus for switching and grooming of data units, over a plurality of communications links with a plurality of transmission rates, in a communications network in a timely manner while providing low switching complexity and performance guarantees.

Circuit-switching networks, which are still the main carrier for real-time traffic, are designed for telephony service and cannot be easily enhanced to support multiple services or carry multimedia traffic in their native packet formats. Circuit-switching is based on very accurate clock frequency for byte-by-byte switching. This enables circuit-switching networks to transport data streams at constant rates with a small delay jitter. Finally, the clock accuracy for SONET requires increasingly more accuracy as the lines transmission speed increases.

Packet switching networks handle bursty data more efficiently than circuit switching, due to their statistical multiplexing of the packet streams. However, current packet switches and routers operate asynchronously and provide "best effort" service only, in which end-to-end delay and jitter are neither guaranteed nor bounded. Furthermore, statistical variations of traffic intensity often lead to congestion that results in excessive delays and loss of packets, thereby significantly reducing the fidelity of real-time streams at their points of reception. Finally, current packet switches and routers electronically process the header of each packet to be routed and switched, which requires high processing power and limits the scalability of the packet switching network.

Circuit switches use time for routing. A time period is divided into very small time slices, each containing only one byte. The absolute position of each time slice within each time period determines where that particular byte is routed.

In accordance with some aspects of the present invention, time-based switching/routing supports a more sophisticated and flexible timing than circuit switching. Consequently, time-based switching provides better support of video-based multimedia applications. The time frames used for time-based switching in the present invention has larger time duration than the time slot used in circuit switching—consequently, time-based switching is much simpler than circuit switching. The present invention also supports routing based on control information included in at least one of headers and trailers of selected ones of the time frames, which current circuit switching cannot provide for.

Moreover, the present invention uses Common Time Reference (CTR). The CTR concept is not used in circuit switching. Using CIR has far reaching implications when comparing circuit switching and the current invention. For example, CTR ensures deterministic no slip of time frames, while enabling deterministic pipeline forwarding of time frames. This is in contrast to circuit switching, where (1) there are time slot slips, and (2) deterministic pipeline forwarding is not possible.

In U.S. Pat. No. 5,418,779 Yemini et al. disclose a switched network architecture that uses time. Time is used in order to determine when a plurality of switches can transmit over a predefined routing tree to one destination. This kind of tree is known as "sink" tree since the destination switch functions as a "sink" for the transmission from all switches. The time interval in which the plurality of switches transmits to a selected "sink" destination switch is called time band. In different time bands the plurality of switches are transmitting to a different single "sink" destination switch. Network switches change their configuration between time bands in order to build the proper "sink" tree during each time band. The present invention does use neither "sink" trees nor time bands for transmission over "sink" trees.

Yemini's invention may not be realizable in communications networks with end-to-end propagation delays that are not much smaller than the time band durations. In general, in Yemini's invention the end-to-end propagation delays introduce a non-trivial scheduling problem that may or may not have a solution. Furthermore, Yemini's invention does not discuss or specify how to take into consideration the link propagation delays and the end-to-end propagation delays. Consequently, general topology switched network cannot be built the way it is taught by Yemini's et al. invention.

Yemini's invention has another problem, which is congestion, that is the direct result of using "sink" trees. Data units received from different upstream switches contend for a single outgoing link towards the root of the "sink" tree. The present invention does not have any congestion. This is a direct consequence of using in the current invention completely different system operation principles and methods.

For example, in Yemini's et al. patent there is no pipeline forwarding: data units do not proceed in a lock-step fashion through the communications network, as it is the case in the present invention. The lack of pipeline forwarding leads to the above mentioned scheduling and congestion problems. Such problems are due to the fact that incoming time bands of Yemini's invention are not aligned in different input ports of the network's switches. Furthermore, it was not specified what are the temporal relationship of the same and different time bands on different "sink" tree switches when the link propagation delay and the end-to-end propagation delay are not zero. In contrast, time frames in the present invention are aligned with a Common Time Reference (CTR) on every switch.

In optical data communications with a single wavelength a single data stream is transduced into a series of pulses of light carried over an optical fiber. These pulses of light are of a single wavelength. This single wavelength vastly underutilizes the capacity of the optical fiber, which is capable of carrying a large number of signals each at a unique wavelength. Due to the nature of propagation of light signals, the optical fiber can carry multiple wavelengths simultaneously. The process of carrying multiple discrete signals via separate wavelengths of light on the same optical fiber is known in the art as wavelength division multiplexing (WDM). Many optical components, including, but not limited to, WDM multiplexers, WDM de-multiplexers, star couplers, tunable lasers, filters, waveguide grating routers (WGRs) are deployed in optical networks featuring WDM, and consequently used in the embodiments presented in this disclosure. [T. E. Stern and K. Bala, "Multiwavelength Optical Networks: a Layered Approach," Prentice Hall PTR, Upper Saddle River, N.J., USA, ISBN 020130967X. R. Ramaswami and K. N. Sivarajan, "Optical Networks: a Practical Perspective," Morgan Kaufmann Publishers, San Francisco, Calif., USA, ISBN 1-55860-445-6. H. J. R. Dutton, "Understanding Optical Communications," Prentice Hall PTR, Upper Saddle River, N.J., USA, ISBN 0-13-020141-3].

The present invention permits a novel combination of: (1) time-based switching and routing and (2) WDM technology. WDM is including the capabilities for (1) dynamic tunable wavelength transmission, (2) dynamic and static wavelength switching, and (3) tunable wavelength reception.

The increasing demand for communications capacity has led to the deployment of Wavelength Division Multiplexing (WDM), which requires extremely high capacity switches. Lambda or static wavelength switches address this need by switching a whole wavelength from an input optical fiber link to an output optical fiber link without requiring any processing of the transmitted data units. WDM with whole lambda_switching win be deployed in the network's optical core. However, switching of whole lambdas (e.g., lambdas of OC-192) is inefficient and costly for three reasons:

1. N square problem: the number of lambdas needed to accommodate all the possible connections among all access points is on the order of the square of the number of such access points. This will limit the size of the optical core.
2. Bandwidth mismatch problem: there is a substantial bandwidth mismatch when extremely high capacity backbone networks feed low capacity access links. As data leave the core and are moved by packet switches towards the edge, buffers at access links frequendy become congested, causing increased delays and dropped packets.
3. Traffic unbalancing problem: the traffic load across the network is not evenly distributed, i.e., it is not balanced. Thus, trying to satisfy the traffic load requirements using whole lambda_switching is both inflexible and inefficient.

These three problems are solved by adding the capability of switching_fractions of lambdas or Fractional Lambda Pipes (FLPs). This approach, which is called Fractional Lambda Switching (FLSw), will permit the optical core to be extended much closer to the network edges while reaching the lower speed network access devices with a bandwidth that matches their operation capability.

FLSw dynamically switches lambda fractions while carrying data units (e.g., IP data packets, and SONET STS1 frames), in a heterogeneous (mix of very high speed and very low speed links) meshed network, while providing deterministic performance guarantees. The size of fractional lambda pipes can be dynamically allocated to satisfy the specific needs of the access networks to which a fractional lambda pipe is connected to. Small capacity FLPs can be used at the periphery to access low speed sub-networks, such as, cable modems, xDSL, VoIP gateways and wireless.

Fractional Lambda Switching (FLSw) combines the advantages of circuit switching and packet switching. FLSw is used for constructing a Fractional Lambda Pipe (FLP). A FLP is equivalent to a leased line in circuit switching. A FLP is realized by two simple elements:

1. A Common Time Reference (CTR™) throughout the network that is globally aligned with the Coordinated Universal Time (UTC); and
2. Pipeline Forwarding (PF™) of time frames (logical containers of data packets) across FLPs.

The CTR is a reference clock used to realize pipeline forwarding of time frames, both within switches and across FLPs. The CTR™ is received via the Global Positioning System (GPS), which is globally available at a low cost with an accuracy of 10–20 nanoseconds. The common time reference, or more specifically the UTC second, is partitioned into time frames. The duration of a time frame is a link parameter—fast links might use shorter time frames, while slow links might use longer time frames. Contiguous time frames are grouped into time cycles, and contiguous time cycles are grouped together into contiguous super cycles. The duration of a super cycle is one UTC second, as shown in FIG. 2, and the duration of time frames and the number of timer frames in a cycle can be chosen for convenience. For example, a 1 Gb/s link might use time frames with duration of 125 µs, with time cycles of 100 time frames; while a 10 Gb/s link might use time frames with duration of 12.5 microsec, with time cycles of 1000 time frames. For both links, each time frame will carry the same 15,625-byte payload, and there will be 80 time cycles in each super cycle or one UTC second, as shown in FIG. 2.

The common time reference can be realized by using UTC (Coordinated Universal Time), which is globally available via, for example, GPS (Global Positioning System). By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) (see http://www.boulder.nist.gov/timefreq) is responsible for coordinating UTC with the International Bureau of Weights and Measures (BIPM) in Paris.

FIG. 3 shows an example of the pipeline forwarding of time frames, for a FLP™, through switches A, B and C. The path through switches A, B and C has been previously scheduled and no header processing is necessary once the packets enter the FLP. The path between Switch A and B reflects a propagation delay of four time frames (time frame numbers: 2 through 5). The packets are automatically switched to the proper output port of Switch B in one time frame and then forwarded to Switch C, arriving at Switch C after three additional time frames (time frame numbers: 7 through 9). All packets are guaranteed to arrive at the end of their FLP at the same predetermined rate at which they entered the FLP.

Each FLP's switching schedule is simple, and repeats itself every time cycle and/or super cycle. Thus, FLP™, together with the predictability provided by the CTR and pipeline forwarding, eliminate the complexity of data packet header processing. Each FLP™ transports data packets of one protocol, such as IP, MPLS, ATM, FR, or FC. However, each FLP may carry data packets of different protocols.

Fractional lambda switches have significantly lower complexity than packet switches and lower complexity than circuit switches with the same switching capability for the following reasons.

1. Minimum switch fabric complexity that can be implemented using a Banyan network, which has the complexity of $a.N.lg_a N$ switching elements, where N is the total number of optical channels and 'a' is the size of each switching element.
2. Optimal speed-up with 1 switch fabric—it operates at the same speed as the optical channel (e.g., 10 Gb/s with OC-192 links).
3. Optimal memory access bandwidth that is equal to the optical channel bandwidth—the switch architecture enables that, with only 3 input queues, a queue is never used for reading and writing at the same time, i.e., memory access with a speedup of 1.
4. (Very) small input memory for each optical channel, e.g., a 10 Gb/s channel requires 3 input queues with total of 48 Kbytes of memory, and no buffering is needed on the output port.
5. (Very) simple control of the switch fabric, since its configuration changes at a relatively low frequency (e.g., 80,000 times per second) and it is known in advance. This operation complexity is comparable to that of a T1 multiplexer.

Though highly efficient, a Banyan Network is subject to what is known as switch blocking: it may be impossible to connect an idle input with an idle output because a switching element is not available on the path between input and output. An interesting attribute of fractional lambda switching is the almost complete elimination of blocking through Banyan-based switches.

The advances in optical transport led to the realization of high speed optical channels, however, a single source transmitting to a single destination will not fill such channels. This has led to two basic requirements: (i) Grooming and degrooming: the need to aggregate (i.e., grooming) traffic from multiple sources into one optical channel and to separate (i.e., degrooming) an optical channel traffic to different destinations; and (ii) Dynamic optical switching: the need to route portions from one optical channel (i.e., a lambda or a wavelength) on different optical paths to different destinations.

Dynamic all-optical switching is possible when the optical switch reconfiguration time is significantly smaller than the time between two successive switch configuration changes.

Dynamic all-optical switching is appealing for a number of reasons stemming from the transported data stream being transparent to the switching system: (i) intrinsically protocol independent (multi-protocol) transport; (ii) high scalability, since the transmission rate of each optical channel is transparent to the optical switching system; and (iii) no processing performed on switched data units, thus eliminating processing bottlenecks.

The latest advances in optical switching have resulted in decreasing reconfiguration times of optical switch fabrics. However, taking full advantage of such advances for dynamic optical switching is not obvious—for several reasons: (i) Processing of in band control information, e.g., packet headers, is not possible; (ii) Dynamic optical storage is not available to assist in coping with switch control and reconfiguration time; and (iii) Optical switch reconfiguration time should be significantly smaller than the time between two successive reconfigurations.

Due to the above limitations it is not possible to realize an asynchronous packet switching system, and therefore, using time is necessary. However, time-based techniques deployed in circuit switching, e.g., SONET, based on byte switching (i.e., byte de-multiplexing and byte multiplexing), are not applicable to all-optical switches.

The most comprehensive solution to the above-mentioned problems is to use a common time reference (CTR™) for pipeline forwarding (PF™) in order to facilitate dynamic all-optical switching. CTR™ provides the synchronization needed to orchestrate the control of network switches while eliminating the need for optical storage and processing.

Dynamic all-optical switching of time frames—time is divided into time frames, any time frame of a sequence of incoming time frames over one optical channel can be optically switched to any outgoing optical channel. Such time frame switching is the basis of fractional lambda switching (FLSw). FLSw is used for constructing Fractional lambda pipes (FLPs), i.e., fractions of a wavelength. Each FLP™ transports data packets of different protocols—such as, IP, MPLS, ATM, FR, FC, and SONET frames (e.g., STS1 frame), thereby realizing the desired protocol independent property of all-optical switching.

In an all-optical switch PF™ is realized in two operational phases. Data units belonging to a whole time frame received from each of the optical channels during Phase 1 are switched through the switch in Phase 2. In a possible embodiment, if Phase 1 begins in time frame t, Phase 2 takes place in time frame t+1. In another embodiment, if Phase 1 ends in time frame t, Phase 2 takes place in time frame t+1. The 2 phase operation ensures that data units received from the various optical channels are aligned with the CTR before being switched. Phase 2 can be performed during either the time frame immediately following Phase 1, during time frame t+1—immediate forwarding operation, or at a later time frame—non-immediate forwarding operation.

Alignment—aligning the beginning and end of each time frame on each optical channel with the beginning and end of the CTR™ time frames. The alignment can be performed either before or after the WDM DMUX.

The alignment is needed since the propagation delay on optical links between switches is not an integer multiple of time frames. The optical alignment system is part of the all-optical fractional lambda switch and operates on all the wavelengths carried by each optical fiber and is part of Phase 1 of the PF™. The optical alignment system is based on a programmable optical delay line guaranteeing that the overall delay experienced through the optical fiber and the delay line is an integer number of time frames. As a result, when data units that have left the switch at the transmitting end of the fiber aligned with the CTR™ arrive at the WDM DMUX at the receiving end are still aligned with respect to CTR™. The alignment system comprises a controller that detects time frame delimiters and adjusts the delay by using a programmable optical delay line (note that the alignment changes only when the propagation delay on the optical link changes).

Availability of a common time reference (CTR™) on a global scale for all network nodes enables the implementation of dynamic all-optical switches with a simple architecture based on wavelength converters. Since wavelength converters are not available, an equivalent network architecture based on tunable lasers is feasible and presented in this work. This architecture is used to realize fractional lambda switching (FLSw). FLSw is based on a common time reference (CTR™) for pipeline forwarding (PF™) of time frames. In FLSw the synchronization provided by the CTR is leveraged to orchestrate the operation of tunable lasers and/or tunable receivers within a switch and across the whole network.

SUMMARY OF THE INVENTION

A novel time frame switch fabric control is provided in accordance with some aspects of the present invention, which stores a predefined sequence of switch fabric configurations, responsive to a high level controller that coordinates multiple switching systems, and applies the stored predefined sequence of switch fabric configurations on a cyclical basis having at least one of simple periodicity and complex periodicity. The application of the stored pre-defmned switch fabric configurations permits the switches of the present invention to relay data over predefined, scheduled, and/or reserved data channels without the computational overhead of computing those schedules ad infinitum within each switch. This enables the switch computation unit to operate relatively autonomously to handle new traffic reservation requests without changing the predefined switch fabric configurations at large, wherein the switch computation unit provides for finding routes for such new requests by determining how to utilize unused switch bandwidth. The computational requirements of determining a small incremental change to a switch fabric are much less than having to re-compute the entire switch fabric configuration. Further, the bookkeeping operations associated with the incremental changes are significantly less time-consuming to track than tracking the entire state of the switch fabric as it changes over time.

Electronic components are one of the limiting factors in designing switching systems operating at very high switching rates. Optical components are independent of the bit rate of the information carried by the optical signal they operate upon. Thus, optical switch fabrics, optical filters, and waveguide grating routers enable the design of very high capacity switching systems. The state of the art components of the above listed types is changing from being static, i.e., their configuration can be changed on a long time scale, to dynamic wherein their configuration can be changed on a very short time scale.

Moreover, when designing dynamic optical switching, an unresolved issue is how to control of switch configuration. Due to the lack of flexible and simple optical storage capability, optical packet switching—which provides a way of controlling the switching configuration responsive to the control information contained in the packet header—is impractical. Switching of time frames responsive to the common time reference provide a solution to the control of dynamic reconfigurable optical components.

Fast tunable lasers are being implemented and are going to be commercially available in the near future. Switch designs based on tunable lasers and a method to control them responsive to the common time reference are disclosed in the present invention.

Some aspects of the present invention utilize an alignment feature within an input port for aligning incoming data units to a time frame boundary prior to entry to a switch fabric. In a possible embodiment the alignment feature is designed using electrical components, such as random access memory (RAM) and digital circuitry. In another embodiment the alignment feature is designed using optical components, such as optical delay lines.

The present invention also discloses switch designs based on wavelength conversion and a method to control the wavelength conversion responsive to the common time reference. Optical components such as wavelength converters, tunable lasers, tunable receivers, tunable filters, passive star couplers, and passive waveguide grating routers are utilized in the disclosed designs.

Some of the disclosed embodiments are based exclusively on optical components (i.e., the disclosed systems are all-optical dynamic switching systems). The designs and methods disclosed in the present invention provide a unique path to a prompt deployment and utilization of such dynamic optical components.

These and other aspects and attributes of the present invention win be discussed with reference to the following drawings and accompanying specification.

BRIEF DESCRIPTION OF THE DRAWINGS

FIG. 5A is a block diagram of a time-driven tunable laser comprising a tunable laser scheduling controller for changing the laser wavelength responsive to the common time reference;

FIG. 5B is a timing diagram showing the wavelength generated by the time-driven tunable laser during subsequent time frames;

FIG. 5C shows an output port selected on the downstream switch as a consequence of the usage of a selected wavelength during a selected time frame;

FIG. 18A is a block diagram of a possible embodiment of tunable wavelength conversion subsystem comprising a tunable receiver (TR) and a tunable laser (TL) both responsive to a color control signal;

FIG. 18B is a timing diagram showing the wavelength received by the tunable receiver (TR) and the wavelength generated by the tunable laser (TL) during subsequent time frames;

FIG. 18C is a block diagram of a possible embodiment of tunable wavelength conversion subsystem comprising a tunable receiver (TR) responsive to a color control signal, an alignment subsystem responsive to the common time reference (CTR), and a fixed laser;

FIG. 22A is a block diagram of a multiple wavelength conversion subsystem comprising a multiple wavelength conversion (MWLC) scheduling controller for changing the set of converted wavelengths and the set of emitted wavelengths responsive to the common time reference and to a multiple wavelength mapping table;

FIG. 22B is a timing diagram showing the wavelengths conversions performed by the multiple wavelength conversion subsystem during subsequent time frames;

FIG. 35 shows a possible embodiment of optical programmable delay system, according to the present invention, that is based on an programmable optical wavelength switching matrix, a plurality of multiple wavelength converters (MWLCs) only at the outputs of the programmable optical wavelength switching matrix, and comprises a programmable delay controller.

DETAILED DESCRIPTION OF THE PREFERRED EMBODIMENT

Figure 1:
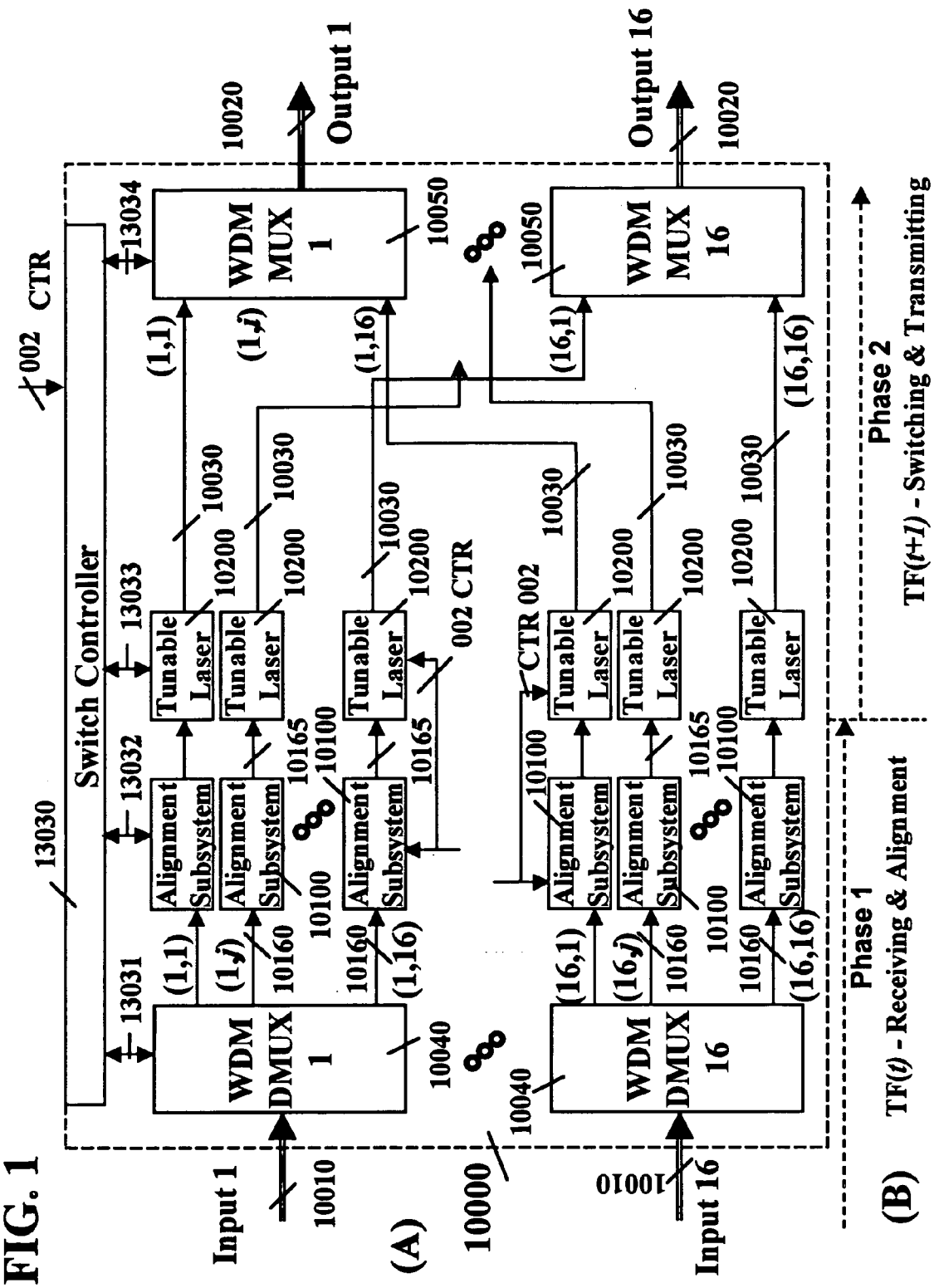
FIG. 1A is an architecture of a switching system responsive to a common time reference (CTR) based on tunable lasers and comprising a switch controller, a plurality of WDM de-multiplexers, a plurality of alignment subsystems—one for each input channel—, a plurality of WDM multiplexers, and a plurality of optical interconnections.
FIG. 1B is a timing diagram of a switching operation that is responsive to the common time reference with two pipeline forwarding phases: (i) receiving & alignment and (ii) switching & transmitting.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The present invention relates to a system and method for switching and forwarding data units over a network with optical WDM (wavelength division multiplexing) links. The switches of the network maintain a common time reference (CTR), which is obtained either from an external source (such as GPS—Global Positioning System) or is generated and distributed internally. The common time reference is used to defme time intervals, which include super cycles, time cycles, time frames, sub-time frames, and other kinds of time intervals. The time intervals are arranged both in simple periodicity and complex periodicity (like seconds and minutes of a clock).

A data unit that arrives to an input port of a switch or a grooming system or a de-grooming system, is switched to an output port based on either arrival time information and/or specific routing information in the data unit's header (e.g., IPv4 destination address in the Internet, VCI/VPI labels in ATM, MPLS-multi-protocol label switching-labels). Each switch along a route from a source to a destination forwards packets in periodic time intervals that are predefined using the common time reference.

A system is provided for managing data transfer of data units from a source to a destination. The transfer of the data units is provided during a predefined time interval, comprised of a plurality of predefined time frames. The system is further comprised of a plurality of switches. A common time reference signal is coupled to each of the switches, and a time assignment controller assigns selected predefined time frames for transfer into and out from each of the respective switches responsive to the common time reference signal.

Each communications channel may use a different time frame duration generated from the common time reference signal. Data units received during at least one of a plurality of time frames over at least one of a plurality of input channels can be transmitted during a single time frame over a single output channel. Data units received during a single time frame from an input link are transmitted during at least one of a plurality of time frames over at least one of a plurality of output links.

For each switch, there is a first predefined time frame and a first predefined (optical) channel within which a respective data unit is transferred into the respective switch, and a second predefined time frame and a second predefined (optical) channel within which the respective data unit is forwarded out of the respective switch, wherein the first and second predefined time frames may have different durations. The time assignment provides consistent fixed time intervals between the input to and output from the fractional lambda pipe.

In a preferred embodiment, there is a predefined subset of the predefined time frames during which the data units are transferred in the switch, and for each of the respective switches, there are a predefined subset of the predefined time frames during which the data units are transferred out of the switch.

For each of the data units, there is an associated time of arrival to a respective one of the input ports. The time of arrival is associated with a particular one of the predefined time frames. For each of the mappings by the routing controller, there is an associated mapping by a scheduling controller, which maps each of the data units between the time of arrival and forwarding time out. The forwarding time out is associated with a specified predefined time frame.

There is a fixed time difference between the time frames for the associated time of arrival and forwarding time out for each of the data units. A predefined interval is comprised of a fixed number of contiguous time frames comprising a time cycle. Data units that are forwarded over a given fractional lambda pipe are forwarded from an output port within a predefined subset of time frames in each time cycle.

The time frames associated with a particular one of the switches within the fractional lambda pipe are associated with the same switch for all the time cycles, and are also associated with one of input into or output from the particular respective switch.

In one embodiment of the present invention, there is a constant fixed time between the input into and output from a respective one of the switches for each of the time frames within each of the time cycles. A fixed number of contiguous time cycles comprise a super cycle, which is periodic. Data units that are forwarded over a given fractional lambda pipe are forwarded from an output port within a predefined subset of time frames in each super cycle. Furthermore, the number of data units that can be forwarded in each of the predefined subset of time frames within a super cycle for a given fractional lambda pipe is also predefined.

In the preferred embodiment, the common time reference signal is devised from the GPS (Global Positioning System), and is in accordance with the UTC (Coordinated Universal Time) standard. The UTC time signal does not have to be received directly from GPS. Such signal can be received by using various means, as long as the delay or time uncertainty associated with that UTC time signal does not exceed half a time frame.

In one embodiment, the super cycle duration is equal to one second as measured using the UTC (Coordinated Universal Time) standard. In an alternate embodiment the super cycle duration spans multiple UTC seconds. In another alternate embodiment the super cycle duration is a fraction of a UTC second. In a preferred embodiment, the super cycle duration is a small integer number of UTC seconds.

Data units can be Internet Protocol (IP) data packets, multi-protocol label switching (MPLS) data packets, Point-to-Point Protocol (PPP) frames, High-level Data Link Control (HDLC) frames, Frame Relay frames, fiber channel data units, asynchronous transfer mode (ATM) cells, or SONET/SDH frames.

In accordance with one aspect of the present invention, a system is provided for transferring data units across a data network while maintaining for reserved data traffic constant bounded jitter (or delay uncertainty) and no congestion-induced loss of data units. Such properties are essential for many multimedia applications, such as, telephony and video teleconferencing.

Figure 2:
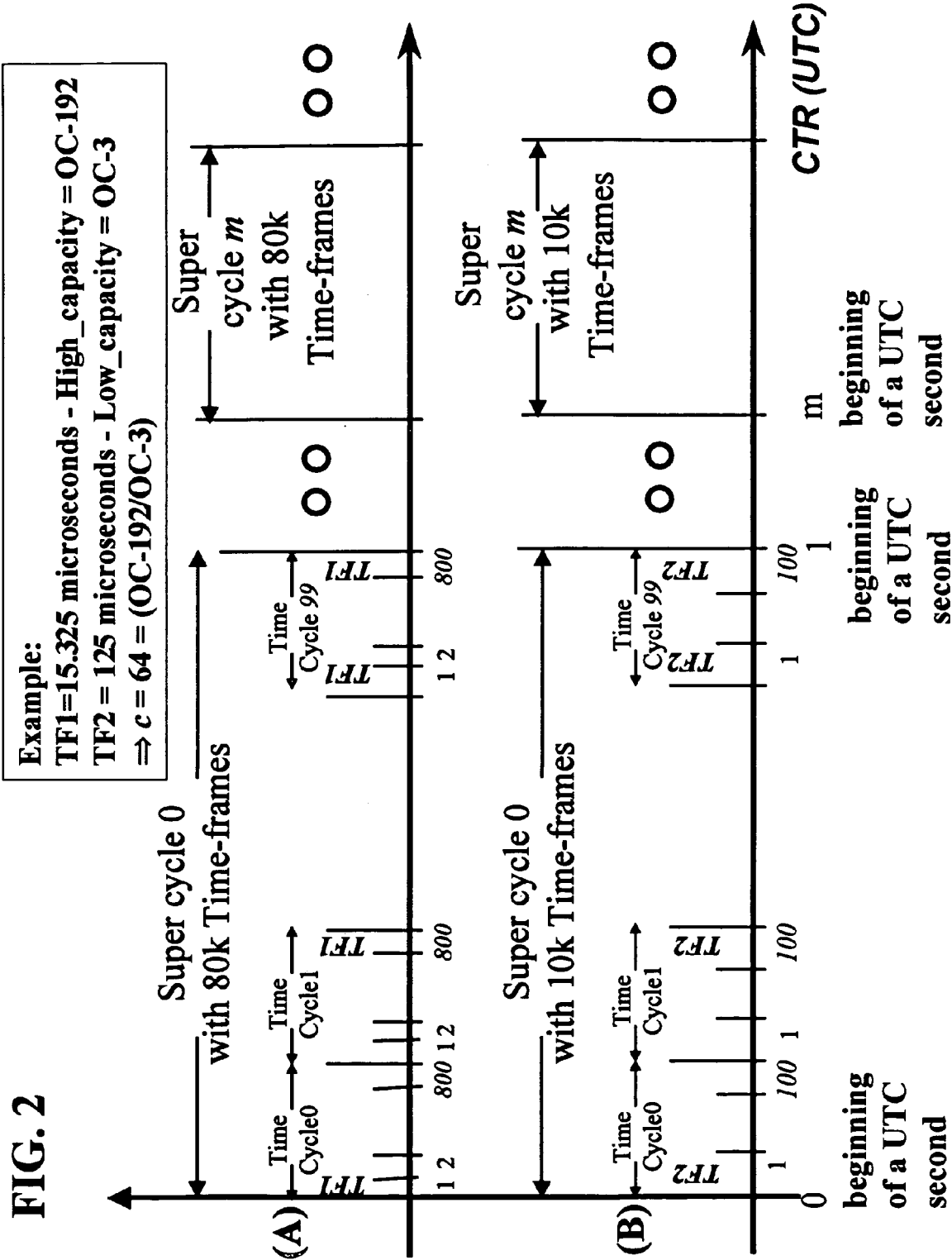
FIG. 2A contains a timing diagram of a common time reference (CTR) that is aligned with the coordinated universal time (UTC) standard, as utilized by the present invention, wherein the CTR is divided into a plurality of contiguous periodic super cycles each comprised of 100 contiguous time cycles each comprised of 800 contiguous time frames.
FIG. 2B contains a timing diagram of a common time reference (CTR) that is aligned with the coordinated universal time (UTC) standard, as utilized by the present invention, wherein the CTR is divided into a plurality of contiguous periodic super cycles each comprised of 100 contiguous time cycles each comprised of 100 contiguous time frames.

FIG. 2 is an illustration of a common time reference (CTR) that is aligned to UTC. Consecutive time frames are grouped into time cycles. FIG. 2A and FIG. 2B provide examples of the common time reference (CTR) organized according to time frames of two different durations. As shown in the example illustrated in FIG. 2A, there are 800 time frames in each time cycle, each time frame lasting 12.5 microseconds. For illustration purposes, the time frames within a time cycle are numbered 1 through 800. According to the example shown in FIG. 2B, there are 100 time frames in each time cycle, each time frame lasting 125 microseconds. For illustration purposes, the time frames within a time cycle are numbered 1 through 100.

Time frames having different duration can be used for transmission over channels with different capacity. FIG. 2A provides an example in which 15.325 microseconds time frames are coupled to OC-192 (2.4 Gb/s) channels, while FIG. 2B exemplifies the coupling of 125 microseconds time frames with OC-3 (155 Mb/s) channels. In FIG. 2 the ratio c between the transmission speed of a high capacity channel and the transmission speed of a low capacity channel is defined. In the example in FIG. 2, c is 64.

As shown in FIG. 2, consecutive time cycles are grouped together into super cycles and in the two embodiments presented in FIG. 2A and FIG. 2B, respectively, there are 100 time cycles in each super cycle. For illustration purposes, time cycles within a super cycle are numbered 0 through 99. Super cycles 0 and m are shown in FIG. 2. Time cycles of different duration can be coupled to channels that deploy time frames of different duration. Equivalently, super cycles comprised of a different number of time cycles can be coupled to different channels that deploy time frames having different duration.

FIG. 2 is illustrative of the relationship of time frames, time cycles, and super cycles; in alternate embodiments, the number of time frames within a time cycle may be different than 100 or 800, and the number of time cycles within a super cycle may be different than 100.

FIG. 2 illustrates how the common time reference signal can be aligned with the UTC (Coordinated Universal Time) standard. In this illustrated example, the duration of every super cycle is exactly one second as measured by the UTC standard. Moreover, as shown in FIG. 2, the beginning of each super cycle coincides with the beginning of a UTC second. Consequently, when leap seconds are inserted or deleted for UTC corrections (due to changes in the earth rotation period), the cycle and super cycle periodic scheduling will not be affected. The time frames, time cycles, and super cycles are associated in the same manner with all respective switches within the virtual pipe at all times.

In the embodiment illustrated in FIG. 2, the super cycle duration is equal to one second as measured using the UTC (Coordinated Universal Time) standard. In an alternate embodiment the super cycle duration spans multiple UTC seconds. In another alternate embodiment the super cycle duration is a fraction of a UTC second. In another embodiment, the super cycle duration is a small integer number of UTC seconds. A time frame may be further divided into time slots in the preferred embodiment, not illustrated in FIG. 2.

The Pipeline Forwarding (PF) Principle

Figure 3:
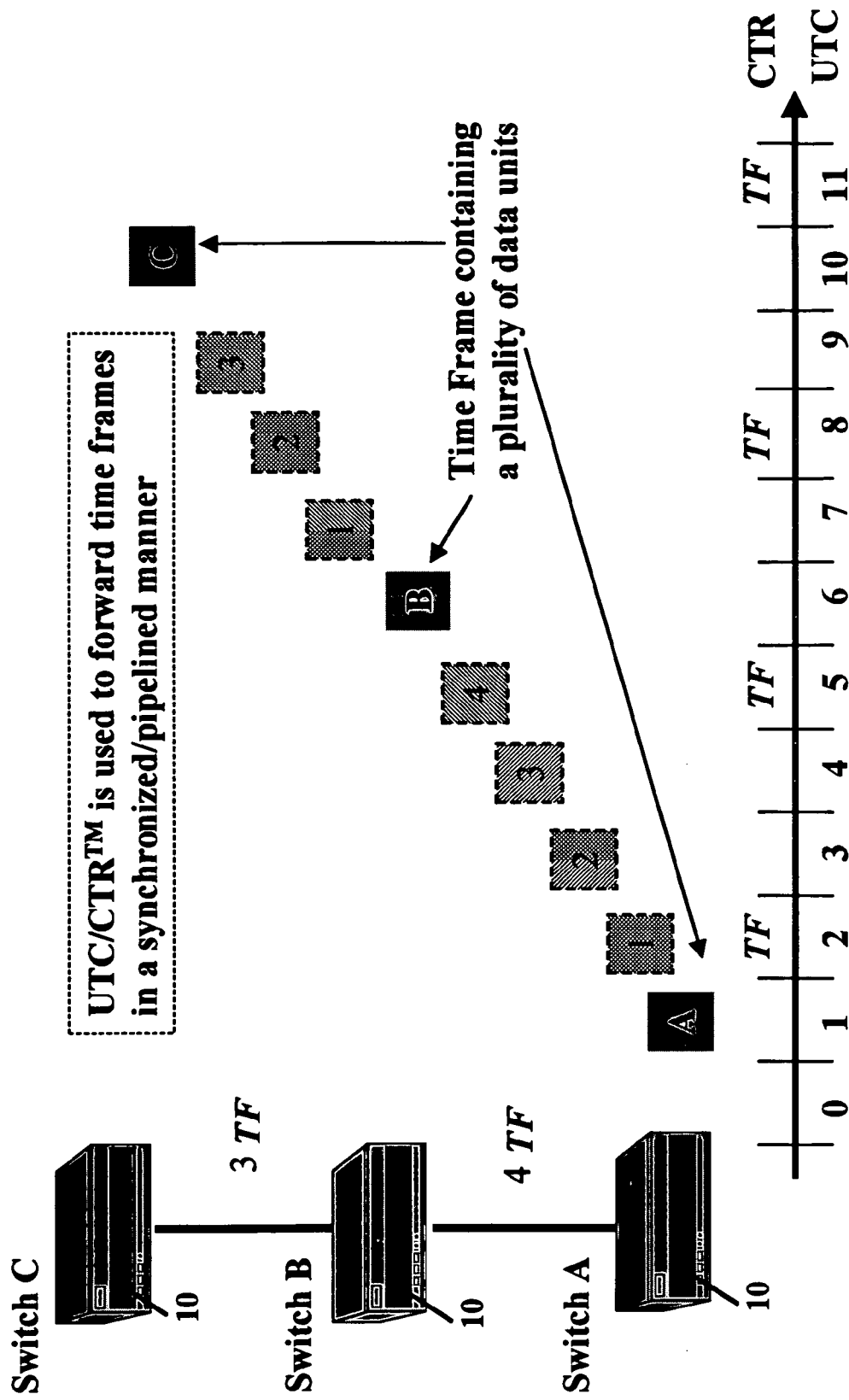
FIG. 3 shows how time frames are forwarded in a synchronized or pipelined manner responsive to UTC/CTR.

In the method shown in FIG. 3, the content of the whole time frame is switched in the same way—namely, all the data packets in the time frame are switched to the same output port. Consequently, there is no need to use time slots. FIG. 3 shows an example of time frame (TEF) switching and forwarding through a sequence of the switches: Switch A, Switch B, and Switch C. According to this specific example, the content of a TF that was forwarded from Switch A at time frame 2 will reach Switch B at time frame 5, then switched to the output port at time 6, then forwarded at time frame 7 and will reach Switch C at time frame 9. The method of time frame switching is extremely useful in reducing the switching complexity of communications systems with a very high transmission rate (e.g., OC-48, OC-192, OC-768) and/or a plurality of wavelengths (i.e., WDM channels).

Time Driven Tunable Laser-Based Switching with Common Time Reference

Fractional lambda switching (FLSw) is based on two elements: (1) a Common Time Reference (CTR) throughout the network that is used to realize (2) Pipeline Forwarding (PF) of time frames (logical containers of data units) across multiple fractional lambda switches. FLSw is used for constructing a Fractional lambda pipe (FLP) that is equivalent to a leased line in circuit switching. Each FLP transports data packets of one protocol—such as, IP, MPLS, ATM, FR, FC, and SONET frames—thereby realizing the desired protocol independent property of optical switching.

The CTR is a reference clock, globally aligned with the Coordinated Universal Time (UTC), derived, for example, from the Global Positioning System (GPS) that is globally available at a minimal cost for accuracy of 1 microsecond. UTC can be as well derived from the GLONASS system and in the future it will be made available by the Galileo system. The CTR is partitioned into time frames, as shown in FIG. 2A, the duration of a time frame being an optical channel parameter. As shown in FIG. 2A, contiguous time frames are grouped into time cycles and contiguous time cycles are grouped into contiguous super cycles, wherein one super cycle is equal to and temporally aligned with one UTC second.

Pipeline forwarding (PF) of time frames for an FLP through a sequence of optical switches is realized by pre-scheduling the switching and forwarding of data units contained in each time frame through the switches. Thus, no control processing is necessary once data units within each time frame enter a FLP: all data units reaching a switch during one time frame are automatically switched to the proper outgoing optical channel and then forwarded to the next switch on the route of the FLP, as exemplified in FIG. 3. Each FLP's switching schedule repeats itself every time cycle.

Advances in components for optical networking feature dynamic optical switch fabrics —e.g., based among others on electromechanical micro mirrors, holographic techniques, bubbles—and tunable lasers. The time required for changing the input/output configuration of dynamic optical switch fabrics is currently larger than the time required for changing the wavelength generated by a tunable laser. As a consequence, optical switch architectures based on tunable lasers rather than optical switch fabrics are appealing. The present disclosure describes a number of optical switch architectures based on tunable lasers.

FIG. 1A, FIG. 6A, FIG. 8A, FIG. 11A, and FIG. 13A show three possible architectures of a fractional lambda switch implemented using an array of tunable lasers 10200 and comprising a switch controller 13030. In FIG. 1A, FIG. 6A, FIG. 8A, FIG. 11A, and FIG. 13A there are 16 input and output ports, each terminating a Wavelength Division Multiplexing (WDM) optical fiber 10010 carrying 16 wavelengths. In each of the architectures, an optical de-multiplexer (WDM DMUX) 10040 separates the 16 wavelengths. The WDM DMUX 10040 is coupled with an alignment subsystem 10100 or 10900, as show in FIG. 1A, FIG. 6A, FIG. 8A, FIG. 11A, and FIG. 13A.

In an alternative embodiment subcarrier multiplexing (SCM) is used to provide for multiple channels on each fiber. SCM multiplexers and SCM de-multiplexers—instead of WDM multiplexers (MUXes) 10050 WDM de-multiplexers (DMUXes) 10040-combine and separates the various optical channels on the fibers.

The switch performs PF that is realized in two operational phases, as shown in FIG. 1B. Data units belonging to a whole time frame received from each of the optical channels during Phase 1 are switched through the switch in Phase 2. In a possible embodiment, if Phase 1 begins in time frame t, Phase 2 takes place in time frame t+1. In another embodiment, if Phase 1 ends in time frame t, Phase 2 takes place in time frame t+1. The 2 phase operation ensures that data units received from the various optical channels are aligned with the CTR before being switched. Phase 2 can be performed during either the time frame immediately following Phase 1, during time frame t+1—immediate forwarding operation, or at a later time frame—non-immediate forwarding operation.

As shown in FIG. 1A, FIG. 6A, FIG. 8A, FIG. 11A, and FIG. 13A, during each time frame, aligned data units retrieved from the alignment subsystem are transmitted by a tunable laser 10200 to an output port where a WDM multiplexer (WDM MUX) 10050 combines the wavelength generated by the tunable laser with other 15 wavelengths onto the corresponding output fiber. As shown by the block diagram of a time driven tunable laser 10200 depicted in FIG. 5A, the control of the tunable laser is based on a wavelength-mapping table 10210 that is downloaded into each tunable laser scheduling controller 10220 by the switch controller 13030. The wavelength-mapping table 10210 indicates to the tunable laser scheduling controller 10220 the wavelength to be used during each time frame of the time cycle or super cycle. As shown in FIG. 5B the tunable laser 10230 can change wavelength every time frame. The wavelength mapping follows a predefined pattern that repeats itself every time cycle or every super cycle.

The switch controller 13030 centrally computes the wavelength mapping table 10210 for all the tunable lasers 10200 guaranteeing that the same wavelength is not used during the same time frame by more than one tunable laser 10200 that is connected to the same output port WDM MUX 10050, as shown in FIG. 1A, FIG. 6A, FIG. 8A, FIG. 11A, and FIG. 13A. The wavelength-mapping table 10210, shown in FIG. 5, of a tunable laser 10200 is changed at the FLP control level, i.e., each time an FLP is set up or torn down.

Alignment is needed since the propagation delay on the communications channels between switches is not an integer multiple of time frames. Phase 1, shown in FIG. 1B, ensures that data units received from the various optical channels are optically aligned with the CTR before being forwarded by the tunable laser 10200.

Definition of Alignment: aligning the beginning and end of each time frame on each optical channel with the beginning and end of the CTR time frames.

Figure 33:
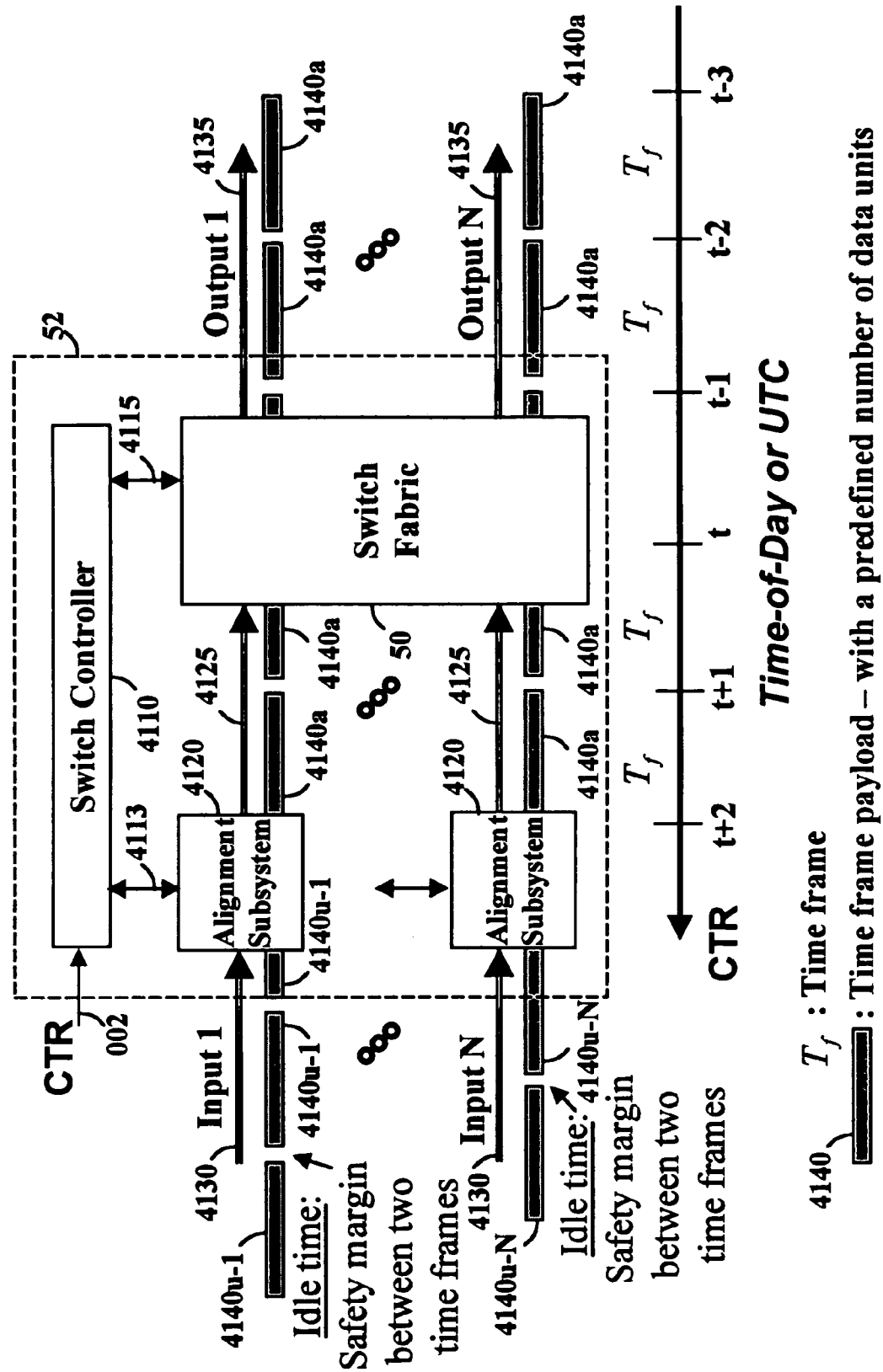
FIG. 33 is a pictorial representation of the alignment principle wherein unaligned time frames on all the inputs are aligned to the common time reference prior to being switched.

The alignment principle is exemplified in FIG. 33. Time frames received on the input links 4130 are not aligned with the CTR. Each time frame contains a payload 4140; an idle time acts as a safety margin separating the payloads 4140 of adjacent time frames. The payloads 4140u of the time frames on the input links 4130 are not aligned with the CTR. Time frame payloads received from different input links 4130 are not necessarily aligned among themselves (see for example 4140u-1 and 4140u-N in FIG. 33).

An alignment subsystem 4120 coupled with each input link 4130 delays incoming, unaligned time frame payloads 4140u such that time frame payloads 4140a are aligned upon exiting the alignment subsystem 4120. Time frame payloads 4140a on all the inputs 4125 of the switch fabric 50 are aligned to the CTR. Time frame payloads 4140 switched to all the outputs 4135 are aligned to the CTR.

Figure 4:
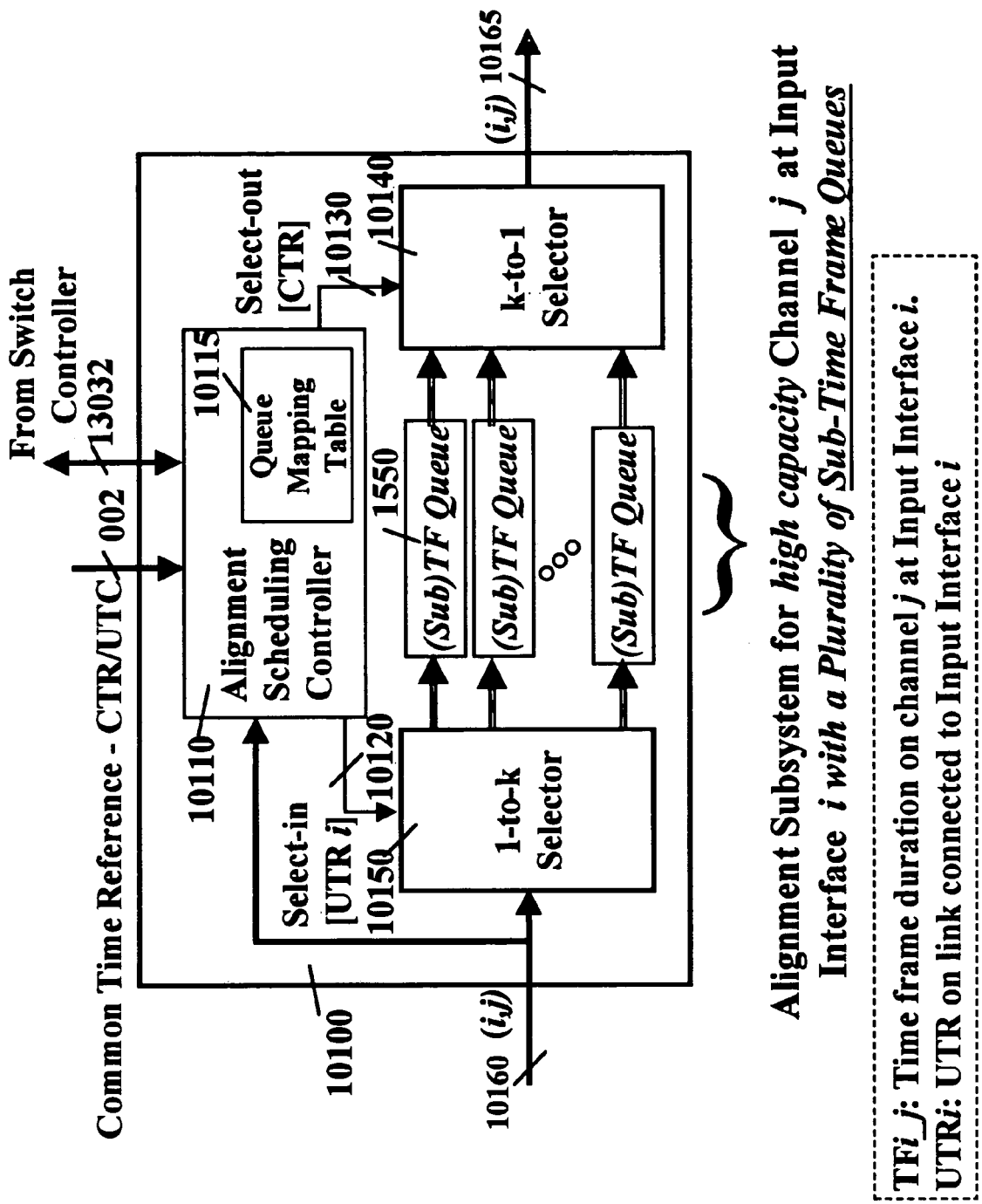
FIG. 4 is a block diagram of an alignment subsystem responsive to the common time reference (CTR)
Figure 6:
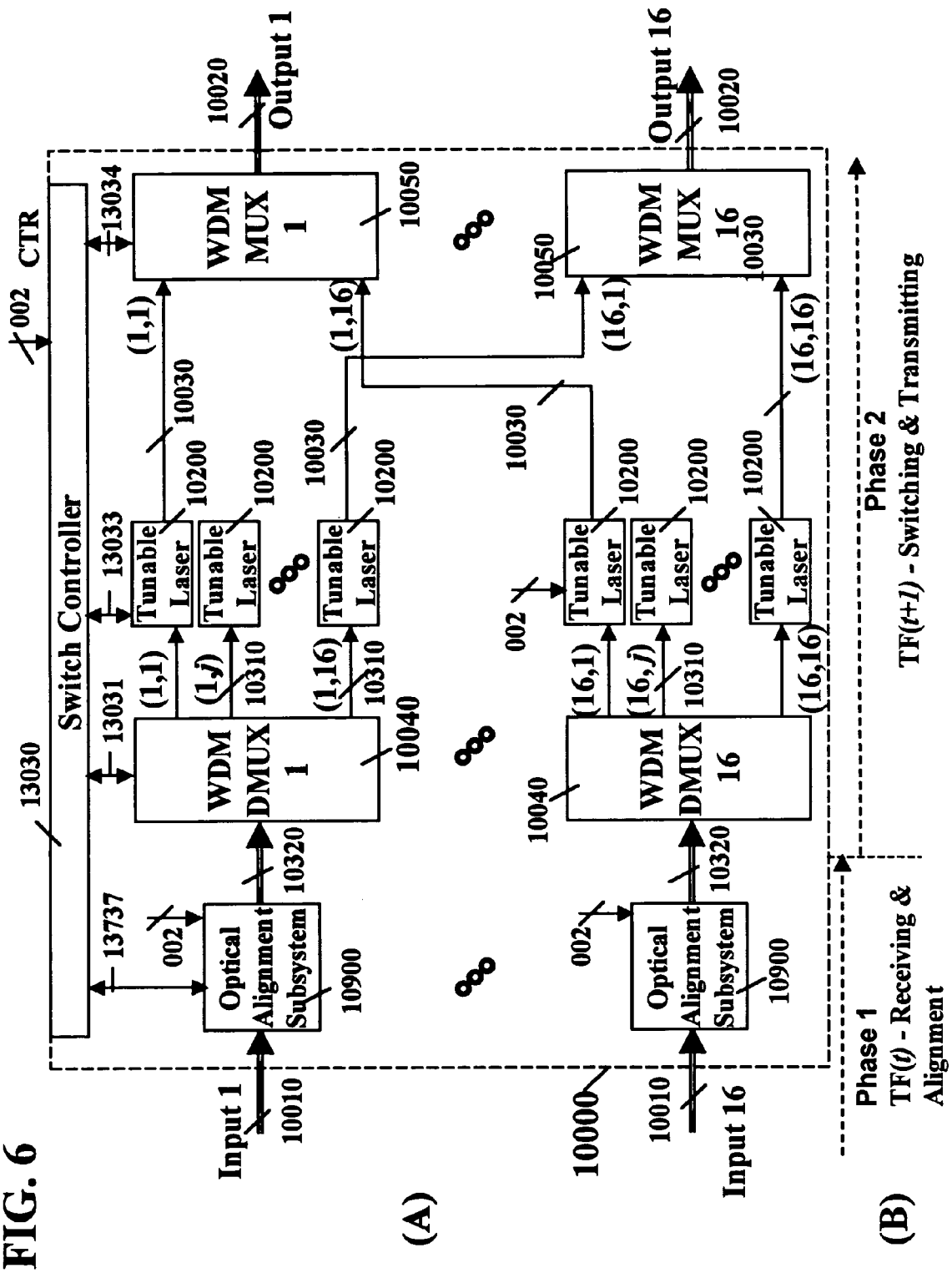
FIG. 6A is an architecture of a switching system responsive to the common time reference (CTR) based on tunable lasers and comprising a switch controller, a plurality of WDM de-multiplexers, a plurality of optical alignment subsystems—one for each input line—, a plurality of WDM multiplexers, and a plurality of optical interconnections.
FIG. 6B is a timing diagram of a switching operation that is responsive to the common time reference with two pipeline forwarding phases: (i) receiving & alignment and (ii) switching & transmitting.
Figure 8:
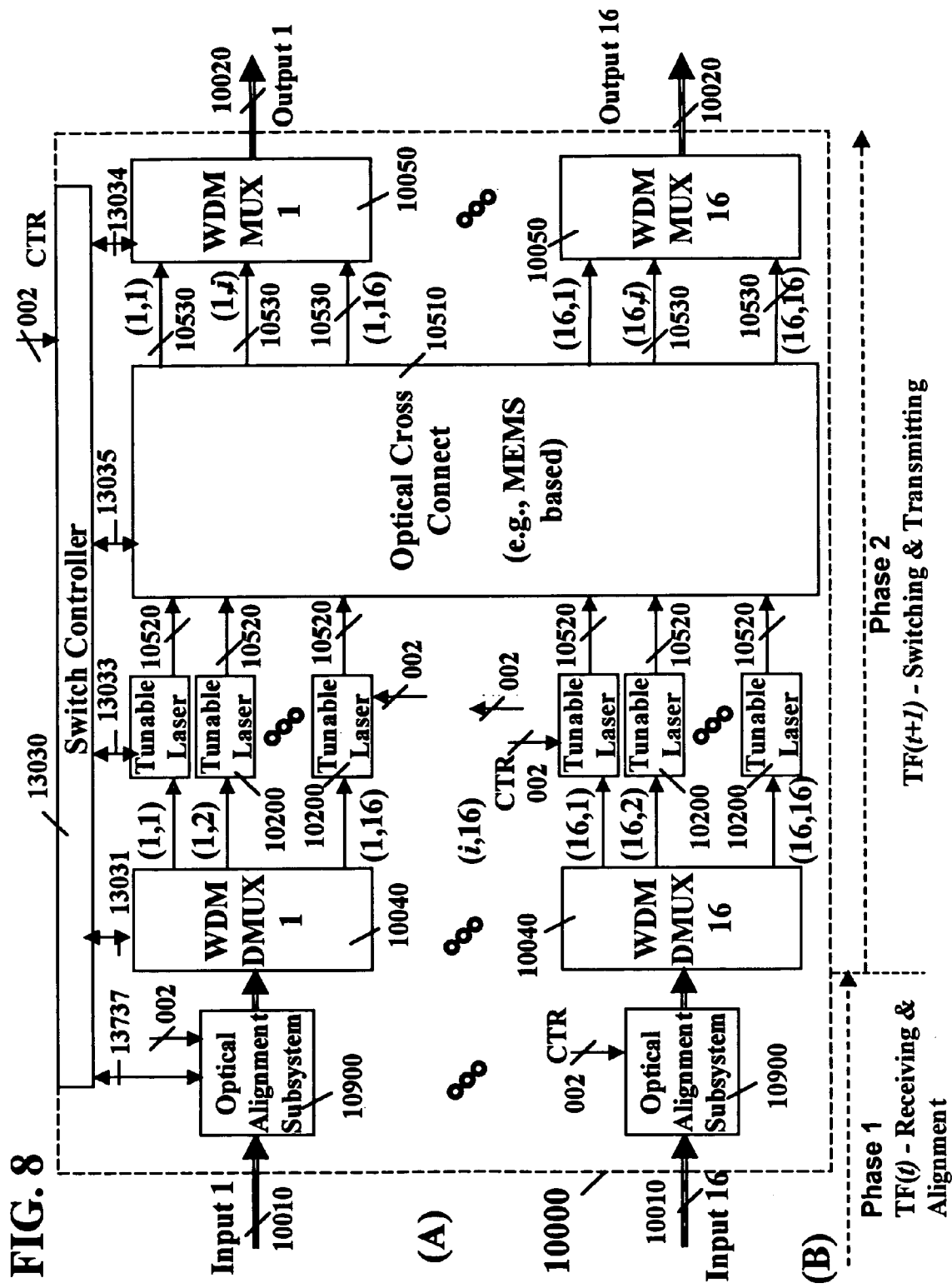
FIG. 8A is an architecture of a switching system responsive to the common time reference (CTR) based on tunable lasers and comprising a switch controller, a plurality of WDM de-multiplexers, a plurality of optical alignment subsystems—one for each input link—a plurality of WDM multiplexers, and an all-optical cross connect.
FIG. 8B is a timing diagram of a switching operation that is responsive to the common time reference with two pipeline forwarding phases: (i) receiving & alignment and (ii) switching & transmitting.

FIG. 1A and FIG. 11A show per-wavelength alignment subsystems 10100 connected at the output of the WDM DMUXes 10040 and before the tunable lasers 10200. While FIG. 6A and FIG. 8A show an optical alignment subsystem 10900, which performs alignment on all the wavelengths carried by an optical fiber. Both alignment configurations—in FIG. 1A and FIG. 11A, and in FIG. 6A and FIG. 8A, respectively—take part in Phase 1 of PF, as shown in FIG. 1B, FIG. 11B, FIG. 6B, and FIG. 8B. Each of the per-wavelength alignment subsystems 10100 in FIG. 1A and FIG. 11A is implemented as a circular buffer of queues, each capable of storing one time frame worth of data, as shown in FIG. 4. During each time frame data units are stored in one queue 1550 and retrieved form another one 1550; the writing and reading queues are changed at the end of each time frame according to a pre-defined pattern that repeats itself every time cycle or every super cycle.

Figure 12:
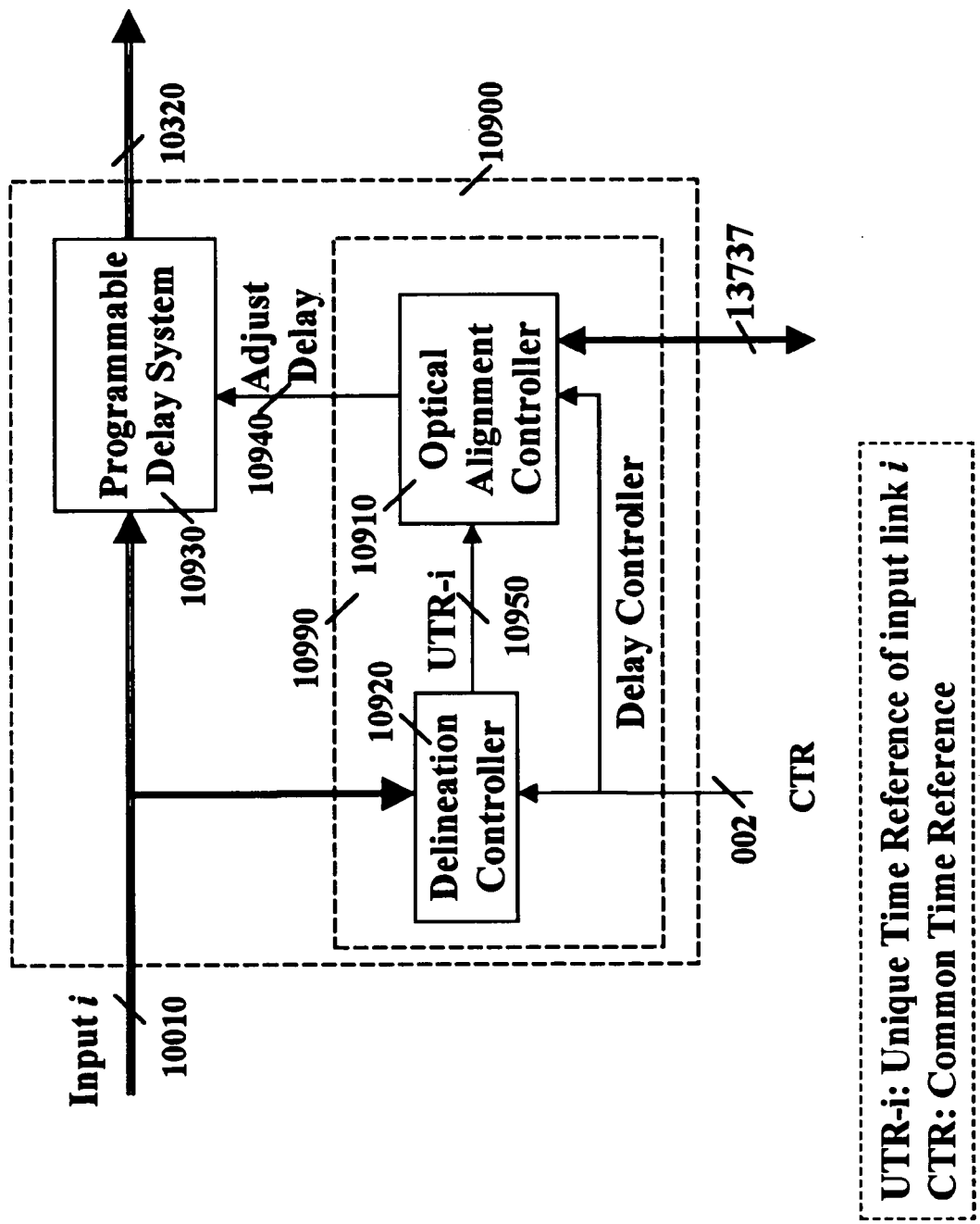
FIG. 12 is a block diagram of an optical alignment subsystem based on an optical programmable delay system.

The optical alignment subsystem 10900 in FIG. 6A and FIG. 8A is based on a programmable delay system 10930, as shown-in FIG. 12, guaranteeing that the overall delay experienced through the optical fiber and the programmable delay system 10930 is an integer number of time frames. As a result, when data units that have left the switch at the transmitting end of the fiber aligned with the CTR arrive at the WDM DMUX 10040 (see for example FIG. 6A) at the receiving end are still aligned with respect to then CTR. As shown in FIG. 12, the optical alignment subsystem 10900 comprises a delay controller 10990 comprised of a delineation controller 10920 that detects the time frame delimiters and an optical alignment controller 10910 that adjusts the delay introduced by the optical programmable delay system 10930 (note that the delay is modified only when the optical link propagation delay changes).

In the switch depicted in FIG. 1A and FIG. 6A the tunable lasers 10200 are statically connected to the same input WDM DMUX 10040 and the same output WDM MUX 10050. Each WDM DMUX 10040 is coupled with tunable lasers 10200 connected to each one of WDM MUXes 10050. Due to this interconnection configuration, the wavelength on which data units are carried on the input fiber determines their routing within the switch. Thus, the wavelength deployed by a tunable laser 10200 during a time frame determines the route the data units belonging to the time frame will take in the downstream switch on the path to their destination.

This WDM wavelength switching method (by using tunable lasers) is equivalent to label switching in ATM and MPLS. The label chosen in a switch determines the routing of a cell or MPLS packet in the next switch. Equivalently, the wavelength chosen in a switch determines the routing of a time frame worth of data in the following switch. Therefore, the wavelength entry in the tunable laser's wavelength mapping table 10210 (shown in FIG. 5) is equivalent to the Next Hop Label Forwarding Entry (NHLFE) of an MPLS switch.

The switch architecture presented in FIG. 1A and FIG. 6A is inexpensive and scalable because it is based on simple components and static interconnections among them. The control complexity is very low, since lasers are tuned no more than once every time frame. However, the resulting switch is not flexible, since only one wavelength from an input 10010 (WDM DMUX 10040) can be switched to a given output 10020 (WDM MUX 10050). A more flexible architecture can be obtained in two ways:
1. When the number of wavelengths per port is larger than the number of ports, and
2. When the switch architecture depicted in FIG. 1A and FIG. 6A is generalized, as depicted in FIG. 8A, which adds configurable connections between the tunable lasers 10200 and the outputs 10020 by means of an optical cross connect 10510. The number of wavelengths on an input 10010 switched to a given output 10020 during the same time frame can be changed dynamically—even though on a possibly long time scale—to accommodate uneven traffic patterns.

Detailed description of switch architectures

FIG. 1A is the architecture of a possible embodiment of a time driven switch based on tunable lasers 10200. The switching system 10000 presented in FIG. 1A has a plurality of inputs 10010 and outputs 10020, each one consisting of an optical link with a plurality of wavelengths. The switching system 10000 in FIG. 1A comprises a switch controller 13030, a plurality of WDM (wavelength division multiplexing) de-multiplexers (DMUX) 10040, alignment subsystems 10100, tunable lasers 10200, and WDM multiplexers (MUXes) 10050, and connection lines 10030 between each one of the tunable lasers 10200 and a respective one of the WDM multiplexers 10050.

Figure 24:
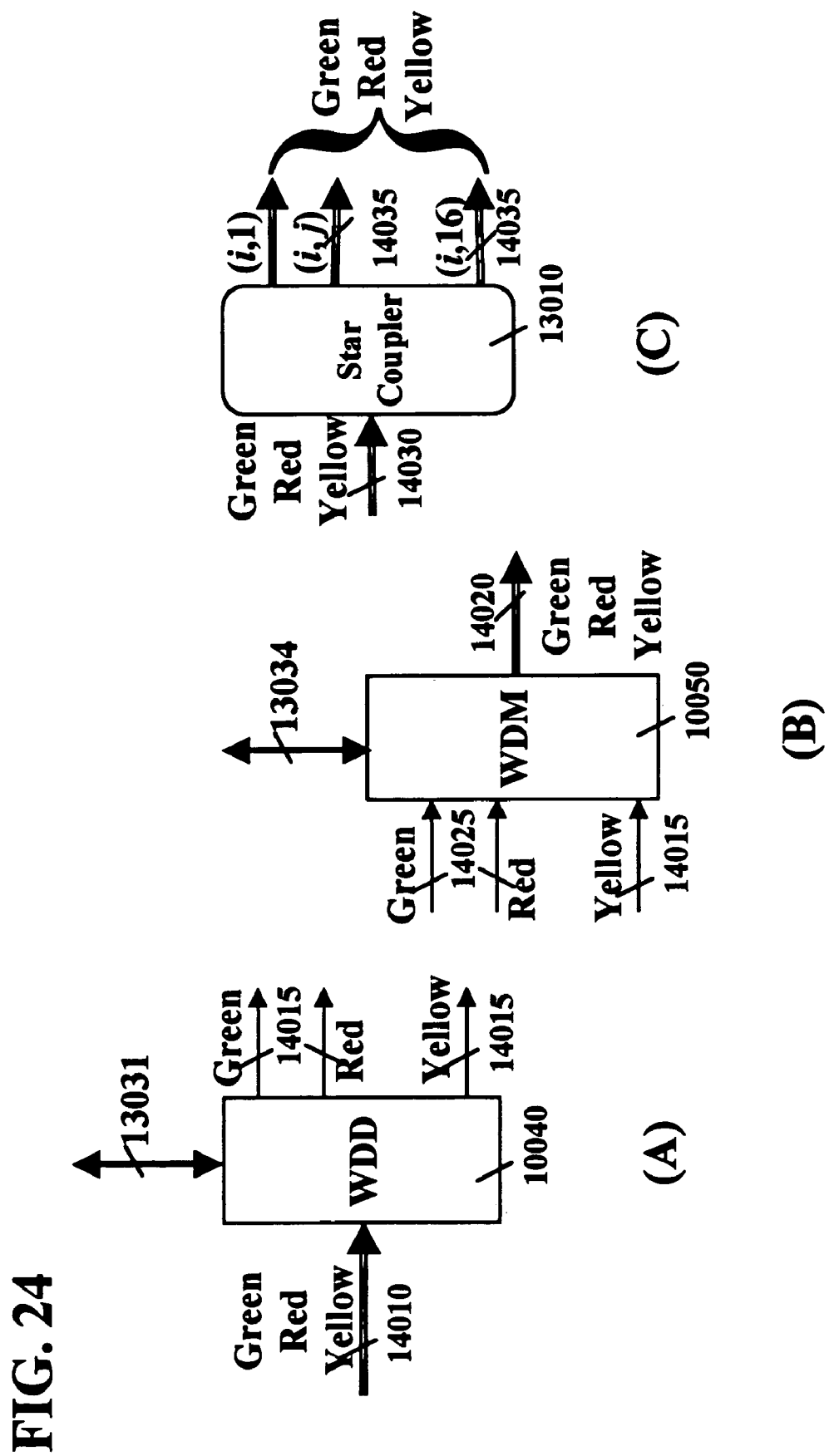
FIG. 24A exemplifies an operation of a WDM De-multiplexer (WDD)
FIG. 24B exemplifies an operation of a WDM Multiplexer (WDM)
FIG. 24C exemplifies an operation of a star coupler.

FIG. 24A shows the operation of a WDM DMUX (WDD) 10040 receiving an optical signal comprising a plurality of wavelengths, i.e., colors (green, red, and yellow in the example in FIG. 24A), on its optical input 14010. The WDD 10040 separates the optical signal coupled to each of the wavelengths onto a different output 14015. In the example in FIG. 24A, the green wavelength is emitted on the top output 140151 the red wavelength on the middle output 14015, and the yellow wavelength on the lower output 14015.

In the switch architecture shown in FIG. 1A, each WDM MUX 10040 separates each of the wavelengths received from the corresponding input 10010 and directs it to a corresponding alignment subsystem 10100. A respective one of the plurality of alignment subsystems 10100 is associated to each respective one of the wavelengths received from each input 10010. In the configuration shown in FIG. 1A the switching system 10000 comprises 16 inputs 10010 and outputs 10020, each one comprising 16 wavelengths. Consequently, each WDM DMUX 10040 has 16 output lines and each WDM MUX 10050 has 16 input lines. For example, WDM DMUX i has 16 output lines (i,1) through (i,16) and WDM MUXj has 16 input lines (j,1) through (j,16).

The Alignment Subsystem 10100 aligns to the common time reference (CTR) data units received from its respective wavelength de-multiplexed by the respective WDM DMUX 10040 from the corresponding input 10010. During each time frame, the tunable laser 10200 retrieves from its respective alignment subsystem 10100 data units to be switched during the current time frame and transmits them on a pre-selected wavelength on the connection line 10030 with its respective one of the WDM MUXes 10050.

Each WDM MUX 10050 multiplexes the wavelengths received on its respective input lines 10030 from the tunable lasers 10200 and transmits them on its respective output 10020. For example, WDM MUXj 10050 multiplexes on outputj 10020 the wavelengths received on the connection lines 10030 (j,1) through (j,16).

Each tunable laser 100200 can change the wavelength on which it transmits during each time frame according to the information stored in a (sub)-time frame table 10210 downloaded in the tunable laser controller 10220 (see FIG. 5) by the switch controller 13030. By properly building the (sub)-time frame tables 10210 for all the tunable lasers 10200, the switch controller 13030 ensures that no more than one tunable laser 10200, among the plurality of tunable lasers 10200 connected to the same WDM MUX 10050, transmits over the same wavelength during the same time frame.

Figure 7:
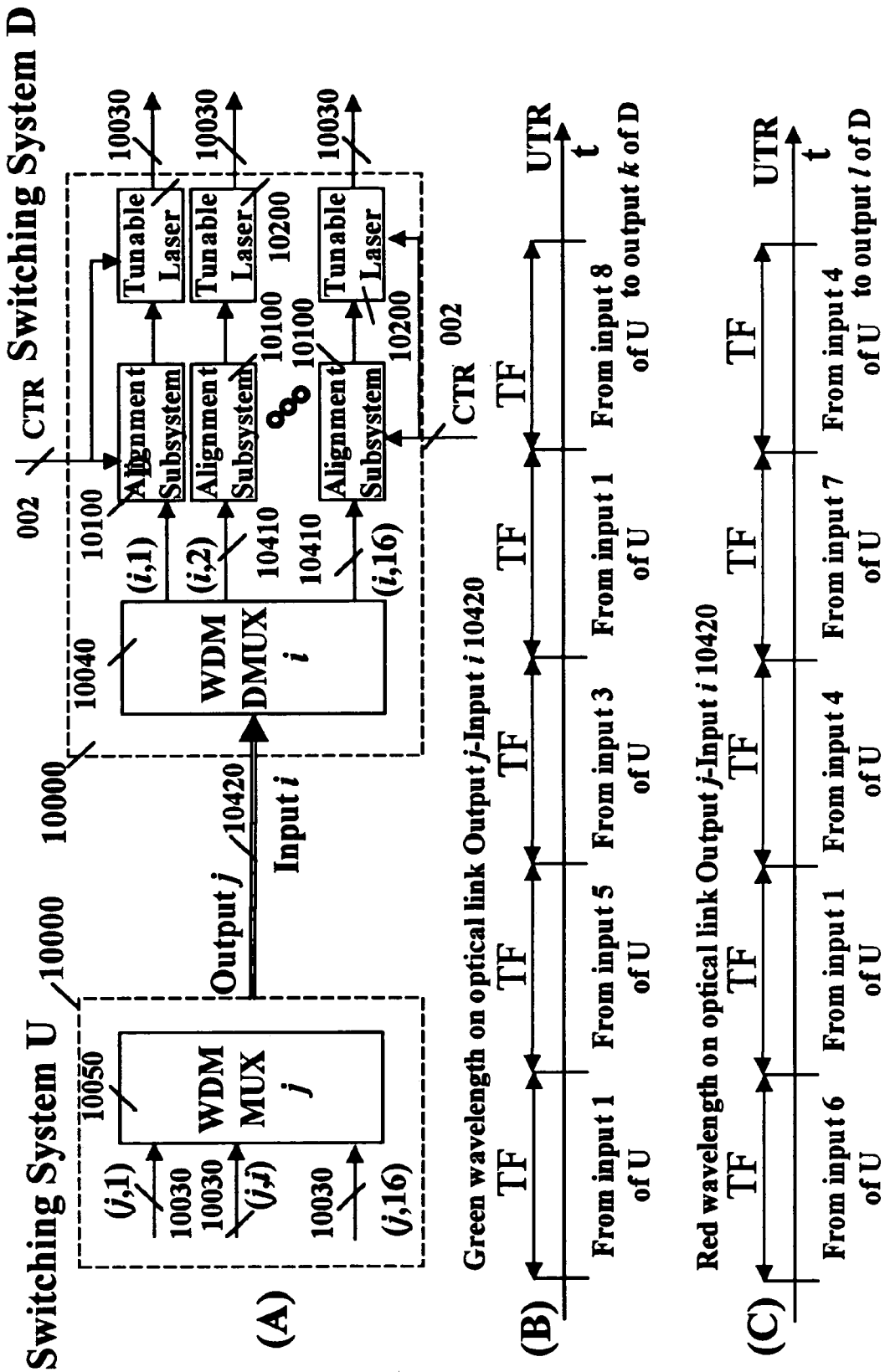
FIG. 7A shows a communications link, the transmitting port of the switching system connected to the transmitting end of the communications link, and the receiving port of the switching system connected to the receiving end of the communications link, wherein the architecture of both switching systems is based on tunable lasers.
FIG. 7B is a timing diagram showing, for each time frame, from which input of the upstream switching system in FIG. 7A data units carried over the communications channel corresponding to the green wavelength had been sent.
FIG. 7C is a timing diagram showing, for each time frame, from which input of the upstream switching system in FIG. 7A data units carried over the communications channel corresponding to the red wavelength had been sent.
Figure 29:
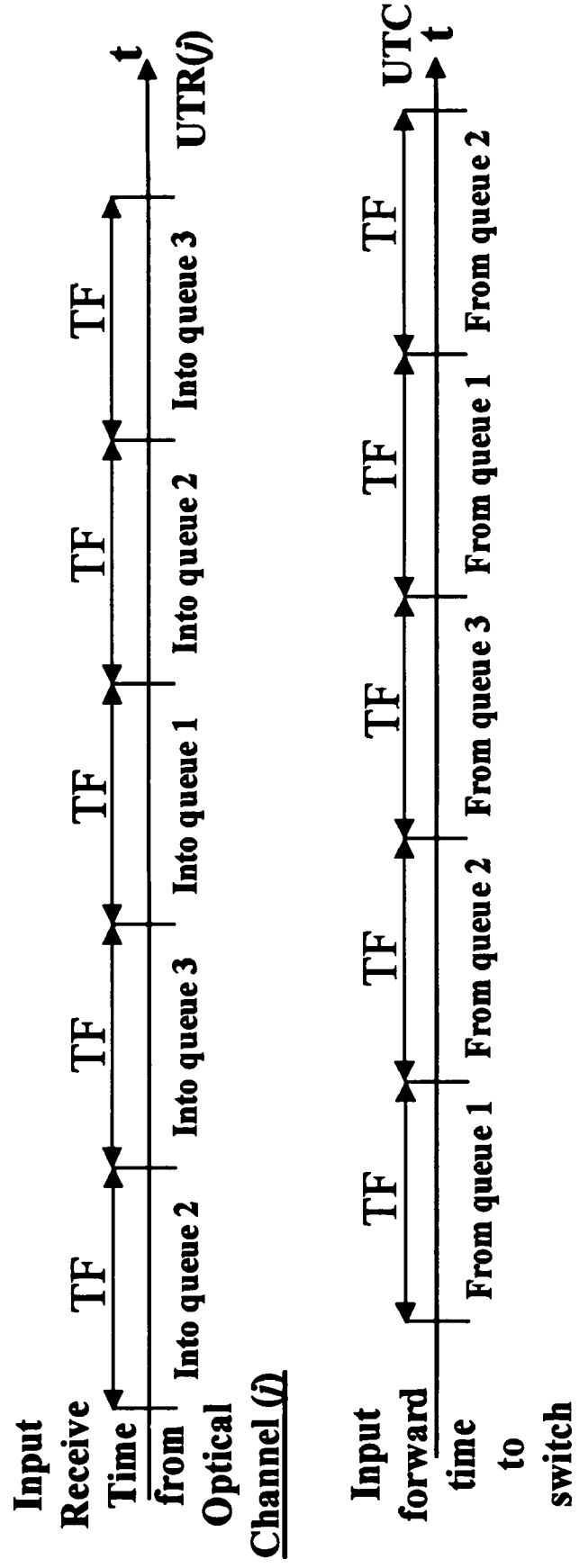
FIG. 29 is a timing diagram of the alignment subsystem operation responsive to CTR and the serial link unique time reference (UTR)

The switch controller 13030 is responsible for changing, responsive to the CTR, the configurations of the WDM DMUX 10040, alignment subsystem 10100, tunable laser 10200, and WDM MUX 10050, in FIG. 1A, responsive to the CTR and Unique Time Reference (UTR) The UTR is described in more details in the specifications of FIG. 7 and FIG. 29. The WDM DMUXes 10040, alignment subsystems 10100, tunable lasers 10200, and WDM MUXes 10050, are controlled by the switch controller 13030 through four bidirectional control lines 13031, 13032, 13033, and 13034, respectively. Each of the four control lines provides configuration information from the switch controller 13030 to the WDM DMUXes 10040, alignment subsystems 10100, tunable lasers 10200, and WDM MUXes 10050, respectively; and via the four bidirectional control lines 13031, 13032, 13033, and 13034, the switch controller 13030 receives various status and control information from the WDM DMUXes 10040, alignment subsystems 10100, tunable lasers 10200, and WDM MUXes 10050, respectively. In a possible embodiment the switch controller 13030 receives the UTR corresponding to an input channel through the bidirectional control signal 13032 from the corresponding alignment subsystem 10100.

With reference to FIG. 1A, the topology of the interconnection lines 10030 between each of the tunable lasers 10200 and a respective one of the WDM MUXes 10050, determines the route of the data units received on each wavelength from each input 10010. For example, data units received on a first selected wavelength of input 1 10010 which is de-multiplexed by the WDM DMUX 10040 on its output line 1 (1,1) are going to be transmitted by the respective first tunable laser 10200 on output 1 10020. This is a consequence of the fact that the respective first tunable laser 10200 is connected via a first one of the connection lines 10030 to input line (1,1) of the WDM MUX 1 10050 that is coupled to output 1 10020.

Instead, with reference to FIG. 1A, data units received on a second selected wavelength of input 1 10010 which is de-multiplexed by the WDM DMUX 10040 on its output linej (1,j) are going to be transmitted by the respective second tunable laser 10200 on outputj 10020. This is a consequence of the fact that the respective second tunable laser 10200 is connected via a second one of the connection lines 10030 to input line (1,1) of the WDM MUX j 10050 that is coupled to output j 10020.

In other words, the wavelength over which data units are carried on an input link 10010 determines the output 10020 on which those data units will be forwarded. The wavelength on which the data units are transmitted by the tunable laser 10200 coupled to the input 10010 and wavelength from which they are received determines the routing in the switching system 10000 coupled to the selected output 10020.

FIG. 7A shows the interconnection between two tunable laser-based switching systems 10000, wherein the output j of the upstream switching system U is coupled to the input i of the downstream switching system D. The WDM MUX J 10050 coupled to output j of switching system U combines all the wavelengths received through the interconnection lines 10030 from the respective ones of the plurality of tunable lasers (not shown in FIG. 7A) comprised in switching system U.

Each of the wavelengths multiplexed by WDM MUX j 10050 in switching system U is then de-multiplexed from input i by WDM DMUX i 10040 of switching system D on a respective one of the output lines 10410 (i,1) through (i,16). The transported data units are aligned to the common time reference and then transmitted by a corresponding tunable laser 10200 over a corresponding connection line 10030 connected to a selected output (not shown in FIG. 7A) of switching system D.

In other words, the wavelength on which data units are transmitted on their respective connection line 10030 within the switching system U determines the WDM DMUX's output line 10410 on which the data units will be transferred to their respective alignment subsystem 10100 and tunable laser 10200 within switching system D and, ultimately, the switching system D's output the data units will reach.

Thus, data units carried by each wavelength on the interconnection optical link 10420 between the switching system U and the switching system D are switched by switching system D to a pre-defined output. Data units transmitted on a first selected wavelength of the interconnection optical link 10420 are transmitted by a selected one of the switching system U's tunable lasers on a corresponding connection line 10030. In other words, data units transmitted on a first selected wavelength of the interconnection optical link 10420 transit through a selected one of the switching system U's DWM MUX j 10050 (i,1) through (j,16). The switch architecture depicted in FIG. 1A shows that data units flowing through each of the WDM MUX 10050 inputs 10030 had previously received by a selected respective one of the switching system's 10000 inputs 10010. For example, data units flowing through input line 10030 (j,1) had previously been received on one of the wavelengths of input 1 10010.

Since the tunable lasers 10200 can change the wavelength on which they transmit for each time frame, during each time frame data units transmitted on a first selected wavelength of the interconnection optical link 10420 transit through a selected one of the switching system U's DWM MUX j 10050 (j,1) through (j,16).

FIG. 7B shows a timing diagram describing the origin of data units carried by the green wavelength of the optical link 10420 between switching system U and switching system D. The timing diagram shows the time frames TF of the UTR (Unique Time Reference) coupled to the optical link 10420. Data units received on each one of the time frames where switched to the output j of switching system U after having been received on a selected one of the inputs of switching system U. The mapping of the receiving input into output j during each specific time frame is pre-defined and repeats itself every time cycle or super cycle.

FIG. 7C shows a timing diagram describing the origin of data units carried by the red wavelength on the optical link 10420 between switching system U and switching system D.

The timing diagram shows the time frames TV of the UTR (Unique Time Reference, see below specification of FIG. 4) coupled to the optical link 10420. Data units received on each one of the time frames where switched to the output j of switching system U after having been received on a selected one of the inputs of switching system U. The mapping of the receiving input onto output j during each specific time frame is pre-defined and repeats every time cycle or super cycle.

As shown by the timing diagrams in FIG. 7B and FIG. 7C, with the switch architecture depicted in FIG. 1A, data units carried over different wavelengths during the same time frame on the link 10420 between switching system U and switching system D had been received by switching system U from different inputs 10010. In alternative embodiments, data units received by switching system U from the same input 10010 on a plurality of wavelengths are transmitted on a plurality of wavelengths of the same output 10020 during the same time frame. One possible such embodiment is realized through a different configuration of the interconnection lines 10030 within the switching system 10000 depicted in FIG. 1A. A possible implementation realizes the interconnection lines 10030 through a programmable cross connect 10510 so that the configuration of the interconnections between tunable lasers 10200 and WDM MUXes 10050—i.e., outputs 10020—can be changed during the operation of the switching system (see FIG. 8A). Another possible implementation features a number of wavelengths on each input 10010 larger than the number of inputs 10010. This configuration allows data units form a plurality of wavelengths of the same input 10010 to be switched to and forwarded from the same output 10020 during the same time frame, wherein data units received on different wavelengths are transmitted on the output 10020 over different wavelengths. The programmable cross connect 10510 can be implemented in either electronic technology or optical technology.

FIG. 4 depicts the block diagram of a possible embodiment of an alignment subsystem 10100 comprising an alignment scheduling controller 10110 responsive to the common time reference (CTR) 002, a 1-to-k selector 10150 responsive to the Select-in signal 10120, a plurality of (sub)-time frame queues 1550, and a k-to-1 selector 10140 responsive to the Select-out signal 10130.

The alignment subsystem 10100 aligns data units received over the corresponding wavelength j of the corresponding input i 10010 to the CTR. With reference to FIG. 1, data units received from wavelength j of the corresponding input i 10010 are transferred form the WDM DMUX 10040 coupled to input i to the corresponding one of the alignment subsystems 10100 coupled to wavelength j through data line 10160 (i,j).

The wavelengths of a single optical link connected to an input 10010 of the switching system 10000 in FIG. 1 has a unique time reference (UTR-i), as shown in FIG. 29, that is independent of the CTR 002, also shown in FIG. 29. In the example in FIG. 4, the TF duration deployed on wavelength j of input i is TFi_j. Time frames of the common time reference and the UTR-i are possibly divided in sub-time frames of duration subTF.

Between successive super cycles, time cycles, TFs and sub-time frames (subTFs) of the UTR-i there can be explicit or implicit delimiters. Explicit delimiters can be realized by one of a plurality of different methods. There can be a different delimiter control word to signal the beginning of a new TF (i.e., a time frame delimiter—TFD), time cycle (i.e., a time cycle delimiter—TCD) and super cycle (i.e., a super cycle delimiter—SCD). The delimiter control word can be included in the stream of bits or symbols transmitted at the physical level, e.g., with an 8B/10B encoding. The explicit delimiter signaling can be realized by the SONET/SDH path overhead field that was designed to carry control, signaling and management information. Alternatively, the explicit delimiter signaling can be embedded in the PPP, HDLC, IP header, or in any protocol header exchanged over the communications links between switches. An implicit delimiter can be realized by measuring the UTR-i time with respect to the CTR. An alternative way of implementing an implicit delimiter is by counting the number of bytes from an explicit delimiter.

By using the above mentioned delimiters, the alignment scheduling controller 10110 is capable of devising the UTR-i from the information received from input line 10160.

A plurality of buffer queues 1550 are part of each alignment subsystem 10100, wherein data units received on the input line 10160 are stored in a respective one of the buffer queues during each one of the UTR-i time frames. In an alternative embodiment, data units received on the input line 10160 are stored in a respective one of the buffer queues during each one of the UTR-i sub-time frames.

The alignment scheduling controller 10110 logically maps, for each of the (UTR-i) time frames or subTFs, the respective incoming wavelength coupled to the input line 10160 to selected buffer queues 1550, and logically maps, for each of the CTR TFs or subTFs, selected ones of the plurality of buffer queues 1550 to the output line 10165.

The Select-in signal 10120 generated by the alignment scheduling controller 10110 determines which of the buffers 1550 will receive data units from the input line 10160 at every time frame TFi_j or sub-time frame subTF as it is defined by the (UTR-i). The selection by the 1-to-k selector 10150 is responsive to the Select-in signal 10120 received from the alignment scheduling controller 10110. The buffer queues 1550 in the alignment subsystem 10100 for each time frame or sub-time frame can be filled with data units in arbitrary order to an arbitrary level, prior to output.

The alignment scheduling controller 10110 further provides for coupling of selected ones of the time frame or sub-time frame queues 1550 to the output line 10165, for transfer of the respective stored data units during the respective CTR time frames or sub-time frames. This operation is performed by the k-to-1 selector 10140 responsive to the Select-out signal 10130, as shown in FIG. 4.

For each of the subTFs of the CTR, only one of the buffer queues 1550 is associated with the outgoing line 10165. For each of the subTFs of the UTR-i, only one of the buffer queues is associated with the incoming line 10160. In the preferred embodiment, the same buffer queue 1550 is never associated at the same time with both the incoming line 10160 and the outgoing line 10165. In an alternative embodiment, a same queue 1550 can be associated to both the incoming line 10160 and the outgoing line 10165 at the same time.

According to the preferred embodiment, the alignment subsystem 10100 must have 3 TF queues 1550 in order to operate on a time frame basis—i.e., in order for the respective switching system 10000 to be capable of switching the content of entire time frames—according to the immediate forwarding principle. The alignment subsystem 10100 must have more than 3 TF queues 1550 in order to operate on a time frame basis—i.e., in order for the respective switching system 10000 to be capable of switching the content of entire time frames —according to the non-immediate forwarding method. In the non-immediate forwarding method a data unit is delayed in the alignment subsystem 10000 until there is an available time frame for it to be switched and to be transmitted on the selected one of the outgoing wavelengths of the selected one of the outputs 10020. In this method, the delay is increased, i.e., more time frames may be needed to get from input 10160 to output 10165 of the alignment subsystem 10100. The non-immediate forwarding method adds flexibility to the scheduling process of fractional lambda pipes.

The alignment subsystem 10100 must have 3•TFi_j/subTF subTF queues 1550 in order to operate on a sub-time frame basis-i.e., i order for the respective switching system 10000 to be capable of switching the content of sub-time frames—according to the immediate forwarding principle. The alignment subsystem 10100 must have more than 3•TFi_j/subTF subTF queues 1550 in order to operate on a sub-time frame basis—i.e., in order for the respective switching system 10000 to be capable of switching the content of sub-time frames—according to the non-immediate forwarding method. In the non-immediate forwarding method a data unit is delayed in the alignment subsystem 10000 until there is an available sub-time frame for it to be switched and to be transmitted on the selected one of the outgoing wavelengths of the selected one of the outputs 10020. In this method, the delay is increased, i.e., more sub-time frames may be needed to get from input 10160 to output 10165 of the alignment subsystem 10100.

The alignment scheduling controller 10110 generates the Select-in 10120 and the Select-out 10130 signals responsive to the content of a queue mapping table 10115 that is pre-computed and downloaded in the alignment scheduling controller 10110 by the switch controller 13030 through the control line 13032. The queue mapping table 10115 contains:

(i) for each time frame or sub-time frame of the UTR-i the (sub)time frame queue 1550 in which data units arriving from the input line 10160 are to be stored;

(ii) for each time frame or sub-time frame of the CTR the (sub)time frame queue 1550 from which data units are to be retrieved for transmission on the output line 10165.

In other words, the queue mapping table 10115 contains a mapping between each UTR-i time frame or sub-time frame and a selected one of the (sub)TF queues 1550 and between each CTR time frame or sub-time frame and a selected one of the (sub)TF queues 1550. The above mentioned mappings are calculated and written in the queue mapping table 10115 of each one of the alignment scheduling controllers 10110 by the switch controller 13030; the switch controller 13030 calculates time frame schedules on all the wavelengths of all the inputs 10010 and outputs 10020.

In a possible embodiment, the above mentioned mapping repeats each time cycle or each super cycle.

An alternative embodiment features a centralized alignment scheduling controller that generates the Select-in 10120 and Select-out 10130 signals for all the alignment subsystems 10100 in the respective switching system 10000. In such an embodiment the centralized alignment scheduling controller can be implemented within the switch controller 13030.

FIG. 5A shows the block diagram of a possible implementation of a time driven tunable laser 10200 comprising a tunable laser (TL) scheduling controller 10220 responsive to the CTR 002 and a control signal 13033 from the switch controller, and a tunable laser transmitter 10230 responsive to a color control signal 10240.

The tunable laser 10200 receives data units from its input line 10165 and a tunable laser transmitter 10230 transmits them on a selected wavelength over the output line 10030. The selected wavelength used by the tunable laser transmitter 10230 is determined responsive to the color control signal 10240 generated by the TL scheduling controller 10220.

In a possible embodiment the color control signal 10220 selects a different wavelength for transmission of data units by the tunable laser transmitter 10230 during each time frame. FIG. 5B is a sample timing diagram describing the operation of a tunable laser transmitter 10230 in this embodiment. The timing diagram shows a sequence of CTR time frames TF, and, for each time frame, the wavelength used for transmission by the tunable laser transmitter 10230, wherein each wavelength is identified by the color (green, yellow, red, and blue) of the corresponding light beam.

FIG. 5C shows the implication of the choice of a selected wavelength on the routing of data units transmitted over the wavelength. Different wavelengths are routed to different outputs 10020 of the downstream switching system 10000 due to the interconnections between the output lines 10160 of the WDM DMUXes 10040 and the input lines 10030 of the WDM MUXes 10050 of each output 10020, as shown in the switch architecture depicted in FIG. 1A. For example, in a possible configuration data units transmitted by the tunable laser 10200 on the green wavelength during a first selected time frame are going to be routed to and—during a second selected time frame, wherein the second time frame follows the first one—forwarded through output 1 of the next switching system 10000 traversed by the data units, i.e., the switching system 10000 connected to the output 10020 with to the output line 10030 of the tunable laser 10200 is coupled. Instead, data units transmitted by the tunable laser 10200 on the yellow wavelength during a third selected time frame are going to be routed to and—during a fourth selected time frame, wherein the fourth time frame follows the third one—forwarded through output 3 of the next switching system 10000 traversed by the data units, i.e., the switching system 10000 connected to the output 10020 to which the output line 10030 of the tunable laser 10200 is coupled.

In an alternative embodiment the color control signal 10220 selects a different wavelength for transmission of data units by the tunable laser transmitter 10230 during each sub-time frame.

The TL scheduling controller 10220 generates the color control signal 10240 responsive to both the CTR 002 and the content of a wavelength mapping table 10210. The wavelength mapping table 10210 contains the mapping between each CTR time frame or sub-time frame and the wavelength to be used by the tunable laser transmitter 10230 for transmitting during the selected CTR time frame or sub-time frame.

The above mentioned mapping is calculated and written in the wavelength mapping table 10210 of each one of the TL scheduling controllers 10220 by the switch controller 13030 through control signal 13033. The switch controller 13030 calculates time frame or sub-time frame schedules on all the wavelengths of all the inputs 10010 and outputs 10020.

In a possible embodiment, the above mentioned mapping repeats each time cycle or each super cycle.

An alternative embodiment features a centralized TL scheduling controller that generates the color control signal 10240 for all the tunable lasers 10200 in the respective switching system 10000. In such an embodiment the centralized TL scheduling controller can be implemented within the switch controller 13030.

FIG. 6A is the architecture of an alternative embodiment of a time driven switch based on tunable lasers 10200. The switching system 10000 presented in FIG. 6A has a plurality of inputs 10010 and outputs 10020, each one consisting of an optical link with a plurality of wavelengths. The switching system 10000 in FIG. 6A comprises a switch controller 13030 a plurality of optical alignment subsystems 10900, WDM (wavelength division multiplexing) de-multiplexers (DMUX) 10040, tunable lasers 10200, and WDM multiplexers (MUXes) 10050, and connection lines 10030 between each one of the tunable lasers 10200 and a respective one of the WDM multiplexers 10050. The WDM DMUXes 10040, optical alignment subsystems 10900, tunable lasers 10200, and WDM MUXes 10050, are controlled by the switch controller 13030, responsive to the CTR 002, through four bi-directional control lines 13031, 13737, 13033, and 13034, respectively. Each of the four control lines provides configuration information from the switch controller 13030 to the WDM DMUXes 10040, optical alignment subsystems 10900, tunable lasers 10200, and WDM MUXes 10050; and via the four bi-directional control lines 13031, 13737, 13033, and 13034, the switch controller 13030 receives various status and control information from the WDM DMUXes 10040, alignment subsystems 10100, tunable lasers 10200, and WDM MUXes 10050.

A respective one of the plurality of the optical alignment subsystems 10900 is associated to each respective one of the inputs 10010. The Optical Alignment Subsystem 10900 aligns to the common time reference (CTR) data units received over the plurality of wavelengths of its respective input 10010.

Each WDM DMUX 10040 divides each of the wavelengths received from the corresponding optical input line 10320 and directs it to a corresponding tunable laser 10200. In the configuration shown in FIG. 6A the switching system 10000 comprises 16 inputs 10010 and outputs 10020, each one comprising 16 wavelengths. Consequently, each WDM DMUX 10040 has 16 output lines 10310 and each WDM MUX 10050 has 16 input lines 10030. For example, WDM DMUX i has 16 output lines (i,1) through (i,16) and WDM MUX j has 16 input lines (j,1) through (j,16).

The switch in FIG. 6A performs PF that is realized in two operational phases, as shown in FIG. 6B. Data units belonging to a whole time frame received from each of the optical channels during Phase 1 are switched through the switch in Phase 2. In a possible embodiment, if Phase 1 begins in time frame t, Phase 2 takes place in time frame t+1. In another embodiment, if Phase 1 ends in time frame t, Phase 2 takes place in time frame t+1. The 2 phase operation ensures that data units received from the various optical channels are aligned with the CIR before being switched. Phase 2 can be performed during either the time frame immediately following Phase 1, during time frame t+1—immediate forwarding operation, or at a later time frame—non-immediate forwarding operation.

During each time frame, the tunable laser 10200 in FIG. 6A receives from its respective line 10310 data units to be switched during the current time frame and transmits them over a preselected wavelength on the connection line 10030 to its respective one of the WDM MUXes 10050.

Each WDM MUX 10050 multiplexes the wavelengths received on its respective input lines 10030 from the tunable lasers 10200 and transmits them on its respective output 10020. For example, WDM MUX j 10050 multiplexes on output j 10020 the wavelengths received on the connection lines 10030 (j,1) through (j,16).

As shown in FIG. 5A, each tunable laser 10200 can change the wavelength on which it transmits for each time frame according to the information stored in a (sub)-time frame table 10210 downloaded in the tunable laser controller 10220 by the switch controller 13030 through control line 13033. By properly building the (sub)-time frame tables 10210 for all the tunable lasers 10200 of the switch in FIG. 6A, the switch controller 13030 ensures that no more than one among the plurality of tunable lasers 10200 connected to the same WDM MUX 10050 transmits over the same wavelength during the same time frame.

The topology of the interconnections 10030 between each tunable laser 10200 and a respective one of the WDM MUXes 10050, determines the route of the data units received on each wavelength from each input 10010. For example, with reference to FIG. 6A, the data units received on a first selected wavelength of input 1 10010 which is de-multiplexed by the WDM DMUX 10040 on its output line 1 (1,1) are going to be transmitted by the respective first tunable laser 10200 on output l 10020. This is a consequence of the fact that the respective first tunable laser 10200 is connected via a first one of the connection lines 10030 to input line (1,1) of the WDM MUX 1 10050 that is coupled to output 1 10020. Instead, with reference to FIG. 6A, data units received on a second selected wavelength of input 1 10010 which is de-multiplexed by the WDM DMUX 10040 on its output line j (1,j) are going to be transmitted by the respective second tunable laser 10200 on output j 10020. This is a consequence of the fact that the respective second tunable laser 10200 is connected via a second one of the connection lines 10030 to input line (j,1) of the WDM MUX j 10050 that is coupled to output j 10020.

In other words, the first wavelength over which data units are carried on a selected input link 10010 determines the selected output 10020 on which those data units will be forwarded. The second wavelength on which the data units are transmitted by the tunable laser 10200 coupled to the selected input 10010 and first wavelength from which they are received determines the routing in the switching system 10000 coupled to the selected output 10020.

FIG. 12 shows the block diagram of an optical alignment subsystem 10900 deployed in the embodiment of a tunable laser-based time driven switch 10000 depicted in FIG. 6A. The optical alignment subsystem 10900 in FIG. 12 comprises a programmable delay system 10930 that delays the optical signal from the input 10010 responsive to the adjust delay control signal 10940, a delay controller 10990 comprised of a delineation controller 10920 responsible to devise the unique time reference (UTR) associated to input 10010 and an optical alignment controller 10910 responsible for determining, responsive to the CTR 002 and the UTR-i 10950, the delay needed to align to the CTR data units received from the input 10010. The optical alignment controller 10910 exchanges control information (i.e., configuration and state information) with the switch controller 13030 through bi-directional control line 13737.

Time frames on the input 10010 are aligned to the unique time reference (UTR) associated to the respective optical communication link i—UTR-i. The programmable delay system 10930 delays the optical signal received from the input 10010 in a way that time frames coupled to data units carried by the optical signal on the outgoing optical link 10320 are aligned to the common time reference (CTR). The programmable delay system 10930 can be realized, for example, through an optical delay line with multiple tap points (shown in FIG. 34A), or through a fiber delay line comprising a plurality of fibers of different length (shown in FIG. 34B), or according to one of the embodiments presented below in this disclosure (see FIG. 27, 31, and 32).

The amount of delay that the programmable delay system 10930 has to introduce depends on the phase difference between the CTR and UTR-i. This phase difference can change over time as a result of changes in the propagation delay over the communications link coupled to the input i 10010. According to the architecture shown in FIG. 12, the optical alignment controller 10910 compares the UTR-i and the CTR to determine the proper delay that the programmable delay system 10930 should introduce. The optical alignment controller 10910 adjusts the delay introduced by the programmable delay system 10930 through the adjust delay control signal 10940. The optical alignment controller 10910 receives the CTR signal 002 from an external device, such as, for example, a GPS receiver board, and the UTR-I through the UTR-i line 10950 the from the delineation controller 10920.

The delineation controller 10920 devises the UTR-i directly from the optical signal received through the input 10010. One way for the delineation controller 10920 to devise the UTR-i is through implicit or explicit time frame delimiters embedded in the flow of data units. Explicit delimiters can be realized by one of a plurality of different methods. There can be a different delimiter control word to signal the beginning of a new TF (i.e., a time frame delimiter—TFD), time cycle (i.e., a time cycle delimiter—TCD) and super cycle (i.e., a super cycle delimiter—SCD). The explicit delimiter signaling can be realized by the SONET/SDH path overhead field that was design to carry control, signaling and management information. An implicit delimiter can be realized by measuring the UTR-i time with respect to the CTR. An alternative way of implementing an implicit delimiter is by counting the number of bytes from an explicit delimiter.

Alternatively, time frame delineation can be based on time frame delimiter in the optical signal carried on the communications link coupled to input i. A possible embodiment of time frame delimiter consists of dedicating one of the wavelengths of the communications link for transmission of the delimiter. The delineation controller 10920 detects the delimiters on the dedicated wavelength and devises the UTR-i. In an alternative embodiment the time frame delimiter are realized by introducing a gap, i.e., a period of dark, in the optical signal on the boundary between two adjacent time frames, as shown in FIG. 33. In other words, for each time frame, after having transmitted all the data units belonging to the time frame, the laser transmitter of each wavelength is turned off before starting transmitting data units belonging to the next time frame, as shown by the example in FIG. 33. The delineation controller 10920 detects the gaps on at least one of the wavelengths of the input 10010 and uses the derived timing information to devise the link's UTR.

Figure 30:
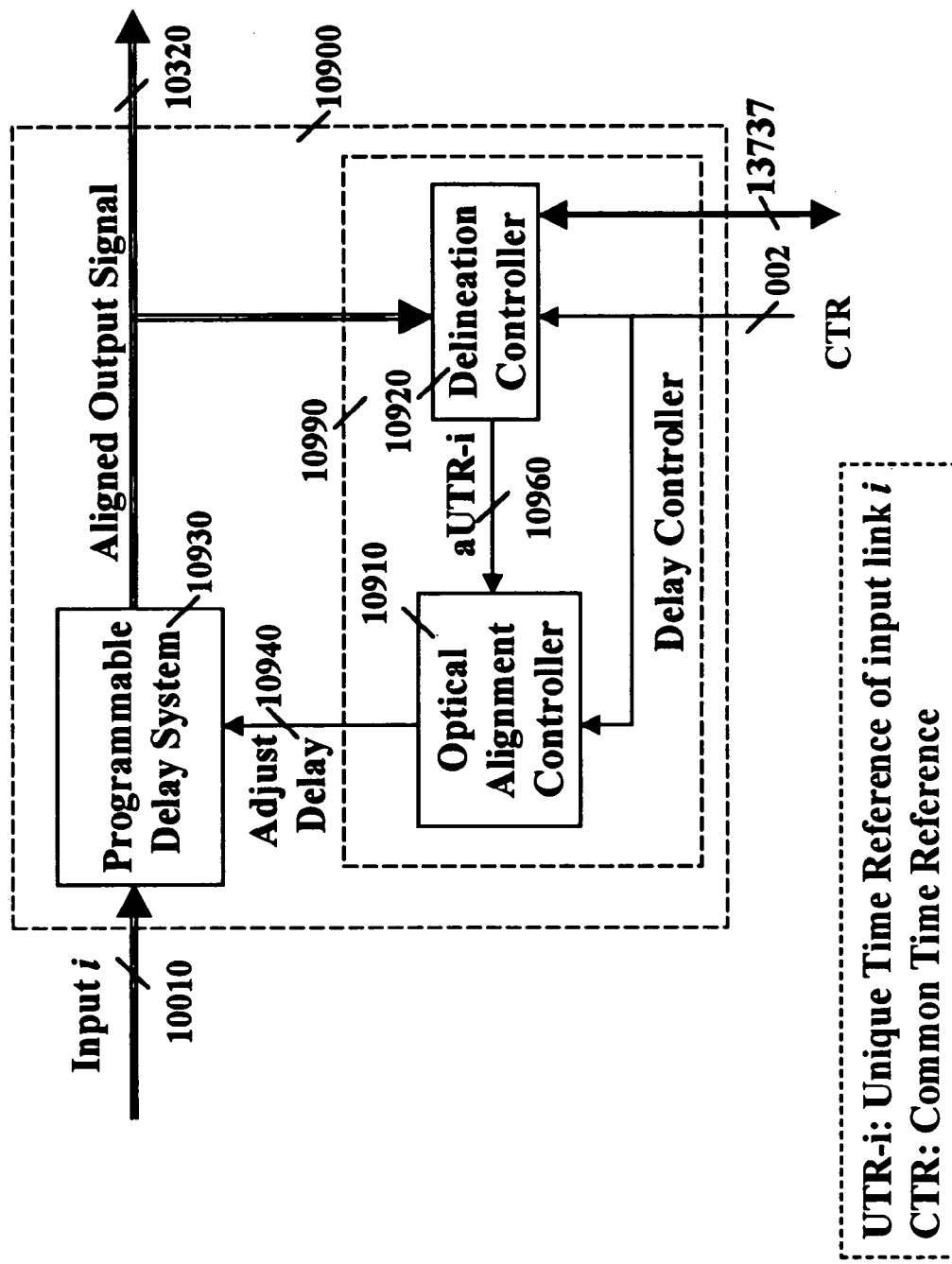
FIG. 30 shows a possible configuration of an all-optical interface that dynamically adjusts the delay on an incoming optical signal with an optical programmable delay system.

FIG. 30 shows a second possible embodiment of optical alignment subsystem 10900 based on an programmable delay system 10930 and comprising a delay controller 10990 further comprised of an optical alignment controller 10910 and a delineation controller 10920. The programmable delay system 10930 delays the optical signal from the input 10010 responsive to the adjust delay control signal 10940. The delineation controller 10920 responsible to devise the aligned unique time reference (aUTR-i) 10960 associated to outgoing optical link 10320 corresponding to input i 10010. The optical alignment controller 10910 is responsible for determining, responsive to the CTR 002 and the aUTR-i 10960, the delay needed to align to the CTR data units received from the input 10010, i.e., to align the aUTR-i 10960 and the CTR 002.

Time frames on the input 10010 are aligned to the unique time reference (UTR-i) associated to the respective optical communication link I—UTR-i. The programmable delay system 10930 delays the optical signal received from the input 10010 in a way that time frames associated to data units carried by the aligned output signal on the outgoing optical link 10320 constituting the aUTR-i, are aligned to the common time reference (CTR). The programmable delay system 10930 can be realized, for example, through an optical delay line with multiple tap points (a.k.a. serial optical delay line), or through a fiber delay line comprising a plurality of fibers of different length (a.k.a. parallel optical delay line), or according to one of the embodiments presented below in this disclosure (see FIG. 27, 31, and 32).

The amount of delay that the programmable delay system 10930 has to introduce depends on the phase difference between the CTR and-aUTR-i, i.e., ultimately the phase difference between CTR and UTR-i. This phase difference can change over time as a result of changes in the propagation delay over the communications link coupled to the input i 10010. The optical alignment controller 10910 compares the aUTR-i and the CTR to determine the proper delay that the programmable delay system 10930 should introduce in order to keep the aUTR-i signal 10960 aligned to the CTR 002. The optical alignment controller 10910 adjusts the delay introduced by the programmable delay system 10930 through the adjust delay control signal 10940. The optical alignment controller 10910 receives the CTR signal 002 from an external device, such as, for example, a GPS receiver board, and the aUTR-i through the aUTR-i line 10960 from the delineation controller 10920.

The delineation controller 10920 devises the aUTR-i directly from the aligned output signal transported by the outgoing optical link 10320. One way for the delineation controller 10920 to devise the aUTR-i is through implicit or explicit time frame delimiters embedded in the flow of data units Explicit delimiters can be realized by one of a plurality of different methods. There can be a different delimiter control word to signal the beginning of a new Th (i.e., a time frame delimiter—IIFD), time cycle (i.e., a time cycle delimiter—TCD) and super cycle (i.e., a super cycle delimiter—SCD). The explicit delimiter signaling can be realized by the SONET/SDH path overhead field that was design to carry control, signaling and management information. An implicit delimiter can be realized by measuring the UTR-i time with respect to the CTR. An alternative way of implementing an implicit delimiter is by counting the number of bytes from an explicit delimiter.

Alternatively, time frame delineation can be based on time frame delimiters in the optical signal carried on the communications link coupled to input i. A possible embodiment of time frame delimiter consists of dedicating one of the wavelengths of the communications link for transmission of the delimiter. The delineation controller 10920 detects the delimiters on the dedicated wavelength and devises the aUTR-i. In an alternative embodiment time frame delimiters are realized by introducing a gap, i.e., a period of dark, in the optical signal on the boundary between two adjacent time frames, as shown in FIG. 33. In other words, for each time frame, after having transmitted all the data units belonging to the time frame, the laser transmitter of each wavelength is turned off before starting transmitting data units belonging to the next time frame, as shown in FIG. 33. The delineation controller 10920 detects the gaps on at least one of the wavelengths of the outgoing optical link 10320 and uses the derived timing information to devise the aUTR-i corresponding to input link i 10010.

FIG. 8A depicts the architecture of an alternative embodiment of a tunable laser-based time driven switch 10000 in which an optical cross connect 10510 is used for interconnecting the plurality of tunable lasers 10200 with their respective ones of the WDM MUXes 10050.

The output 10520 of each tunable laser 10200 is coupled to an input line of the optical cross connect 10510. The inputs 10530 of each WDM MUX are coupled to an output of the optical cross connect 10510. The optical cross connect 10510 is implemented using optical switching technologies such as, but not limited to, micro electro-mechanical system (MEMS) mirrors, bubbles, holography. The optical cross connect 10510 is capable of changing the connections between the inputs 10520 and the outputs 10530 responsive to a control signal 13035 from the switch controller 13030. The WDM DMUXes 10040, optical alignment subsystems 10900, tunable lasers 10200, optical cross connect 10510, and WDM MUXes 10050, are controlled by the switch controller 13030, responsive to the CTR 002, through five bi-directional control lines 13031, 13737, 13033, 13035, and 13034, respectively. Each of the five control lines provides configuration information from the switch controller 13030 to the WDM DMUXes 10040, optical alignment subsystems 10900, tunable lasers 10200, optical cross connect 10510, and WDM MUX 10050; and via the five bidirectional control lines 13031, 13737, 13033, 13035, and 13034, the switch controller 13030 receives various status and control information from the WDM DMUXes 10040, optical alignment subsystems 10900, tunable lasers 10200, optical cross connect 13035, and WDM MUXes 10050, respectively.

Figure 25:
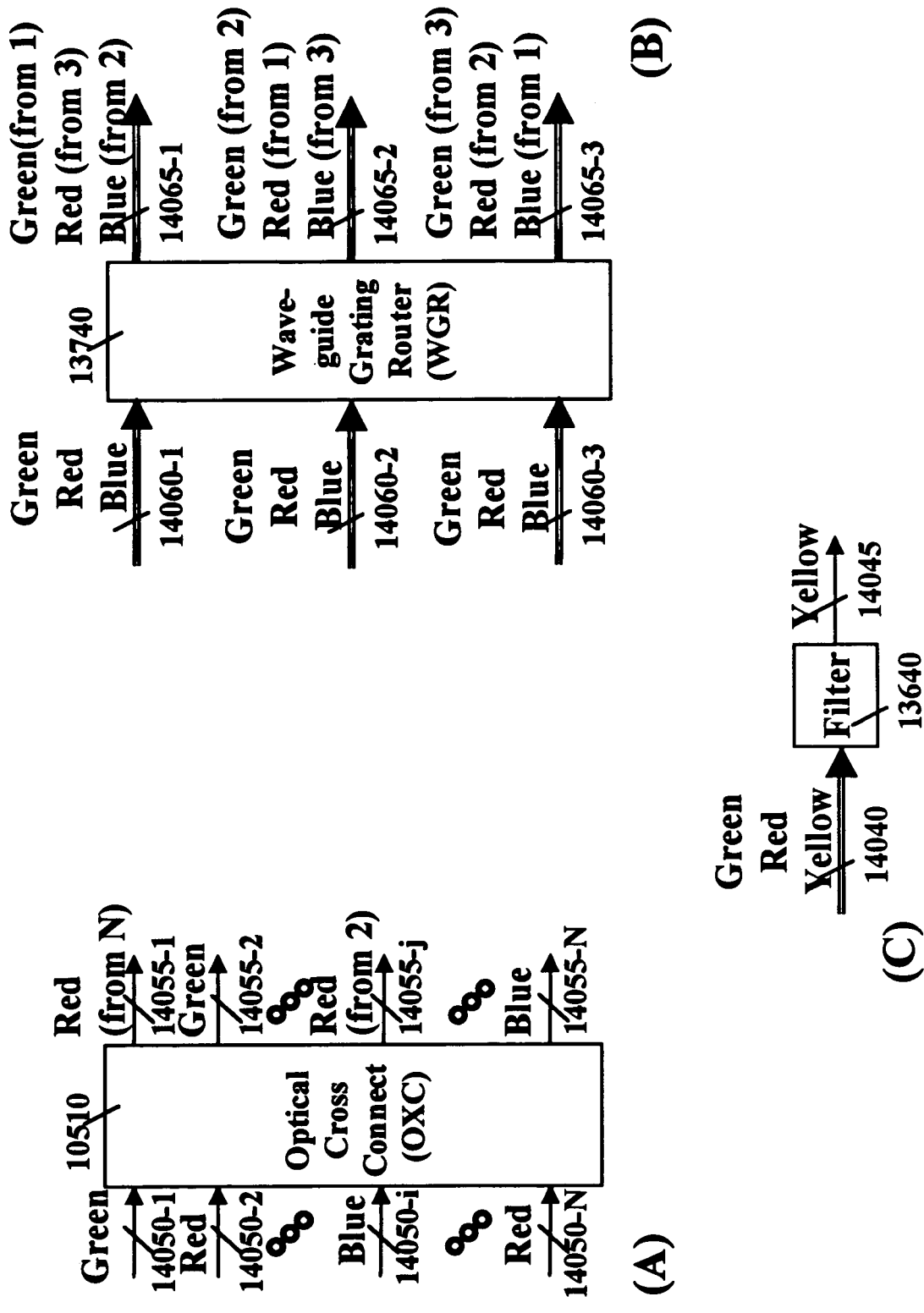
FIG. 25A exemplifies an operation of an optical cross-connect (OXC)
FIG. 25B exemplifies an operation of a waveguide grating router (WGR)
FIG. 25C exemplifies an operation of an optical filter.

FIG. 25A shows the operation of a possible embodiment of optical cross connect (OXC) 10510 having a plurality of inputs 14050-1 through 14050-N and a plurality of outputs 14055-1 through 14055-N. In the embodiment shown in FIG. 25A each input 14050-1 through 14050-N and each output 14055-1 through 14055-N carries an optical signal comprising a single wavelength. The OXC switches the optical signal on any input line 14050-1 through 14050-N to any output line 14055-1 through 14055-N. For example, with reference to FIG. 25A, the green wavelength received through input 14050-1 is switched to and forwarded through output line 14055-2.

The switch in FIG. 8A performs PF that is realized in two operational phases, as shown in FIG. 8B. Data units belonging to a whole time frame received from each of the optical channels during Phase 1 are switched through the switch in Phase 2. In a possible embodiment, if Phase 1 begins in time frame t, Phase 2 takes place in time frame t+1. In another embodiment, if Phase 1 ends in time frame t, Phase 2 takes place in time frame t+1. The 2 phase operation ensures that data units received from the various optical channels are aligned with the CTR before being switched. Phase 2 can be performed during either the time frame immediately following Phase 1, during time frame t+1—immediate forwarding operation, or at a later time frame—non-immediate forwarding operation.

The input/output connection configuration within the OXC 10510 in the switching system 10000 depicted in FIG. 8A determines how many of the plurality of wavelengths of each input 10010 are routed to each one of the plurality of the outputs 10020. In a possible implementation, the switch controller 13030, responsive to the CTR 002 signal, changes the configuration of the OXC 10510, through a control signal 13035, with a time scale much larger than a time frame. In a possible implementation, the switch controller 13030 changes the configuration of the OXC 10510 responsive to the CTR 002 signal so that the configuration is changed between two adjacent time frame, wherein in the previous one of the two time frames a first OXC configuration is deployed and the second one of the two time frames a second OXC configuration is deployed. In a possible embodiment, the change of configuration takes place during the idle time between time frames shown in FIG. 33. In an alternative embodiment, the configuration change takes a time comprising a plurality of time frames; for the time in which the OXC configuration is changed the respective selected tunable lasers 10200 do not transmit on the input lines 10520 that are involved in the configuration change. The selected tunable lasers 10200 resume transmitting at the beginning of the time frame following the time frame during which the OXC configuration change is completed.

In a possible embodiment, the OXC configuration changes reoccur periodically with a period which is an integer multiple of the time cycle or the super cycle.

In a possible implementation the number of wavelengths of each input 10010 is smaller than the number of inputs 10010. In another possible implementation the number of wavelengths of each input 10010 is larger than the number of inputs 10010.

In an alternative implementation of the switching system 10000 shown in FIG. 8A an alignment subsystem 10100 such as the one depicted in FIG. 4 is coupled to each wavelength of the input 10010, as in the switch architecture presented in FIG. 1A, instead of having an optical alignment subsystem 10900 coupled to each input 10010, as in the switch architecture shown in FIG. 8A.

Figure 9:
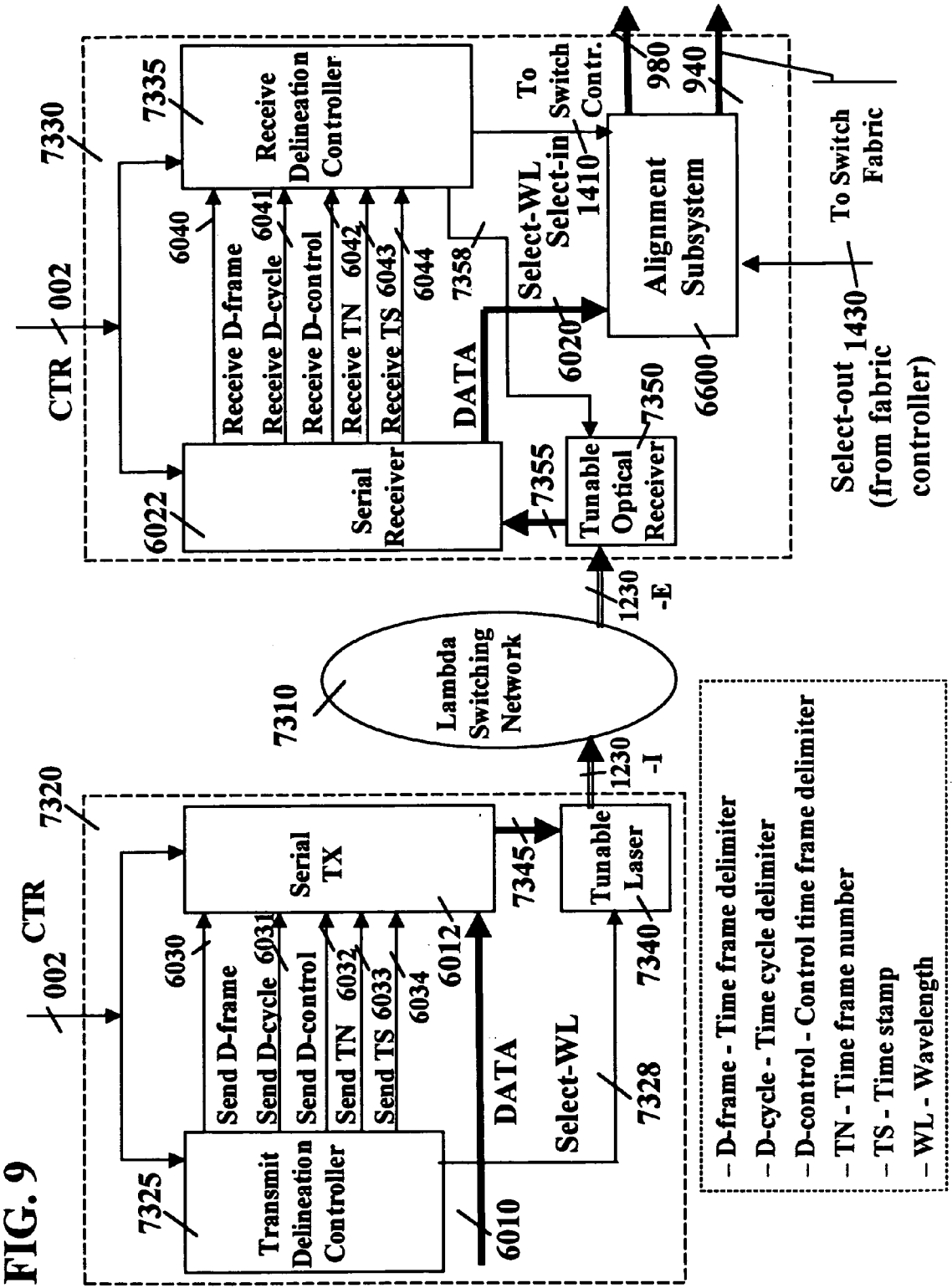
FIG. 9 shows a communications system responsive to the common time reference wherein data units are associated to a specific time frame, wherein such data units are transmitted over a specific wavelength across a Wavelength Division Multiplexing (WDM) network (or lambda switching network) whose network nodes (called wavelength routers or lambda routers) possibly route different wavelengths towards different destinations.

Transmission of data units responsive to a common time reference 002 can deploy multiple wavelengths-also called optical channels or lambdas-across a Wavelength Division Multiplexing (WDM) link and throughout a lambda routed network. FIG. 9 shows the architecture of a communications system responsive to the common time reference wherein data units are associated to a specific time frame or sub-time frame, wherein such data units are transmitted over a specific wavelength across a WDM network 7310 whose network nodes (called wavelength routers or lambda routers) possibly route different wavelengths towards different destinations. In other words, the lambda routing network 7310 couples an optical channel on an ingress link 1230-I with an optical channel (possibly the same optical channel if the lambda routing network 7310 does not have wavelength conversion capability) on a selected egress link 1230-E.

The transmission system in FIG. 9 couples data units from an output port 7320 to an input port 7330 through a communications network 7310 deploying lambda routing. Within the WDM communications network 7310 multiple optical channels are multiplexed over links among nodes; nodes, also called lambda routers, route different channels over different paths. The output port 7320 and the input port 7330 are connected to the communications network 7310 through WDM links 1230-I and 1230-E, respectively, comprising a plurality of optical channels.

The system receives a common time reference 002 and comprises a transmission delineation controller 7325source of delimiter signals-responsive to the CTR 002; a serial transmitter 6012, responsive to the delimiter signals 6030 through 6034 and the CTR 002 for sending the control signals and the data units over a line 7345 to a tunable laser 7340. The tunable laser 7340 transmits the bit stream received on line 7345 on the output link 1230-I on a selected optical channel responsive to the Select-WL signal 7328.

Figure 10:
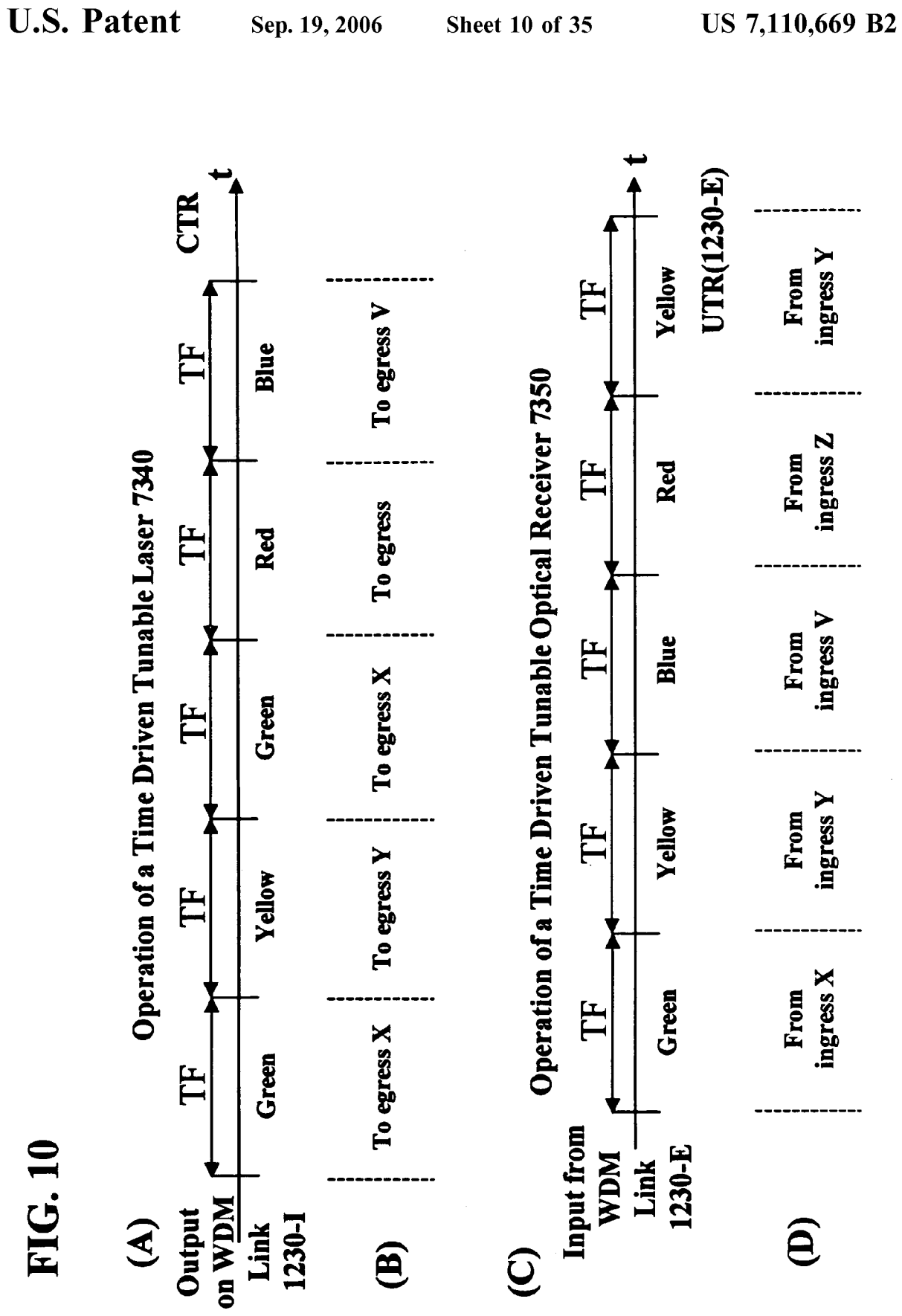
FIG. 10A is a timing diagram showing the wavelength used by the transmitting system in FIG. 9 during each time frame.
FIG. 10B shows a destination or egress point of the lambda switched network in FIG. 9 reached as a consequence of using a selected wavelength—as shown in FIG. 10A—during the corresponding time frame.
FIG. 10C is a timing diagram showing the wavelength used by the receiving system in FIG. 9 during each time frame.
FIG. 10D shows the source or ingress point of the lambda switched network in FIG. 9 from which data units are received as a consequence of using a selected wavelength—as shown in FIG. 10C—during the corresponding time frame.

FIG. 10A is a timing diagram of the operation of the time driven tunable laser 7340. The timing diagram shows a sequence of time frames TF of the common time reference (CTR) and the wavelength used by the time driven tunable laser 7340 for transmitting data during each of the time frames. FIG. 10B shows the effect of the selection of a specific wavelength when the output port 7320 and the input port 7330 of the transmission system in FIG. 9 are connected to a lambda switching network 7310. In fact the communications network 7310 routes different wavelengths entering the network from the same ingress point (e.g., the communications link 1230-I) to different egress points (among which, for example, the communications link 1230-E) of the communications network 7310. For example, data units transmitted during a first respective time frame over the green wavelength are routed by the communications network 7310 to the egress point X, while data units transmitted during a second respective time frame over the yellow wavelength are routed by the communications network 7310 to egress point Y.

The system depicted in FIG. 9 further comprises a tunable optical receiver 7350 that receives data through the input link 1230-E over a selected optical channel responsive to the Select-WL 7358. The received data stream is passed through line 7355 to a serial receiver 6022, responsive to the CTR 002. The serial receiver 6022 is coupled to a receive delineation controller 7335, responsive to the CTR 002, through delimiter signals 6040 through 6044. The input port 7330 in FIG. 9 further comprises an Alignment Subsystem 6600 for storing the data units received from the input link 1230-E while sorting them out according the time frame or sub-time frame during which they were sent out of the output port 7320.

FIG. 10C is a timing diagram of the operation of the time driven tunable optical receiver 7350 depicted in FIG. 9. The timing diagram in FIG. 10C shows a sequence of time frames TF of the unique time reference (UTR) of the corresponding communications link 1230-E and the wavelength used by the time driven tunable optical receiver 7350 for receiving data during each of the time frames. FIG. 10D shows the effect of the selection of a specific wavelength when the output port 7320 and the input port 7330 in FIG. 9 are connected to a lambda switching network 7310. The communications network 7310 can route different wavelengths entering the network from various ingress points (among which, for example, the communications link 1230-I) to one egress points (e.g., the communications link 1230-E) of the communications network 7310. For example, data units received during a first respective time frame over the green wavelength had been routed by the communications network 7310 from ingress point X, while data units received during a second respective time frame over the yellow wavelength had been routed by the communications network 7310 from ingress point Y.

The alignment subsystem 6600 in FIG. 9 receives data units over the data line 6020 from the serial receiver 6022. The data units that exit from the alignment subsystem 6600 are transferred to the switch fabric over its input lines 940. The control data units, namely the data units transmitted over the communications channel 920 during a control time frame, are transferred to the switch controller 13030 through line 980.

In FIG. 1, the Transmit Delineation Controller 6011, responsive to the CTR 002, generates control signals 6030 through 6034 to indicate to the serial transmitter (TX) 6012 to insert control information in the data flow.

The serial transmitter 6012 receives data units over line 6010 and transmits them on the communications channel 920. Responsive to the control signals 6030 through 6034 from the Transmit Delineation Controller 7325, the serial transmitter 6012 combines the data units to be transmitted on the communications channel 920 with control information such as time frame delimiters, time cycle delimiters, and time stamps according to at least one of the plurality of methods to encode such information in the data stream.

Upon receiving the data stream, the serial receiver 6022 on the receiving side of the communications channel 1230-E separates data units from control signals. The serial receiver 6022 outputs the received data units on the data line 6020 and notifies the receive delineation controller 7335 of the received control signals over the lines 6040 through 6044.

The Transmit Delineation Controller 7325, responsive to the CTR 002, generates control signals 6030 through 6034 to indicate the serial transmitter (TX) 6012 to insert control information in the data flow. The Transmit Delineation Controller 7325 generates the control signals 6030 through 6034 according to predefined operation principles that aim at providing a receiving input port to identify the boundaries of TFs and time cycles.

In addition, the Transmit Delineation Controller 7325 generates the Select-WL signal 7328 to indicate the Tunable Laser 7340 on which optical channel the data units belonging to the current time frame or sub-time frame should be transmitted through the link 1230-I at the ingress of the DWM network 7310. Whenever, according to the common time reference 002, a new time frame or sub-time frame is beginning, the Transmit Delineation Controller 7325 uses the Select-WL signal 7328 to select the optical channel on which the data units belonging to the current time frame or sub-time frame are going to be transmitted. The optical channel on which the data units are being transmitted determines the egress link 1230-E from which such data units are going to exit the lambda routing network 7310 and ultimately the input port 7330 on which they are going to be received.

The Receive Delineation Controller 7335 receives the control signals 6040 through 6044 and handles them according to operation principles that aim at identifying the boundaries of TFs and time cycles.

In addition, the Receive Delineation Controller 7335 generates the Select-WL signal 7358 to indicate the Tunable Optical Receiver 7350 on which optical channel the data units belonging to the current time frame or sub-time frame should be received through the link 1230-E at the egress of the DWM network 7310. Whenever, according to the control signals 6040 through 6044, a new UTR (Unique Time Reference) time frame or sub-time frame is beginning, the Transmit Delineation Controller 7325 uses the Select-WL signal 7358 to select the optical channel on which the data units belonging to the current time frame or sub-time frame are going to be received. The data stream received over the selected optical channel are passed to the serial receiver through the line 7355.

In an alternative embodiment, the input port 7330 comprises a fixed receiver (instead of a tunable one 7350) or the tunable optical receiver 7350 is kept tuned on the same wavelength. In this embodiment the lambda switching network 7310 provides a wavelength merging service, i.e., a selected wavelength of an egress WDM link 1230-E carries data units transmitted on the selected wavelength from different ingress points (among which, possibly, the WDM link 1230-I) in different moments. In a possible embodiment, each of the time frames of the UfR of link 1230-E carry data units transmitted from a different ingress point, i.e., the wavelength received during each of the time frames of the link 1230-E ULR had been generated by a different respective output port 7320.

FIG. 11A depicts the architecture of an alternative embodiment of a tunable laser-based time driven switch 10000 in which an optical star coupler 10810 and a plurality of filter&laser modules 10840 are used for interconnecting the plurality of tunable lasers 10200 with their respective ones of the WDM MUXes 10050.

The switch 10000 in FIG. 11A performs PF that is realized in two operational phases, as shown in FIG. 11B. Data units belonging to a whole time frame received from each of the optical channels during Phase 1 are switched through the switch in Phase 2. In a possible embodiment, if Phase 1 begins in time frame t, Phase 2 takes place in time frame t+1. In another embodiment, if Phase 1 ends in time frame t, Phase 2 takes place in time frame t+1. The 2 phase operation ensures that data units received from the various optical channels are aligned with the CTR before being switched. Phase 2 can be performed during either the time frame immediately following Phase 1, during time frame t+1—immediate forwarding operation, or at a later time frame—non-immediate forwarding operation.

FIG. 24C shows the operation of a star coupler 13010 having a single optical input 14030 and a plurality of optical outputs 14035. The star coupler 13010 splits the optical signal, possibly comprising a plurality of wavelengths (a green, a red, and a yellow wavelength in the example depicted in FIG. 24C), entering through the input 14030 over all the outputs 14035. In a possible embodiment of star coupler 13010 the power of the input signal is split among the output signals. In the example in FIG. 24C, each of the optical signals on the outputs 14035 has one third of the power of the optical signal on the input 14030.

Figure 11:
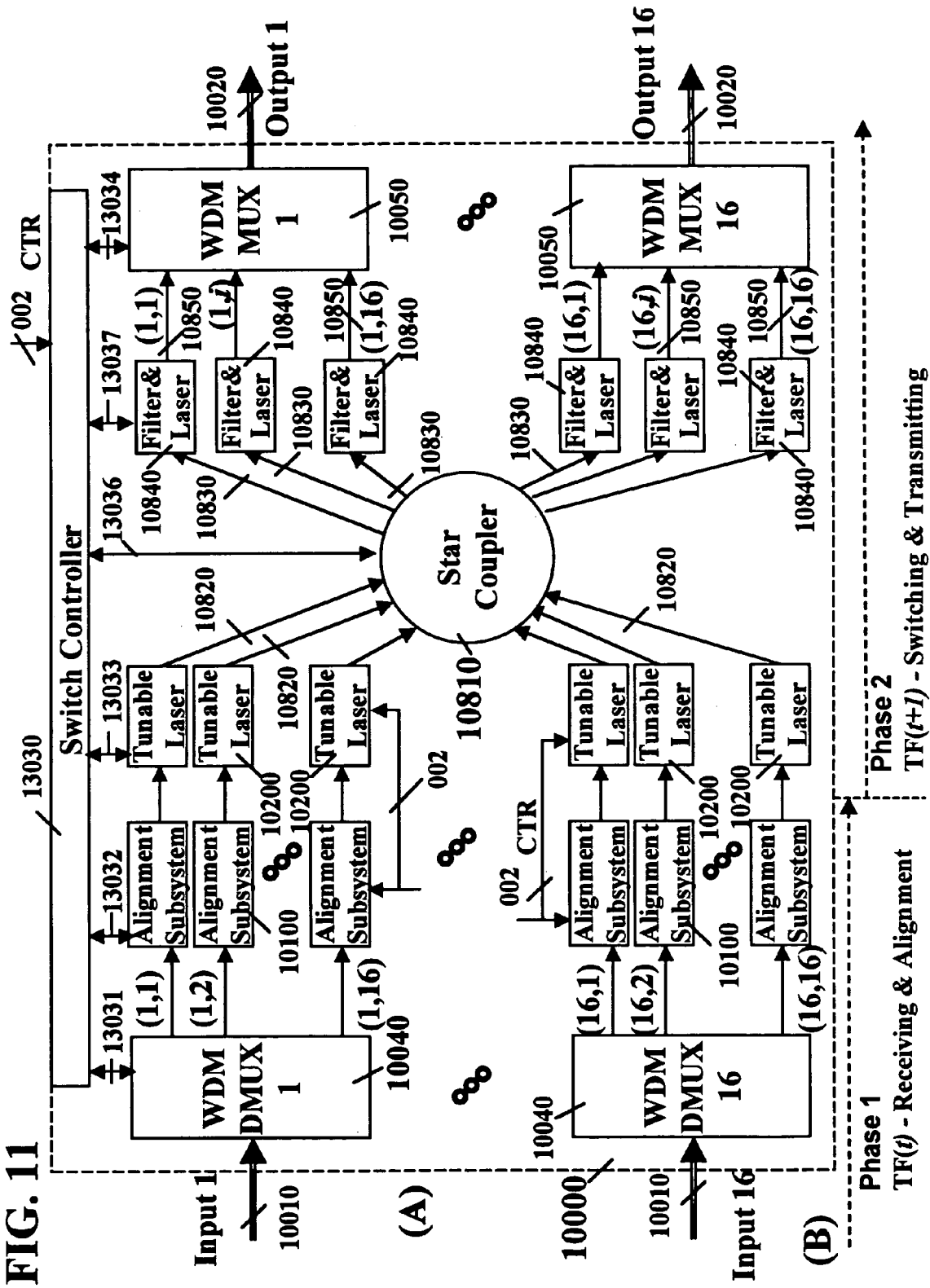
FIG. 11A is an architecture of a switching system responsive to the common time reference (CTR) based on tunable lasers, a star coupler, and optical filters, and comprising a switch controller, a plurality of WDM de-multiplexers, a plurality of alignment subsystems—one for each input channel—and a plurality of WDM multiplexers.
FIG. 11B is a timing diagram of a switching operation that is responsive to the common time reference with two pipeline forwarding phases: (i) receiving & alignment and (ii) switching & transmitting.

The output 10820 of each tunable laser 10200 in FIG. 11 is coupled to the star coupler 10810. The inputs 10830 of a plurality of filter&laser modules 10840 are coupled to the star coupler 10810. The inputs 10830 of a plurality of filter&laser modules 10840 are coupled to the star coupler 10810 so that the optical signal generated by each of the tunable lasers 10200 is received by each of the filter&laser modules 10840.

The filter&laser module 10840 separates a selected one of the wavelengths received through its input 10830 and transmits the data units carried on the selected wavelength, possibly using a different wavelength, on its output line 10850 coupled to a respective input of a respective one of the WDM MUXes 10050. In an alternative embodiment, a wavelength converter could be used instead of the filter&laser module 10840, the wavelength converter converting a first selected wavelength received through the star coupler 10810 into a second selected wavelength to be combined by the WDM MUX and transmitted on the output channel 10020.

In another possible embodiment, at least one of the outputs 10830 of the star coupler 10810 is directly coupled with a respective one of the inputs 10850 of the respective one of the WDM MUXes 10050.

The WDM DMUXes 10040, alignment subsystems 10100, tunable lasers 10200, star coupler 10810, filter&laser modules 10840, and WDM MUXes 10050, are controlled by the switch controller 13030, responsive to the CTR 002, through six bidirectional control lines 13031, 13032, 13033, 13036, 13037, and 13034, respectively. Each of the six control lines provides configuration information from the switch controller 13030 to the WDM DMUXes 10040, alignment subsystems 10100, tunable lasers 10200, star coupler 10810, filter&laser modules 10840, and WDM MUXes 10050; and via the six bidirectional control lines 13031, 13032, 13033, 13036, 13037, and 13034, the switch controller 13030 receives various status and control information from the WDM DMUXes 10040, alignment subsystems 10100, tunable lasers 10200, star coupler 10810, filter&laser modules 10840, and WDM MUXes 10050.

According to the architecture depicted in FIG. 11A, the wavelength used by each of the plurality of tunable lasers 10200 for transmitting determines the output link 10020 and wavelength on it that is going to carry data units to the next switching system 10000. During each time frame, each tunable laser 10200 uses a pre-selected wavelength for transmitting data units retrieved from its respective alignment subsystem 10100. Wavelengths used by different tunable lasers 10200 during the same time frame are different, i.e., the same wavelength is not used by more than one tunable laser 10200 during the same time frame. In order to be able to switch data units from any of the channels on any of the inputs 10010 to any of the channels to any of the outputs 10020, each tunable laser 10200 must be able to generate at least 256wavelengths. Specific implementations can use a smaller number of wavelengths per tunable laser 10200, which imposes some limits on the possible input/output connections.

Data units transmitted on a selected wavelength are received by a relative one of the filter&laser modules 10840. The system&laser module 10840 comprises a filter to separate the selected wavelength from the plurality of wavelengths carried by its input line 10830, a receiver to receive data units carried by the wavelength and a laser to transmit them on a selected wavelength on the output line 10850. In an alternative implementation the system&laser module 10840 comprises a filter and a wavelength converter implemented in any other way than by an optical receiver and a laser transmitter.

In an alternative implementation, the filter&laser module 10840 comprises a tunable filter and receiver that are able to separate and receive data units carried by a selected one of a plurality of wavelengths. In this embodiment, the filter&laser module 10840 is tuned responsive to the control signal 13037, and ultimately to the CTR, on a different wavelength during each time frame. As a consequence, multicast services can be implemented by the time driven switch 10000, whereas data units transmitted through the star coupler 10810 on a wavelength during a specific time frame by a selected tunable laser 10200 are received concurrently by a plurality of filter&laser modules 10840, possibly connected to a plurality of WDM MUXes 10050—i.e., a plurality of outputs 10020—and forwarded on a plurality of wavelengths through a plurality of outputs 10020.

In a possible implementation, each tunable laser is capable of generating a number of wavelengths equaling the total number of wavelengths of all the inputs 10010. For example, in the configuration depicted in FIG. 11A, each tunable laser 10200 is capable of generating 16·16=256 different wavelengths. In an alternative implementation, each tunable laser is capable of generating a number of wavelengths smaller than the total number of wavelengths of all the inputs 10010. In an alternative implementation, each tunable laser is capable of generating a number of wavelengths greater than the total number of wavelengths of all the inputs 10010.

In a possible implementation the number of wavelengths of each input 10010 is smaller than the number of inputs 10010. In another possible implementation the number of wavelengths of each input 10010 is greater than the number of inputs 10010.

In an alternative implementation of the switching system 10000 shown in FIG. 11A an optical alignment subsystem 10900 such as the one depicted in FIG. 12 is coupled to each input 10010, instead of having an alignment subsystem 10100 coupled to each channel of each input 10010. In a possible embodiment of an all-optical switch, the aforementioned optical alignment subsystems 10900 are deployed together with wavelength converters replacing the filter&laser modules 10840 and the tunable lasers 10200.

Figure 13:
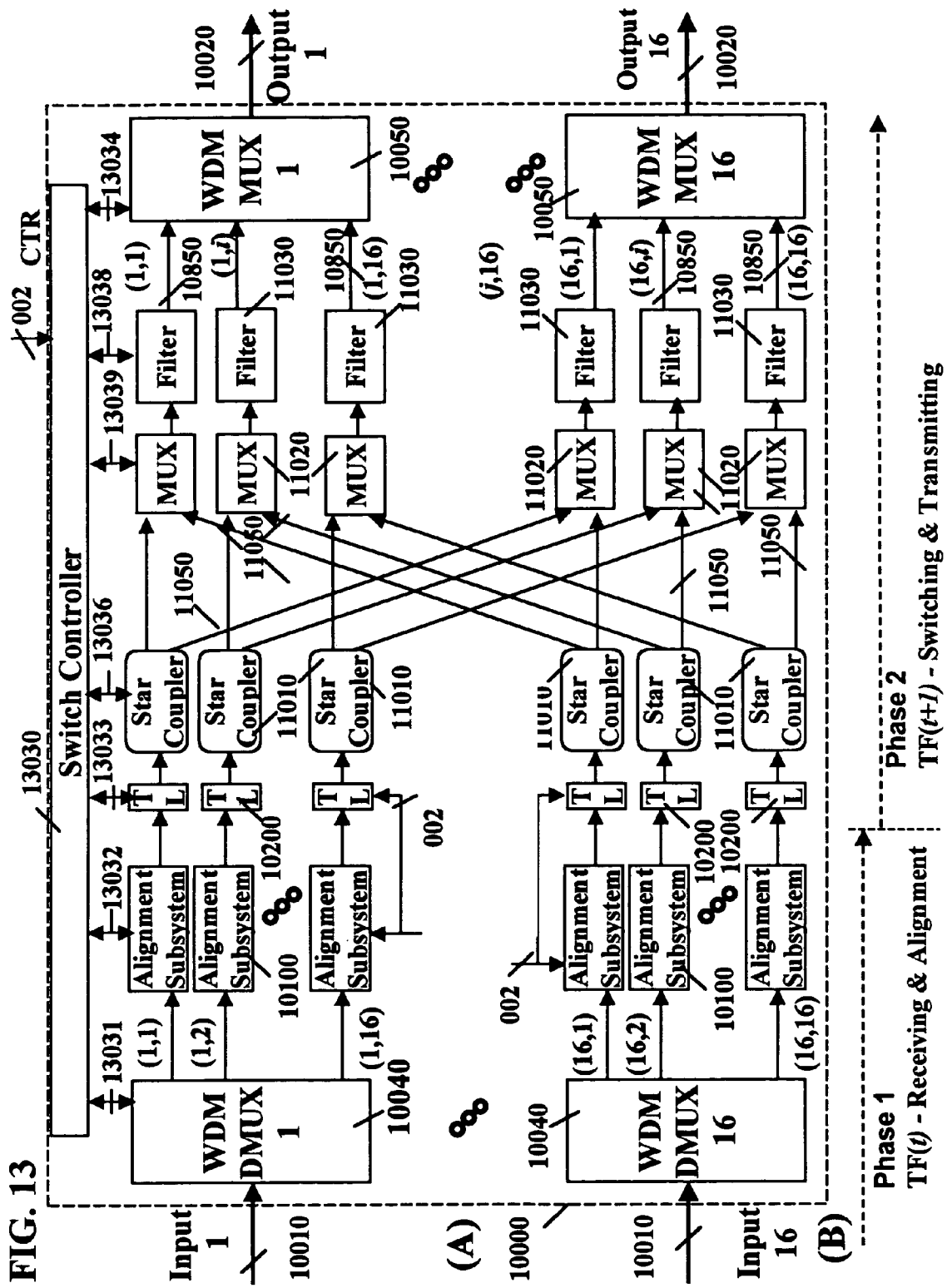
FIG. 13A is an architecture of a switching system responsive to the common time reference (CTR) based on tunable lasers (TL), a plurality of star couplers, optical multiplexers (MUXes), optical filters, alignment subsystems—one for each input channel—and comprising a switch controller, a plurality of WDM de-multiplexers (DMUXes), and a plurality of WDM multiplexers (MUXes)
FIG. 13B is a timing diagram of a switching operation that is responsive to the common time reference with two pipeline forwarding phases: (i) receiving & alignment and (ii) switching & transmitting.

FIG. 13A depicts the architecture of an alternative embodiment of a tunable laser-based time driven switch 10000 in which a plurality of star couplers 11010, optical multiplexers 11020, and filters 11030—one for each channel—are used for interconnecting the plurality of tunable lasers 10200 with their respective ones of the WDM MUXes 10050 at the outputs 10020.

The output of each tunable laser 10200 is coupled to a corresponding star coupler 11010. Each star coupler 11010 has a plurality of outputs 11050, each connected to a respective one of the plurality of outputs 10020. Each of the output channels is coupled to an optical WDM multiplexer (MUX) 11020. Each such optical multiplexer 11020 is connected to a plurality of star couplers 11010, each input 11050 of the optical MUX coupled to a different input 10010. The optical MUX 11020 combines the wavelength signals from a plurality of inputs 10010 on a single connection to a filter 11030 that selects one of the wavelengths for transmission on the respective output link 10020. The selected wavelength is multiplexed by an optical WDM multiplexer 10050 with other 15 wavelengths before transmission on the output link 10050.

The coupling of tunable lasers 10200, star couplers 11010, MUXes 11020, and filters 11030 enables data units to be switched from any of the input channels to any of the output channels. Moreover, it enables data units form multiple channels on the same input 10010 to be switched to multiple channels of the same output 10020, during the same TF.

Each of the plurality of filters 11030 connected to the same output WDM MUX 10050 allows a single fixed wavelength to reach the corresponding WDM MUX 10050. The frequencies allowed by all the filters 11030 connected to the same WDM MUX 10050 are all different from each other. The frequencies allowed by the filters 11030 coupled to the same star coupler 11010, i.e., to the same TL 10200 and input channel, are all different from one another.

The switch in FIG. 13A performs PF that is realized in two operational phases, as shown in FIG. 13B. Data units belonging to a whole time frame received from each of the optical channels during Phase 1 are switched through the switch in Phase 2. In a possible embodiment, if Phase 1 begins in time frame t, Phase 2 takes place in time frame t+1. In another embodiment, if Phase 1 ends in time frame t, Phase 2 takes place in time frame t+1. The 2 phase operation ensures that data units received from the various optical channels are aligned with the CTR before being switched. Phase 2 can be performed during either the time frame immediately following Phase 1, during time frame t+1—immediate forwarding operation, or at a later time frame—non-immediate forwarding operation.

Each tunable laser 10200 in FIG. 13A changes the transmitting wavelength at each TF according to a predefined pattern that repeats each time cycle or super cycle. The wavelength to be used during each TF is chosen at the time of setting up a fractional lambda pipe (FLP). For each input channel, the wavelength used by the corresponding tunable laser (TL) 10200 determines the output 10020 on which the data units transmitted during the TF are going to be forwarded. In fact, since all the filters 11030 coupled to one TL 10200 are different, only one of the plurality of filters 11030 allows the wavelength generated by the TL 10200 to reach the corresponding WDM MUX 10050; i.e., the wavelength generated by each selected TL 10200 reaches only one WDM MUX 10050 to be multiplexed onto only one output 10020.

The WDM DMUXes 10040, alignment subsystems 10100, tunable lasers 10200, star couplers 11010, MUXes 11020, filters 11030, and WDM MUXes 10050, are controlled by the switch controller 13030, responsive to the CTR 002, through seven bi-directional control lines 13031, 13032, 13033, 13036, 13039, 13038, and 13034, respectively. Each of the seven control lines provides configuration information from the switch controller 13030 to the WDM DMUXes 10040, alignment subsystems 10100, tunable lasers 10200, and WDM MUXes 10050; and via the seven bi-directional control lines 13031, 13032, 13033, 13036, 13039, 13038, and 13034, the switch controller 13030 receives various status and control information from the WDM DMUXes 10040, alignment subsystems 10100, tunable lasers 10200, star couplers 11010, MUXes 11020, filters 11030, and WDM MUXes 10050.

The switching system 10000 embodiment presented in FIG. 13A requires each TL 10200 to be capable of generating a total of 16 different wavelengths, one for each one of the outputs 10020. Analogously, the embodiment in FIG. 13A requires 16 different filters 11030, one for each one of the outputs 10020, each different filter having a passband including one of 16 different wavelengths.

The switching system architecture depicted in FIG. 13A requires tunable lasers 10200 to operate with a smaller number of wavelengths than the switching system architecture depicted in FIG. 11A (16 wavelengths and 256 wavelengths, respectively). However, while the switching system in FIG. 11A is non-blocking—i.e., during each TF it is possible to transfer data units from any one of the input channels to any one of the idle output channels—, the switching system in FIG. 13A is blocking—during a TF it might not be possible to switch data units from a selected input channel to a specific output channel In an alternative embodiment, each TL 10200 and its corresponding star coupler 11010, is coupled to a subset of the output WDM MUXes 10050 through the lines 11050, WDM MUXes 11020, and filters 11030. Similarly, each of the MUXes 11020 is coupled to a subset of the inputs 10010 through the lines 11050. This configuration reduces the flexibility of the switching system 10000 by introducing constraints on the output channels on which data units received on each respective input channel can be forwarded. However, in this configuration each star coupler 11010 has a smaller number of output lines 11050 and, as a consequence, introduces a smaller attenuation between the input, i.e., the signal generated by the corresponding tunable laser 10200 and each output line 11050. Moreover, the number of wavelengths each TL 10200 is required to generate is smaller.

Multicasting can be achieved with an alternative embodiment of the architecture showed in FIG. 13A by deploying tunable filters, responsive to the CTR, instead of static filters 11030. During each time frame the passband of each tunable filter can be changed to include a different wavelength. This enables the data units transmitted by a TL 10200 through its corresponding star coupler 11010 to reach more than one output WDM MUX 10050 and to be forwarded on more than one output 10020.

In an alternative implementation of the switching system 10000 shown in FIG. 13A an optical alignment subsystem 10900 such as the one depicted in FIG. 12 is coupled to each input 10010, instead of having an alignment subsystem 10100 coupled to each channel of each input 10010. In a possible embodiment of an all-optical switch, the aforementioned optical alignment subsystems 10900 are deployed together with wavelength converters replacing the tunable lasers 10200.

Time Driven Tunable Wavelength Conversion-Based Switching with Common Time Reference in Advances in components for optical networking have led to the realization of dynamic optical switch fabrics— e.g., based among others on electromechanical micro mirrors, holographic techniques, bubbles—, tunable lasers, tunable receivers, wavelength converters, and tunable wavelength converters. The time required for changing the input/output configuration of dynamic optical switch fabrics is currently larger than the time required for changing the wavelength received by a tunable receiver, the wavelength transmitted by a tunable laser, and the wavelength emitted by a tunable wavelength converter. As a consequence, optical switch architectures based on tunable receivers, tunable lasers, and tunable wavelength converters, rather than optical switch fabrics, are appealing. The present disclosure describes a number of optical switch architectures based on wavelength conversion achieved through the deployment of at least one of tunable receivers, tunable lasers, and tunable wavelength converters.

Architectures based on tunable wavelength converters can be appealing especially because they can provide all-optical solutions for scenarios and applications in which similar architectures deploying electronic components fail to provide the needed scalability.

Figure 14:
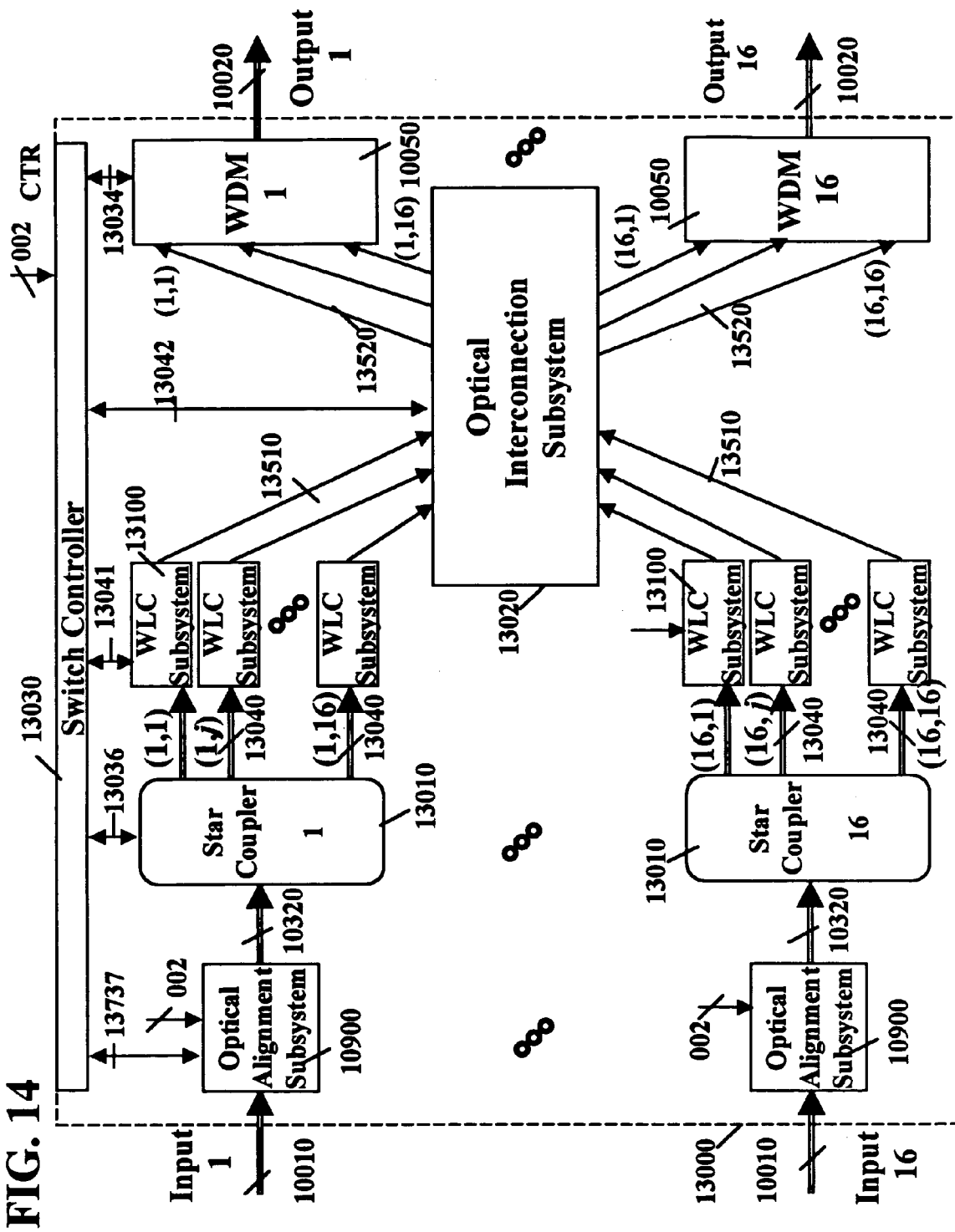
FIG. 14 is an architecture of a switching system responsive to the common time reference (CTR) based on wavelength conversion (WLC) subsystems and comprising a switch controller, a plurality of optical alignment subsystems—one for each input line—, a plurality of star couplers, a plurality of wavelength division multiplexers (WDMs), and an optical interconnection subsystem between WLC subsystems and WDMs.

FIG. 14 is the architecture of a possible embodiment of a time driven switch 13000 based on a wavelength conversion (WLC) subsystem 13100. The switching system 13000 presented in FIG. 14 has a plurality of inputs 10010 and outputs 10020, each one comprised of at least one optical link with a plurality of wavelengths. The switching system 13000 in FIG. 14 comprises a switch controller 13030, a plurality of optical alignment subsystems 10900, star couplers 13010, WLC subsystems 13100, and wavelength division multiplexers (WDMs) 10050, and an optical interconnection subsystem 13020 coupling selected ones of the WLC subsystems 13100 to at least one of the wavelength division multiplexers 10050.

An optical alignment subsystem 10900 is associated with each respective one of the inputs 10010. The optical alignment subsystem 10900 aligns to the common time reference (CTR) data units transported over the plurality of wavelengths of its respective input 10010.

A star coupler 13010 is associated with each input 10010. It forwards the signal received through its input 10010, i.e., all the wavelengths carried by the optical link coupled to its respective input 10010, on all of its output lines 13040 to a plurality of WLC subsystems 13100. In the embodiment presented in FIG. 14, the number of WLC subsystems 13100 connected to each star coupler 13010 is the same as the number of switch outputs 10020. An alternative embodiment comprises a number of WLC subsystems 13100 per star coupler 13010 smaller than the number of outputs 10020. Another alternative embodiment comprises a number of WLC subsystems 13100 per star coupler 13010 larger than the number of outputs 10020.

The optical alignment subsystems 10900, star couplers 13010, WLC subsystems 13100, optical interconnection subsystem 13020, and WDM MUXes 10050, are controlled by the switch controller 13030, responsive to the CTR 002, through five bidirectional control lines 13737, 13036, 13041, 13042, and 13034, respectively. Each of the five control lines provides configuration information from the switch controller 13030 to the optical alignment subsystems 10900, star couplers 13010, WLC subsystems 13100, optical interconnection subsystem 13020, and WDM MUXes 10050; and via the five bidirectional control lines 13737, 13036, 13041, 13042, and 13034, the switch controller 13030 receives various status and control information from the optical alignment subsystems 10900, star couplers 13010, WLC subsystems 13100, optical interconnection subsystem 13020, and WDM MUXes 10050.

Each WLC subsystem 13100 converts a specific wavelength, responsive to the CTR 002. FIG. 15A shows a possible embodiment of a WLC subsystem 13100 comprising a wavelength conversion (WLC) scheduling controller 13120 responsive to the CTR 002 and to a wavelength mapping table 13110 downloaded from the switch controller 13030 through the bidirectional control line 13041, and a tunable wavelength conversion subsystem 13150 responsive to a signal 13140 from the WLC scheduling controller 13120.

As shown by the switch architecture depicted in FIG. 14, the tunable wavelength conversion subsystem 13150 within the WLC subsystem 13100 in FIG. 15A is connected to a respective one of the output lines 13040 of a respective one of the star couplers 13010 from which the tunable wavelength conversion subsystem 13150 receives an optical signal comprising a plurality of wavelengths. During each time frame of the CTR the tunable wavelength conversion subsystem 13150 is tuned by the Color control signal 13140 to convert a first selected wavelength, i.e., color, into a second selected wavelength sent out on the output line 13510.

The second selected wavelength emitted on the output line 13510 of the tunable wavelength conversion subsystem 13150 as a result of the conversion of the first wavelength received on its input line 13040 carries the same information as the first wavelength.

In a possible embodiment the color control signal 13140 selects a different first wavelength for conversion by the tunable wavelength conversion subsystem 13150 during each time frame. In a possible embodiment the tunable wavelength conversion subsystem 13150 converts the first selected wavelength into a second fixed wavelength during each time frame. In an alternative embodiment the tunable wavelength conversion subsystem 13150 converts the first selected wavelength into a second wavelength that can be different during each time frame. FIG. 15B is a sample timing diagram describing the operation of the aforementioned alternative embodiment of tunable wavelength conversion subsystem 13150. The timing diagram shows a sequence of CTR time frames TF and for each time frame a first selected wavelength on data line 13040 being converted into a second selected wavelength emitted on data line 13510, wherein each wavelength is identified by the color (green, yellow, red, and blue) of the corresponding light beam. For example, in the leftmost time frame shown in the timing diagram depicted in FIG. 15B the green wavelength is converted into the blue wavelength, i.e., during the leftmost time frame the blue light beam on data line 13510 carries the same information as the green light beam on data line 13040.

In an alternative embodiment the color control signal 13140 selects a different wavelength for conversion by the tunable wavelength conversion subsystem 13150 during each sub-time frame.

Figure 15:
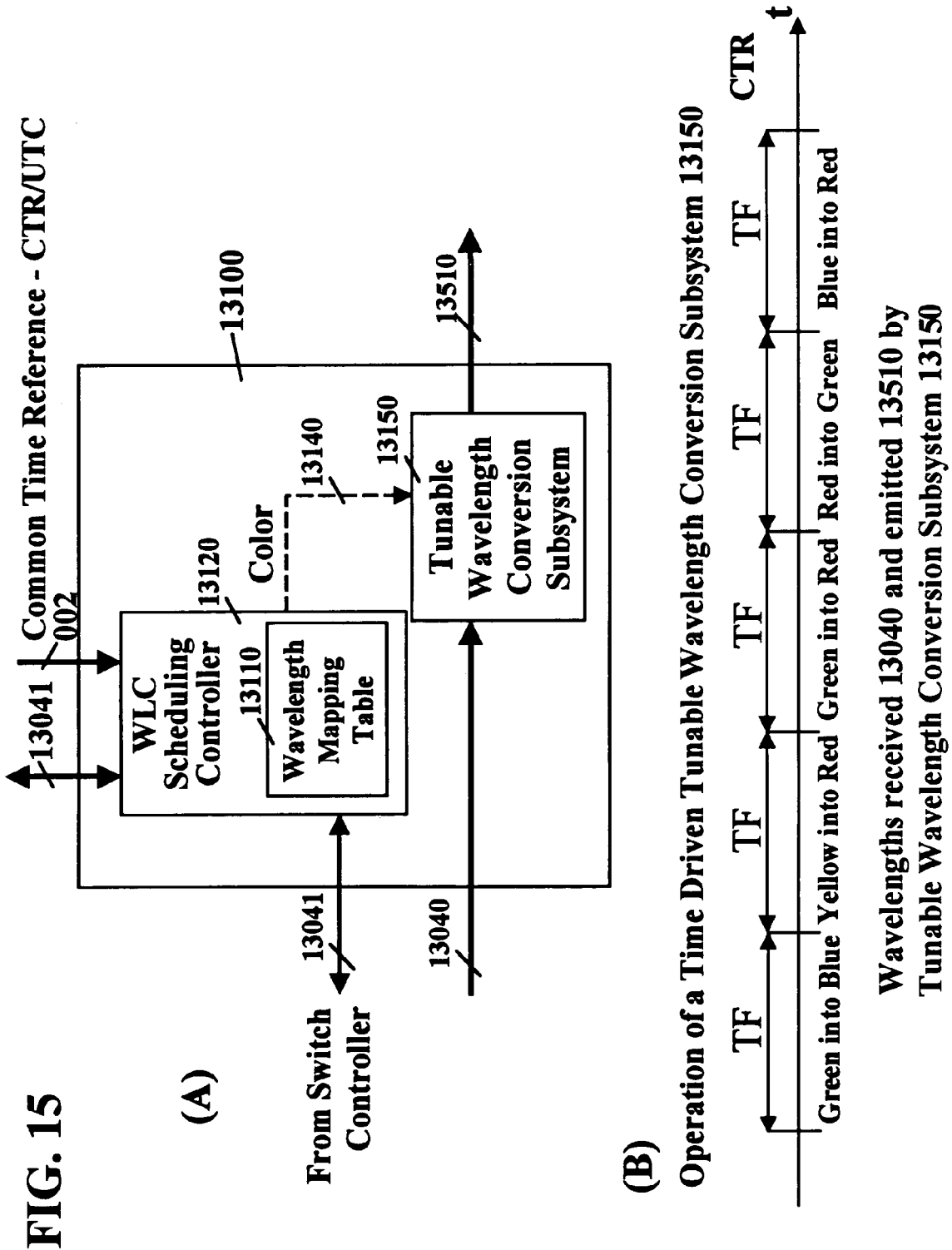
FIG. 15A is the block diagram of a wavelength conversion subsystem comprising a wavelength conversion (WLC) scheduling controller for changing the converted wavelength and possibly the emitted wavelength responsive to the common time reference and to a wavelength mapping table.
FIG. 15B is a timing diagram showing the wavelength received by the wavelength conversion subsystem during subsequent time frames.

The Color control signal 13140 is generated by the WLC scheduling controller 13120 according to the content of the wavelength mapping table 13110 that indicates the wavelength on which data units should be received during each TF. In a possible embodiment the wavelength mapping has a predefined pattern that is repeated every time cycle and super cycle. When the WLC subsystem 13100 in FIG. 15 is deployed in the architecture shown in FIG. 14, the mapping information contained in the wavelength mapping table 13110 determines the route within the switching system 13000 of the data units carried over the plurality of optical channels during each time frame. In a possible embodiment the content of the wavelength mapping table 13110 is updated whenever a FLP is created or torn down.

In a possible embodiment, the above mentioned mapping repeats each time cycle or each super cycle.

An alternative embodiment features a centralized WLC scheduling controller that generates the color control signal 13140 for all the tunable wavelength conversion subsystems 13100 in the respective switching system. In a possible implementation of such an embodiment the centralized WLC scheduling controller is within the switch controller 13030 depicted in FIG. 14.

Figure 19:
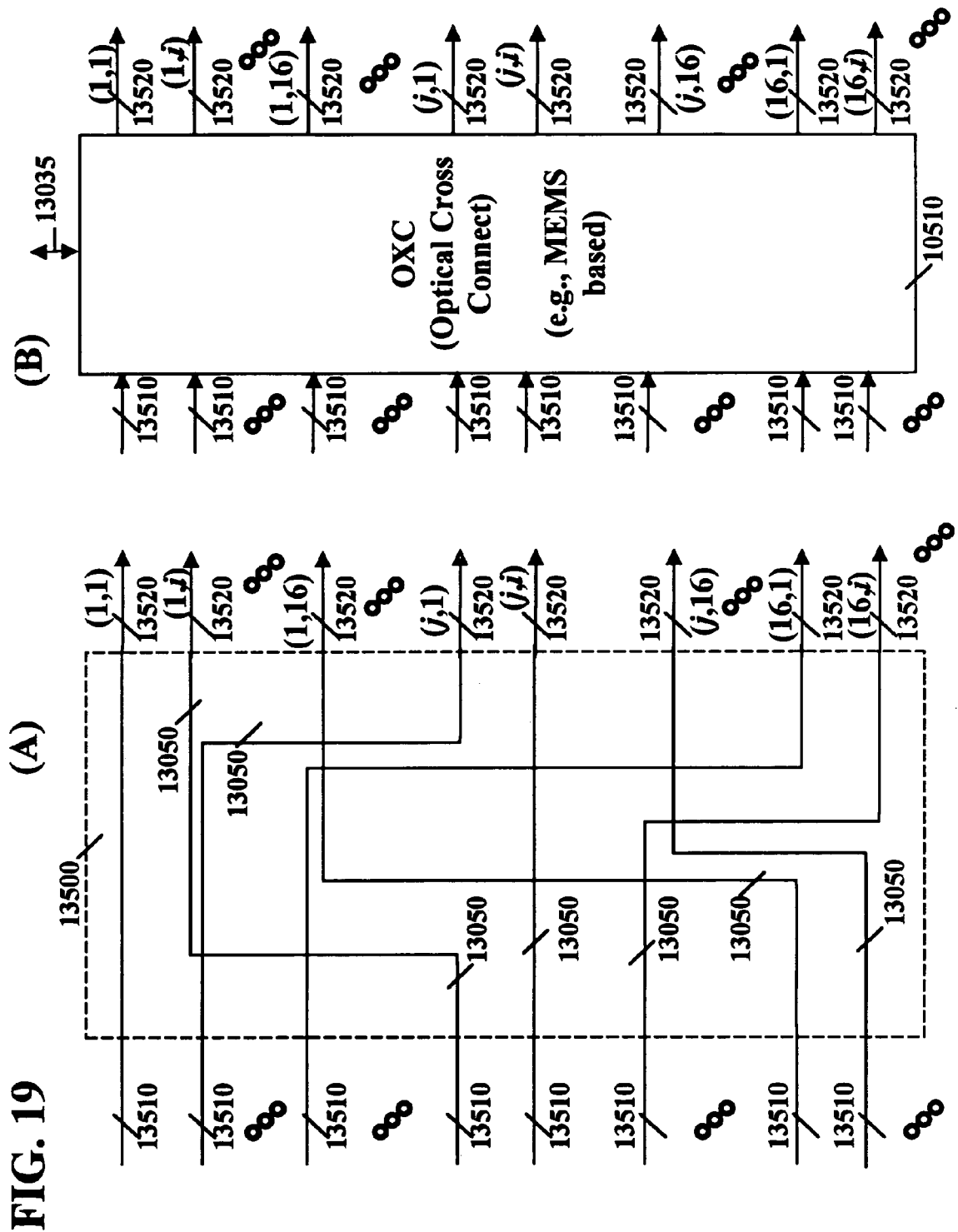
FIG. 19A depicts a possible embodiment of optical interconnection subsystem comprising a plurality of optical data lines between each input and a respective one of the outputs.
FIG. 19B depicts a possible embodiment of optical interconnection subsystem consisting in an optical cross connect (OXC) with a bidirectional control signal to control the connections between inputs and outputs of the OXC.

FIG. 19A shows a possible implementation 13500 of the optical interconnection subsystem 13020. When this optical interconnection subsystem 13500 is deployed in the architecture depicted in FIG. 14, each connection line 13050 within the optical interconnection subsystem 13500 couples the optical signal emitted by a respective WLC subsystem 13100 on data line 13510 with a fixed WDM multiplexer (MUX) 10050 associated to a fixed specific output 10020. In the embodiment presented in FIG. 14, each of the outputs 13040 of a star coupler 13010 is coupled, through a WLC subsystem 13100 and the connection within the optical interconnection subsystem 13500 to a different switch output 10020. Consequently, data units received through a switch input 10010 can be forwarded on any output 10020. However, due to the fixed connections between WLC subsystems 13100 and output WDMs 10050, during each time frame only data units carried on one wavelength on each input 10010 can be transferred to a given output 10020. In other words, it is not possible to transfer to the same output 10020 data units received on two different wavelengths carried on the same input fiber. In order to transfer data units carried on a first wavelength to a first output 10020, the WLC subsystem 13100 connected through its respective line 13510 to the WDM 10050 of the first output 10020 is to be tuned on the first wavelength.

FIG. 24B shows the operation of a WDM 10050 receiving a plurality of wavelengths, i.e., colors (green, red, and yellow in the example in FIG. 24B), on its respective inputs 14025. The WDM 10050 combines all of the wavelengths into a single optical signal comprising the plurality of wavelength onto its output 14020. In the example in FIG. 24B, the green wavelength received from the top input 14025, the red wavelength received from the middle input 14025, and the yellow wavelength received from the lower input 14025 are combined and emitted on the output 14020.

In the architecture depicted in FIG. 14 all the WLC subsystems 13100 connected to the same WDM 10050 emit a different wavelength. The WDM 10050 multiplexes on the same output fiber 10020 all the wavelengths received from its respective WLC subsystems 13100 through its respective lines 13520.

In a possible embodiment of WLC subsystem, the wavelength emitted on its output data line 13510 is fixed. Hence, in the embodiment of switching system 13000 as in FIG. 14 deploying the optical interconnection subsystem 13500 shown in FIG. 19A each wavelength on a switch output 10020 is uniquely associated to a specific one of the switch inputs 10010. Consequently, a WLC subsystem 13100 in a first switch 13000 tuned to convert a first wavelength determines that data units that have reached a second upstream switch through a first input 10010 (as shown by the timing diagram in FIG. 16C) uniquely associated to the first wavelength are going to be forwarded by the first switch through the output 10020 associated to the WLC subsystem.

The switching system 13000 architecture shown in FIG. 14 provides multicast transmission capability in that it is possible to transmits on more than one output 10020 data units received on the same wavelength of a first input 10010. Multicasting is achieved by tuning the WLC subsystems 13100 coupled to the selected outputs 10020 to convert the same wavelength.

In a possible implementation the number of wavelengths of each input 10010 is smaller than the number of inputs 10010. In another possible implementation the number of wavelengths of each input 10010 is smaller than the number of inputs 10010.

Figure 16:
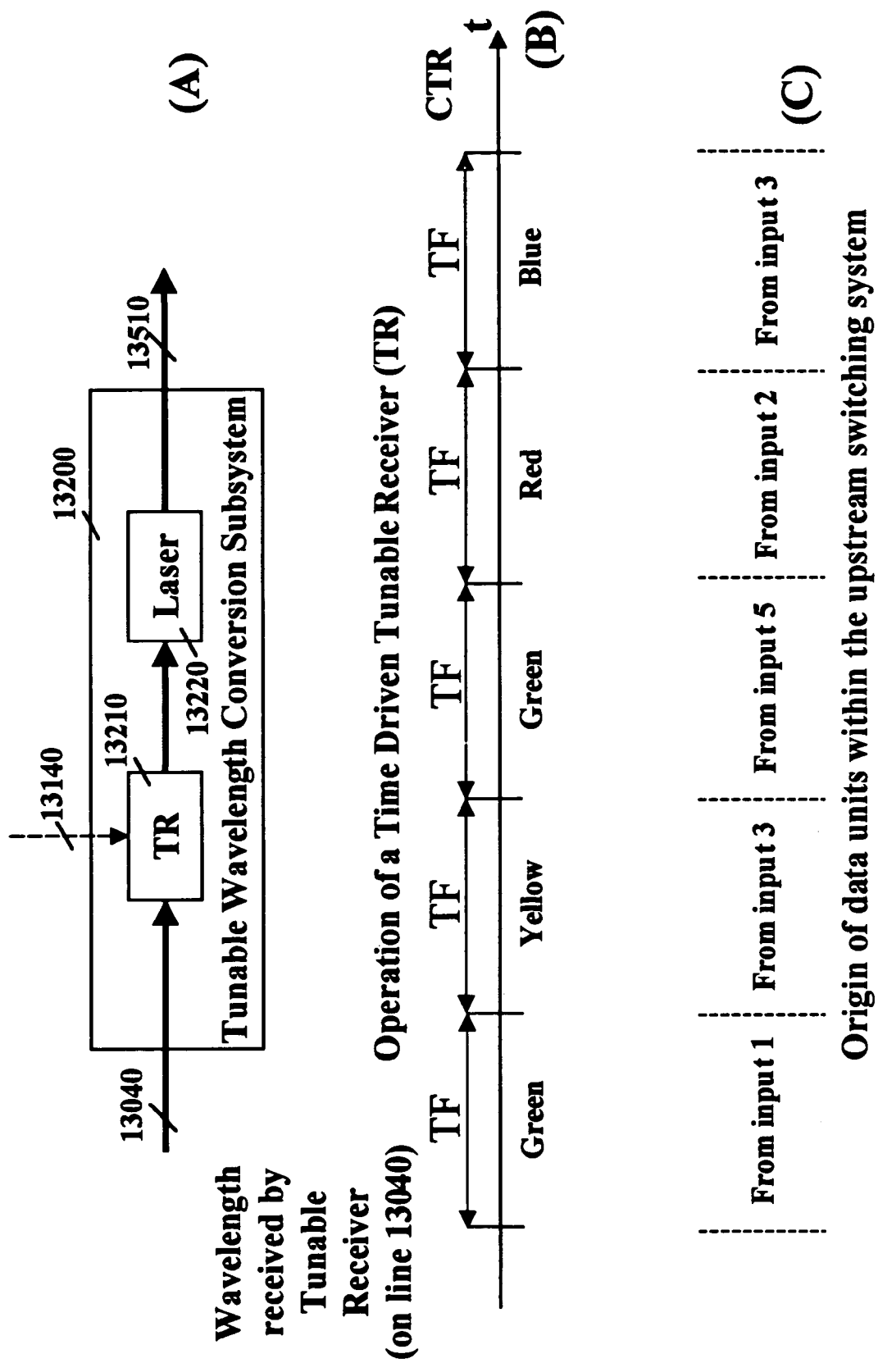
FIG. 16A is a block diagram of a possible embodiment of tunable wavelength conversion subsystem comprising a tunable receiver (TR) responsive to a color control signal and a fixed laser.
FIG. 16B is a timing diagram showing the wavelength received by the tunable receiver (TR) during subsequent time frames.
FIG. 16C shows a input port selected in the upstream switch as a consequence of the reception of a selected wavelength during a selected time frame.

FIG. 16A depicts the block diagram 13200 of a possible embodiment of tunable wavelength conversion subsystem 13150 comprising a tunable receiver (TR) 13210 and a fixed laser 13220.

During each time frame of the CIR the receiver 13210 is tuned by the Color control signal 13140 to receive data units carried by a specific wavelength, i.e., color. Received data units are sent out towards the laser 13220 for being transmitted on a fixed wavelength.

FIG. 16B contains a timing diagram showing the operation of the tunable receiver 13210. The timing diagram shows the wavelength on which the receiver 13210 receives data units during each time frame of the CTR, responsive to the Color signal 13140 from the WLC scheduling controller 13120.

In a possible embodiment the color control signal 13140 selects a different wavelength for reception of data units by the tunable receiver 13210 during each time frame. FIG. 15B is a sample timing diagram describing the operation of a tunable receiver 13210 in this embodiment. The timing diagram shows a sequence of CTR time frames TF and for each time frame the wavelength on which data units are received by the tunable receiver 13210, wherein each wavelength is identified by the color (green, yellow, red, and blue) of the corresponding light beam.

In an alternative embodiment the color control signal 13140 selects a different wavelength for reception of data units by the tunable receiver 13210 during each sub-time frame.

When the embodiment 13200 of tunable wavelength conversion subsystem 13150 presented in FIG. 16A is deployed in a WLC subsystem 13100 within the switch 13000 architecture depicted in FIG. 14, the lasers 13220 of all the WLC subsystems 13100 coupled to the same WDM 10050 transmit on a different wavelength. The WDM 10050 multiplexes on the same output fiber 10020 all the wavelengths received from its respective lasers 13020 through its respective lines 13030. Hence, each wavelength on a switch output 10020 is uniquely associated to a specific one of the switch inputs 10010. Consequently, a tunable receiver 13100 in a first switch 13000 tuned to receive data units on a first wavelength determines that data units that have reached a second upstream switch through a first input 10010 (as shown by the timing diagram in FIG. 16C) uniquely associated to the first wavelength are going to be forwarded by the first switch through the output 10020 associated to the tunable receiver.

Figure 17:
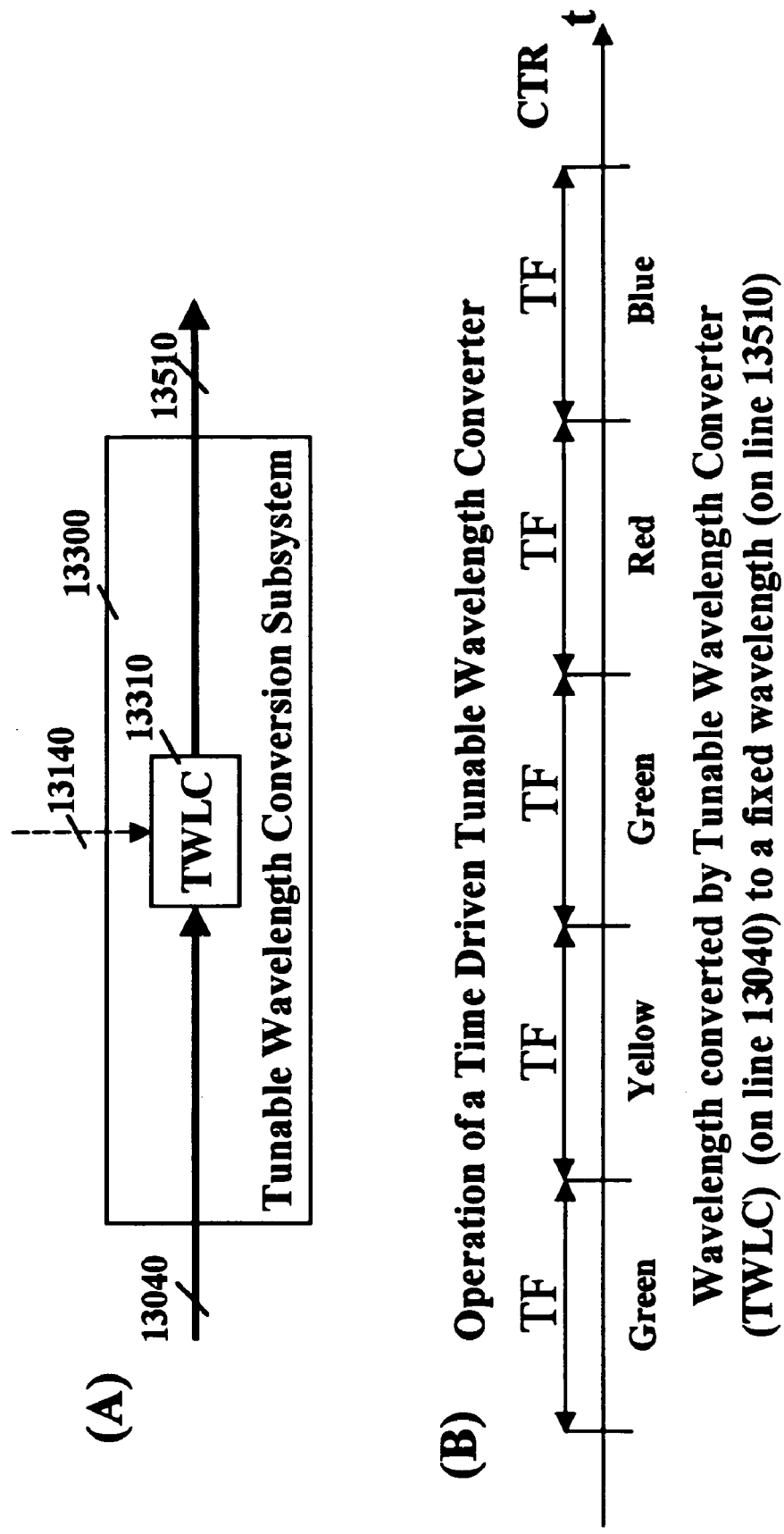
FIG. 17A is a block diagram of a possible embodiment of tunable wavelength conversion subsystem comprising a tunable wavelength converter (TWLC) responsive to a color control signal.
FIG. 17B is a timing diagram showing the wavelength converted by the tunable wavelength converter (TWLC) during subsequent time frames.

FIG. 17A shows a possible architecture 13300 for an alternative embodiment of tunable wavelength conversion subsystem 13150 that can be used in the WLC subsystem 13100 within the switching system 13000 presented in FIG. 14. The tunable wavelength conversion subsystem 13300 in FIG. 17A comprises a tunable wavelength converter (TwLC) 13310 responsive to the color control signal 13140 from the WLC scheduling controller 13120. The color control signal 13140 indicates the wavelength to be converted by the TWLC 13310. The TWLC 13310 receives an optical signal on line 13040. Such optical signal possibly comprises a plurality of wavelengths.

In a possible embodiment, the TWLC 13310 converts the wavelength channel identified by the color control signal 13140 in a fixed wavelength signal on line 13510 coupled to a respective one of the output WDMs 10050.

In the preferred embodiment of the present invention the color control signal 13140 selects a different wavelength (color) for being converted by the TWLC 13310 during each time frame. FIG. 17B is a sample timing diagram describing the operation of a TWLC 13310 in this embodiment. The timing diagram shows a sequence of CTR time frames TF and for each time frame the wavelength to be converted by the TWLC 13310, wherein each wavelength is identified by the color (green, yellow, red, and blue) of the corresponding light beam.

In an alternative embodiment the color control signal 13140 selects a different wavelength for being converted by the TWLC 13310 during each sub-time frame.

In an alternative embodiment, the TWLC 13330 converts the first selected wavelength signal specified by the color control signal 13140 in a second selected wavelength signal specified by the color control signal 13140. The wavelength to be converted and the wavelength resulting from the conversion can be changed each time frame, as shown in the timing diagram depicted in FIG. 15B.

The WLC scheduling controller 13120 depicted in FIG. 15A controls the color signal 13140, and ultimately the TWLC 13310 responsive to the CTR 002 and to a wavelength mapping table 13110. The wavelength mapping table 13110 depicted in FIG. 15A contains the mapping between each time frame and the wavelength to be converted during the time frame. The mapping can be periodic repeating every time cycle and super cycle, as defined by the CTR.

An alternative embodiment features a centralized WLC scheduling controller that generates the color control signal 13140 for all the TWLCs 13310 in the respective switching system. In such an embodiment the centralized WLC scheduling controller can be implemented within the switch controller 13030 depicted in FIG. 14.

FIG. 18A shows a possible architecture 13400 for an alternative implementation of tunable wavelength conversion subsystem 13150 that can be used in the WLC subsystem 13100 in FIG. 15 within the switching system 13000 presented in FIG. 14. The tunable wavelength conversion subsystem 13400 in FIG. 18A comprises a tunable receive (TR) 13210 and a tunable laser (TL) 13410, both responsive to the color control signal 13140 from the WLC scheduling controller 13120. The color control signal 13140 indicates the wavelength on which data units are to be received by the TR 13210 and the wavelength to be generated by the TL 13410 for transmitting the data units previously received by the TR 13210. The TR 13210 receives an optical signal on line 13040. Such optical signal possibly comprises a plurality of wavelengths.

In an embodiment, the TR 13330 receives data units on the wavelength signal specified by the color control signal 13140 and the TL 13410 transmits them using another wavelength signal specified by the color control signal 13140. The wavelength to be received and the wavelength to be transmitted can be changed each time frame, as shown in the timing diagram depicted in FIG. 18B.

The WLC scheduling controller 13120 controls the color signal 13140, and ultimately the TR 13210 and TL 13410 depicted in FIG. 18A responsive to the CTR 002 and to a wavelength mapping table 13110, as shown in FIG. 15. The wavelength mapping table 13110 contains the mapping between each time frame and the wavelength to be received during the time frame. The mapping can be periodic repeating every time cycle and super cycle, as defined by the CTR.

An alternative embodiment features a centralized WLC scheduling controller that generates the color control signal 13140 for all the TRs 13310 and TLs 13410 in the respective switching system. In such an embodiment the centralized WLC scheduling controller can be implemented within the switch controller 13030 included in the switch architecture depicted in FIG. 14.

In the preferred embodiment of the present invention the color control signal 13140 selects a different wavelength (color) for being received by the TR 13210 and a different wavelength to be generated by the TL 13410 during each time frame. FIG. 18B is a sample timing diagram describing the operation of this embodiment of tunable wavelength conversion subsystem 13400. The timing diagram shows a sequence of CTR time frames TV and for each time frame the wavelength to be received (R:) by the TR 13210 and the wavelength to be generated (T:) by the TL 13410, wherein each wavelength is identified by the color (green, yellow, red, and blue) of the corresponding light beam.

In an alternative embodiment the color control signal 13140 selects a different wavelength for reception by the TR 13210 and for transmission by the TL 13410 during each sub-time frame.

FIG. 18C depicts the block diagram 13450 of a possible embodiment of tunable wavelength conversion subsystem 13150 comprising an alignment subsystem 10100, a tunable receiver (TR) 13210 and a fixed laser 13220.

During each time frame of the CTR the receiver 13210 in FIG. 18C is tuned by the Color control signal 13140 to receive data units carried by a specific wavelength, i.e., color. Received data units are stored in the alignment subsystem 10100 that aligns them to the CTR responsive to the CTR signal 002. Data units are retrieved from the alignment subsystem 10100 to be transmitted by the laser 13220 on a fixed wavelength.

FIG. 15B contains a timing diagram showing the operation of the tunable receiver 13210 in FIG. 18C. The timing diagram shows the wavelength on which the receiver 13210 receives data units during each time frame of the CTR, responsive to the Color signal 13140 from the WLC scheduling controller 13120 depicted in FIG. 15.

In a possible embodiment the color control signal 13140 selects a different wavelength for reception of data units by the tunable receiver 13210 during each time frame. FIG. 15B is a sample timing diagram describing the operation of a tunable receiver 13210 in this embodiment. The timing diagram shows a sequence of CTR time frames TF and for each time frame the wavelength on which data units are received by the tunable receiver 13210, wherein each wavelength is identified by the color (green, yellow, red, and blue) of the corresponding light beam.

In an alternative embodiment the color control signal 13140 selects a different wavelength for reception of data units by the tunable receiver 13210 during each sub-time frame.

When the embodiment 13450 of tunable wavelength conversion subsystem 13150 presented in FIG. 18C is deployed in a WLC subsystem 13100 within a switching system, an architecture derived from the one depicted in FIG. 14 is used. The switching system deploying the embodiment 13450 of tunable wavelength conversion subsystem 13150 presented in FIG. 18C does not need the optical alignment subsystems 10900 on the inputs 10010, as shown in FIG. 14, since alignment is performed by the alignment subsystem 10100 within the tunable wavelength conversion subsystem 13450.

In a switching system architecture such as the one depicted in FIG. 14, deploying at least one of the embodiments of tunable wavelength conversion subsystem presented in FIG. 18A and 18C within the WLC subsystems 13100, the lasers 13220 of all the WLC subsystems 13100 connected to the same WDM 10050 transmit on a different wavelength. The WDM 10050 multiplexes on the same output fiber 10020 all the wavelengths received from its respective lasers 13020 through its respective lines 13030. Hence, each wavelength on a switch output 10020 is uniquely associated to a specific one of the switch inputs 10010. Consequently, a tunable receiver 13100 in a first switch 13000 tuned to receive data units on a first wavelength determines that data units that have reached a second upstream switch through a first input 10010 (as shown by the timing diagram in FIG. 16C) uniquely associated to the first wavelength are going to be forwarded by the first switch through the output 10020 associated to the tunable receiver.

FIG. 19B depicts an alternative embodiment of optical interconnection subsystem 13020 to be deployed within an architecture of wavelength conversion-based time driven switch 13000 such as the one depicted in FIG. 14. The alternative embodiment of optical interconnection subsystem 13020 consists in an optical cross connect (OXC) 10510. When the optical cross connect (OXC) 10510 is deployed in the switching system 13000 depicted in FIG. 14, it interconnects each one of the plurality of WLC subsystems 13100 to its respective one of the WDMs 10050. The output 13510 of each WLC subsystem 13100 is coupled to an input line of the optical cross connect 10510. Each of the inputs 13520 of each WDM is coupled to a selected output of the optical cross connect 10510. In the preferred embodiment the WLC subsystem 13100 is tuned to emit different wavelengths; when the optical cross connect is configured to connect the output 13510 of a WLC subsystem 13100 with a selected input 13520 of a WDM 10050, the wavelength emitted by the WLC subsystem 13100 might have to be changed in order to avoid that the optical signal on more than one of the plurality of inputs 13520 of the selected WDM 10050 has the same wavelength.

The optical cross connect 10510 is implemented using optical switching technologies such as, but not limited to, micro electromechanical system (MEMS) mirrors, bubbles, holography. The optical cross connect 10510 is capable of changing the connections between its inputs 13510 and outputs 13520 responsive to a control signal 13035 from the switch controller 13030 (depicted in FIG. 14) responsive to the CTR signal 002.

The input/output connection configuration within the OXC 10510 determines how many of the plurality of wavelengths of each input 10010 are routed to each one of the plurality of the outputs 10020. In a possible implementation, the switch controller 13030, responsive to the CTR signal 002, changes the configuration of the OXC 10510 with a time scale much larger than a time frame. In a possible implementation, the switch controller 13030 changes the configuration of the OXC 10510 responsive to the CTR 002 so that the configuration is changed between two adjacent time frames, wherein in the previous one of the two time frames a first OXC configuration is deployed and the second one of the two time frames a second OXC configuration is deployed. In a possible embodiment the configuration change takes place during the idle time between aligned time frames 4140a pictorially shown in FIG. 33.

In a possible embodiment, each configuration change takes a time comprising a plurality of time frames; for the time in which the OXC configuration is changed the respective selected WLC subsystems 13100 in FIG. 14 do not emit on the input lines 13510 that are involved in the configuration change an optical signal carrying data units to be switched. The selected WLC subsystems 13100 resume emitting an optical signal carrying data units to be switched at the beginning of the time frame following the time frame during which the OXC configuration change is completed.

The OXC configuration changes can reoccur periodically with a period which is an integer multiple of the time cycle or the super cycle.

In a possible implementation the number of wavelengths of each input 10010 is smaller than the number of inputs 10010. In another possible implementation the number of wavelengths of each input 10010 is smaller than the number of inputs 10010. In another possible implementation the number of wavelengths of each input 10010 is he same as the number of inputs 10010.

Figure 20:
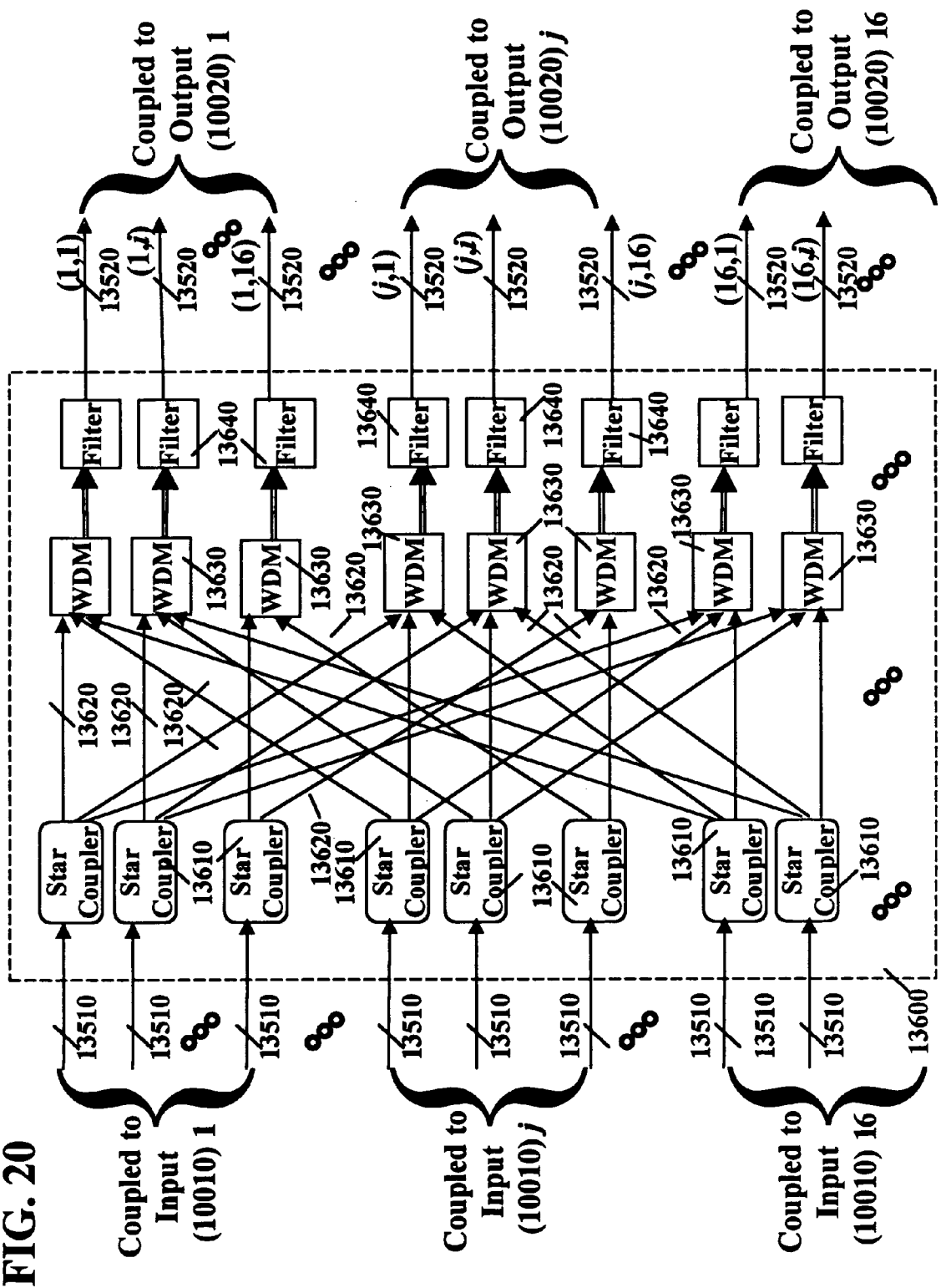
FIG. 20 is a block diagram of a possible embodiment of optical interconnection subsystem comprising a plurality of star couplers, a plurality of wavelength division multiplexers (WDMs), a plurality of filters, and a plurality of optical data lines between each star coupler and all of the WDMs.

FIG. 20 depicts an alternative embodiment 13600 of optical interconnection subsystem 13020 to be deployed within an architecture of wavelength conversion-based time driven switch such as the one depicted in FIG. 14. The alternative embodiment 13600 of optical interconnection subsystem 13020 comprises a plurality of star couplers 13610, a plurality of WDM multiplexers (WDMs) 13630, a plurality of optical filters 13640, and a plurality of interconnections 13620 between the star couplers 13610 and the respective WDMs 13630.

FIG. 25C shows the operation of an optical filter 13640, such as the ones deployed in the optical interconnection subsystem 13020 depicted in FIG. 20, that receives on its input 14040 an optical signal comprising a plurality of wavelengths (green, red, and yellow in the example shown in FIG. 25C) and emits on its output 14045 only a selected one (yellow in the example in FIG. 24C) of said plurality of wavelengths.

When the embodiment 13600 of optical interconnection subsystem 13020 shown in FIG. 20 is deployed in the switching system 13000 depicted in FIG. 14, each star coupler 13610 is coupled to all of the outputs 10020. In an alternative embodiment of optical interconnection subsystem 13600 each star coupler 13610 is coupled to a subset of the output WDMs 10050. In the preferred embodiment, shown in FIG. 20, each star coupler 13610 is coupled to one WDM 13630 for each of the outputs 10020. In an alternative embodiment, each star coupler 13610 is coupled to a plurality of WDMs 13630 for at least one of the outputs 10020.

In the preferred embodiment, shown in FIG. 20, each star coupler 13610 is coupled through a plurality of lines 13620 to a respective predefined set of WDMs 13630, each WDM 13630 of the respective predefined set coupled to a filter 13640. Each WDM 13630 receives wavelength signals from a plurality of star couplers 13610. When this embodiment 13600 of optical interconnection subsystem 13020 is deployed in the switching system 13000 depicted in FIG. 14, the 16 star couplers 13610 coupled to the same WDM 13630 through their respective line 13620 are coupled to different inputs 10010, one star coupler 13610 for each input 10010. In an alternative embodiment, each WDM 13630 is associated to a plurality of star couplers 13610, each one coupled to a different input 10010, wherein the total number of star couplers 13610 is smaller than the total number of inputs 10010. In another alternative embodiment, each WDM 13630 is associated to a plurality of star couplers 13610, wherein at least two of the plurality of star couplers 13610 are coupled to the same input 10010.

Each WDM 13630 in FIG. 20 combines the wavelength signals received on all its inputs 13620 in a composite optical signal, comprised of a plurality of wavelengths, that is fed to its respective filter 13640. In order for a switching system 13000, such as the one depicted in FIG. 14, to operate properly, the optical signals carried by each of the lines 13620 connected to the same WDM 13630 must have a different wavelength. Consequently, the WLC subsystems 10200 in FIG. 14 coupled, through their respective star coupler 13610, to the same WDM 13630 must not generate the same wavelength during the same time frame. This is guaranteed by properly setting the respective wavelength mapping table 13310 to which each WLC subsystem 10200 is responsive, as shown FIG. 15A.

Each filter 13640 in FIG. 20 receives the composite optical signal, comprised of a plurality of wavelengths, from its respective WDM 13630 and allows on its output 13520 only a selected one of the wavelengths. The other wavelengths comprising the composite optical signal are filtered out. In order for the system to work properly, all the filters 13640 coupled to the same output WDM 10050, as shown in FIG. 14, allow different wavelengths on their respective output lines 13520.

The filters 13640 connected to the WDMs 13630 coupled to a selected one of the star couplers 13610 in FIG. 20 allow different wavelengths on their respective output line 13520. In other words, there are no two or more filters 13640 coupled to a selected one of the star couplers 13610 that allow the same wavelength signal on their respective output line 13520. Consequently, when data units carried by a first optical wavelength signal received on a first switch input 10010 are to be switched to a first switch output 10020 during a first time frame, the respective WLC subsystem 13100 associated to the first output 10020 is tuned to convert the first wavelength into a second wavelength, wherein the second wavelength is the wavelength not filtered out (i.e., allowed) by the respective first filter 13640 connected to both the star coupler 13610 associated to the respective WLC subsystem 13100, and the WDM 10050 coupled to the first output 10020. In order to ensure proper operation of the switching system 13000, the WLC subsystems 13100 coupled, through their respective star coupler 13610, to the first filter 13640 are tuned to transmit on a wavelength different from the second wavelength during the first time frame.

According to the architecture depicted in FIG. 14, the wavelength (color) to which a WLC subsystem 13100 is tuned in a first switching system 13000 during a first selected time frame determines the input 10010 of a second upstream switching system 13000 from which the wavelength signal had been forwarded to the first switching system 13000, wherein one of the inputs 10010 of the first switching system 13000 is coupled to one of the outputs 10020 of the second switching system 13000. The wavelength (color) emitted by a WLC subsystem in the first switching system 13000 during the first selected time frame determines the output 10020 of the first switching system 13000 through which the wavelength signal is being forwarded. In other words, routing of the data units traversing one or more switching systems 13000 is determined by the tuning of the WLC subsystem 13100 comprised in each switching system 13000, i.e., by determining the wavelength to be converted and the wavelength generated as a result of the conversion.

In the embodiment 13600 of optical interconnection subsystem 13020 for a switching system 13000 such as the one presented in FIG. 14, each of the outputs 13040 of a star coupler 13010 is coupled, through a respective WLC subsystem 13100 and star coupler 13610 to every switch output 10020. Consequently, data units received through any switch input 10010 can be forwarded through any output 10020. Moreover, due to the topology of the connections 13620, the operation of the WDMs 13630, and the filters 13640, during each time frame multiple wavelength signals received through the same input 10010 can be transferred to a selected output 10020. In other words, it is possible to transfer to the same output 10020 data units received on two different wavelengths carried by the same input fiber.

The switching system 13000 in FIG. 14 deploying the embodiment 13600 of optical interconnection subsystem 13020 depicted in FIG. 20 provides multicast transmission capability if the filters 13640 connected to the output WDMs 10050 can be tuned to allow different wavelength signals during different time frames. Multicasting from a first input 10010 to a first set of outputs 10020 is achieved by tuning during a first time frame the tunable filters 13640 coupled to the first set of outputs 10020 to allow a first wavelength. The WLC subsystem 13100 coupled to the first input 10010 is tuned to emit the first wavelength during the first time frame. In order to assure proper operation, during the first time frame all the other WLC subsystems 13100 coupled to the tunable filters 13640 coupled to the first set of outputs 10020 are tuned to generate a wavelength different from the first wavelength.

In a possible embodiment of the switching system 13000 depicted in FIG. 14, all the WLC subsystems 13100 are able to emit the same set of wavelengths, wherein the total number of wavelength each WLC subsystem 13100 is able to generate is equal to the number of outputs 10020. In an alternative embodiment, there are at least two different types of WLC subsystems 13100, wherein WLC subsystems 13100 of the first type are able to generate a first set of wavelengths and WLC subsystems 13100 of the second type are able to generate a second set of wavelengths and so on, wherein the total number of wavelength in each set of wavelength is equal to the number of outputs 10020. In an alternative embodiment, the number of wavelengths in each set of wavelengths is greater than the number of outputs 10020. In an alternative embodiment, the number of wavelengths in each set of wavelengths is smaller than the number of outputs 10020. In an alternative embodiment, the number of wavelengths in at least one set of wavelengths is different than the number of wavelengths in the other sets of wavelengths.

In an alternative implementation the number of wavelengths of each input 10010 is smaller than the number of inputs 10010. In another possible implementation the number of wavelengths of each input 10010 is greater than the number of inputs 10010. In another possible implementation the number of wavelengths of each input 10010 is the same as the number of inputs 10010.

Figure 21:
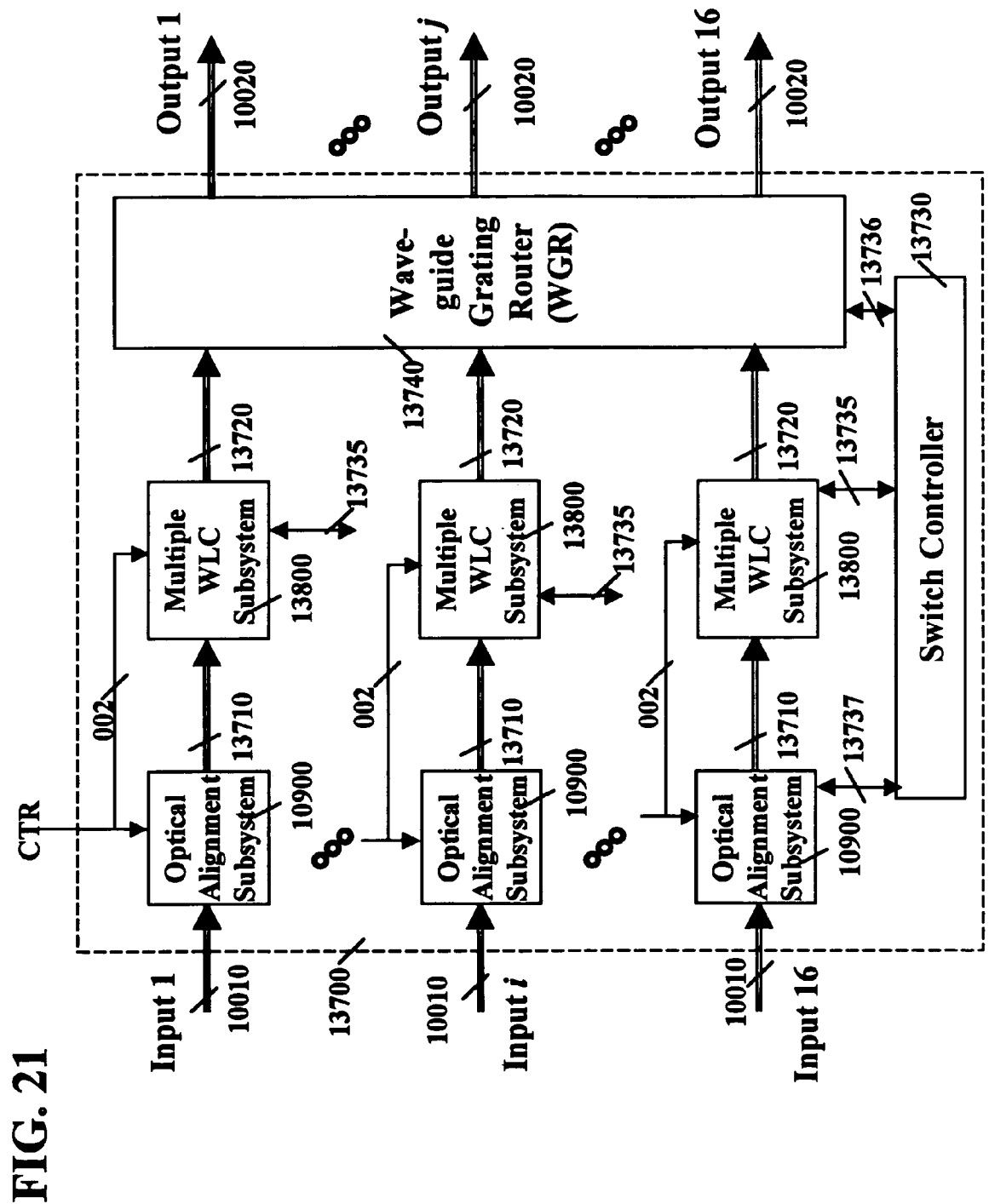
FIG. 21 is an architecture of a switching system responsive to the common time reference (CTR) based on a waveguide grating router (WGR) and comprising a switch controller, a plurality of multiple wavelength conversion (WLC) subsystems and a plurality of optical alignment subsystems—one for each input line.

FIG. 21 is the architecture of a possible embodiment 13700 of a time driven switch based on multiple wavelength conversion (WLC) subsystems 13800 and a waveguide grating router (WGR), also called waveguide grating router 13740. The switching system 13700 presented in FIG. 21 has a plurality of inputs 10010 and outputs 10020, each one consisting of an optical link with a plurality of wavelengths. The switching system 13700 in FIG. 21 comprises a switch controller 13730, a plurality of optical alignment subsystems 10900, multiple WLC subsystems 13800, and one WGR 13740.

The optical alignment subsystems 10900, multiple WLC subsystems 13800, and a WGR 13740 are controlled by the switch controller 13730, responsive to the CTR 002, through three bi-directional control lines 13737, 13735, and 13736, respectively. Each of the three control lines provides configuration information from the switch controller 13730 to the optical alignment subsystems 10900, multiple WLC subsystems 13800, and the WGR 13740; and via the three bidirectional control lines 13737, 13735, and 13736, the switch controller 13730 receives various status and control information from the optical alignment subsystems 10900, multiple WLC subsystems 13800, and the WGR 13740.

FIG. 25B illustrates the operation of a WGR 13740. The WGR 13740 depicted in FIG. 25B has three inputs 14060-1, 14060-2, and 14060-3 and three outputs 14065, each one consisting of an optical link with three wavelengths (green, red, and blue). The optical signal consisting of the green wavelength received on input 14060-1 is switched to output 14065-1, the optical signal consisting of the red wavelength received on input 14060-1 is switched to output 14065-2, and optical signal consisting of the blue wavelength received on input 14060-1 is switched to output 14065-3. In a similar way, each wavelength on input 14060-2 and 14060-3 is switched separately, one wavelength to each one of the outputs 14065-1, 14065-2, and 14065-3, as shown in FIG. 25B.

In the switching system architecture 13700 depicted in FIG. 21 an optical alignment subsystem 10900 is associated to each respective one of the inputs 10010. The optical alignment subsystem 10900 aligns to the common time reference (CTR) data units transported over the plurality of wavelengths of its respective input 10010.

As shown in FIG. 21, a multiple WLC subsystem 13800 is coupled to a selected one of the plurality of optical alignment subsystem 10900. The multiple WLC subsystem 13300 converts a specific set of wavelengths, responsive to the CTR signal 002. FIG. 22A shows a possible embodiment of a multiple WLC subsystem 13800 comprising a multiple wavelength conversion (MWLC) scheduling controller 13820 responsive to the CTR signal 002 and to a multiple wavelength mapping table 13810 downloaded from the switch controller 13730 through control line 13735, and a tunable multiple wavelength conversion subsystem 13850 responsive to a Color signal 13840 from the MWLC scheduling controller 13820.

The tunable multiple wavelength conversion subsystem 13850 within the multiple WLC subsystem 13800 is connected to the output line 13710 of a respective one of the optical alignment subsystems 10900 from which the tunable multiple wavelength conversion subsystem 13850 receives an optical signal comprising a plurality of wavelengths. During each time frame of the CTR the tunable multiple wavelength conversion subsystem 13850 is tuned by the Color control signal 13840 to convert a first selected set of wavelengths, i.e., colors, into a second selected set of respective wavelengths emitted on the output line 13720.

Each wavelength in the second selected set of wavelengths emitted on the output line 13720 of the tunable multiple wavelength conversion subsystem 13850 as a result of the conversion of the first set of wavelengths received on its input line 13710 carries the same information as the respective wavelength in the first set of wavelengths.

In a possible embodiment the color control signal 13840 in FIG. 22A selects a different first set of wavelength for conversion by the tunable multiple wavelength conversion subsystem 13850 during each time frame. In a possible embodiment the tunable multiple wavelength conversion subsystem 13850 converts the first selected set of wavelengths into a second fixed set of wavelengths during each time frame. In an alternative embodiment the tunable multiple wavelength conversion subsystem 13850 converts the first selected set of wavelengths into a second set of wavelengths that can be different during each time frame. In another alternative embodiment the first and the second selected set of wavelengths do not change over time, but the mapping between each wavelength in the first selected set of wavelengths and the corresponding wavelength in the second selected set of wavelengths is changed during each time frame.

FIG. 22B is a sample timing diagram describing the operation of the second alternative embodiment of tunable wavelength conversion subsystem 13850. The timing diagram shows a sequence of CTR time frames TF and for each time frame a first fixed selected set of wavelengths on data line 13710 being converted into a second fixed selected set of wavelengths emitted on data line 13720, wherein each wavelength is identified by the color (green, red, and blue) of the corresponding light beam. For example, in the leftmost time frame shown in the timing diagram depicted in FIG. 22B the green wavelength is converted into the blue wavelength, the blue wavelength is converted into the red wavelength, and the red wavelength is converted into the green wavelength, i.e., during the leftmost time frame the blue light beam on data line 13720 carries the same information as the green light beam on data line 13710, the red light beam on data line 13720 carries the same information as the blue light beam on data line 13710, the green light beam on data line 13720 carries the same information as the red light beam on data line 13710.

In an alternative embodiment the color control signal 13840 selects a different wavelength for conversion by the tunable wavelength conversion subsystem 13850 during each sub-time frame.

As shown in FIG. 22A, the Color control signal 13840 is generated by the multiple WLC scheduling controller 13820 according to the content of the multiple wavelength mapping table 13810 that indicates the wavelength mapping, i.e., into which outgoing wavelength each incoming wavelength is to be converted, during each TF. In a possible embodiment the wavelength mapping has a predefined pattern that is repeated every time cycle and super cycle. The mapping information contained in the multiple wavelength mapping table 13810 determines the route within the switching system 13700 of the data units carried over the plurality of optical channels during each time frame. In a possible embodiment the content of the multiple wavelength mapping table 13810 is updated whenever a FLP is created or torn down.

In a possible embodiment, the above mentioned mapping repeats each time cycle or each super cycle.

An alternative embodiment features a centralized multiple WLC scheduling controller that generates the color control signal 13840 for all the tunable multiple wavelength conversion subsystems 13800 in the respective switching system 13700 as depicted in FIG. 21. In a possible implementation of such an embodiment the centralized multiple WLC scheduling controller is within the switch controller 13730.

WGR 13740 in the switching system 13700 architecture depicted in FIG. 21 couples each wavelength on the output line of each multiple WLC subsystem 13800 with the same wavelength on a selected fixed respective output 10020 of the switching system 13700. Consequently, the second wavelength into which an incoming first wavelength is converted by the multiple WLC subsystem 13800 determines the routing of data units received on the first wavelength, i.e., the output 10020 on which the data units are transmitted. Consequently, data units received through a switch input 10010 can be forwarded on any output 10020. However, due to the architecture of the switching system 13700, during each time frame only data units carried on one wavelength can be transferred to a given output 10020. In other words, it is not possible to transfer to the same output 10020 data units received on two different wavelengths carried on the same input fiber.

In order to transfer data units carried on a first wavelength to a first output 10020, the selected multiple WLC subsystem 13800 connected through its respective line 13710 to the optical alignment subsystem 10900 of the first input 10010 is to be tuned to convert the first wavelength to a second selected wavelength such that the WGR 13740 switches the second wavelength on the respective output line 13720 of the selected multiple WLC subsystem 13800 to the first output 10020.

In a possible embodiment the switching system 13700 architecture shown in FIG. 21 does not provide multicast transmission capability in that it is not possible to transmits on more than one output 10020 data units received on the same wavelength of a first input 10010.

In an alternative embodiment the switching system 13700 architecture shown in FIG. 21 provides multicast transmission capability thanks to the deployment of an embodiment of multiple WLC subsystem 13800 capable of converting at least one selected wavelength on its input line 13710 into at least two selected wavelengths on its output line 13720. The WGR 13740 interconnecting the plurality of multiple WLC subsystems 13800 to the outputs 10020 of the switching system 13700 routes the two selected wavelengths to different outputs.

Multicasting from a first input 10010 to a first set of outputs 10020 is achieved by tuning during a first time frame the multiple WLC subsystem 13800 coupled to the first input 10010 to convert a first wavelength to a first set of wavelengths such that the WGR 13740 routes each wavelength in the first set of wavelengths on a respective one of the outputs 10020 of the first set of outputs.

Figure 23:
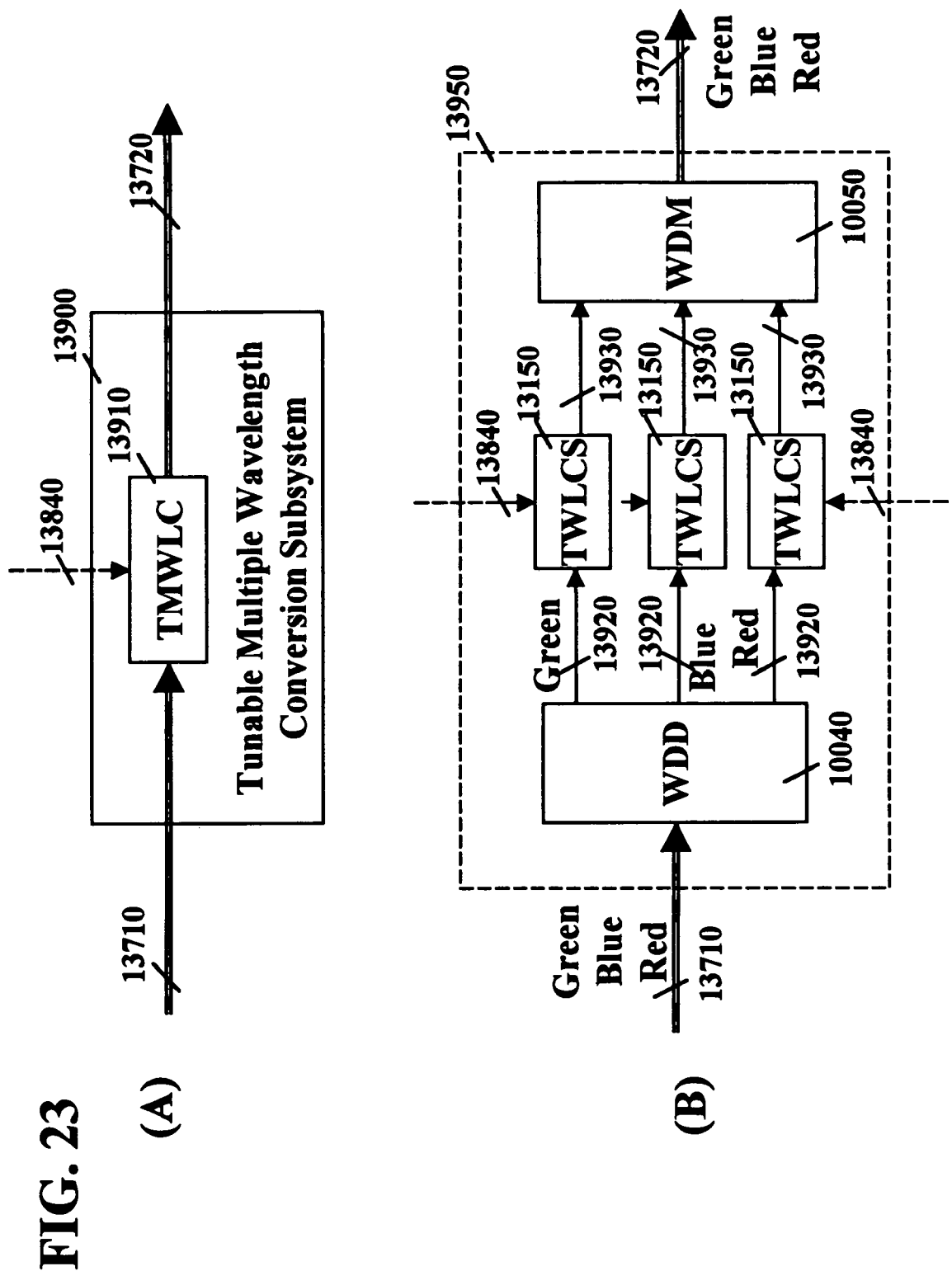
FIG. 23A is a block diagram of a possible embodiment of tunable multiple wavelength conversion subsystem comprising a tunable multiple wavelength converter responsive to a color control signal.
FIG. 23B is the block diagram of a possible embodiment of tunable multiple wavelength conversion subsystem comprising a wavelength division de-multiplexer (WDD), a plurality of tunable wavelength conversion subsystems, and a wavelength division multiplexer (WDM)

FIG. 23A shows a possible architecture 13900 for a tunable multiple wavelength conversion subsystem 13850 that can be used in the multiple WLC subsystem 13800 within the switching system 13700 presented in FIG. 21. The tunable multiple wavelength conversion subsystem 13900 in FIG. 23A comprises a tunable multiple wavelength converter (TMWLC) 13910 responsive to the color control signal 13840 from the multiple WLC scheduling controller 13820. The color control signal 13840 indicates the mapping for each wavelength to be converted by the TMWLC 13910. The TMWLC 13910 receives an optical signal on line 13710, such optical signal possibly comprising a plurality of wavelengths.

In a possible embodiment, the TMWLC 13910 converts the first set of wavelength channels identified by the color control signal 13840 into a second set of wavelength signals on line 13720 coupled to a respective one of the input lines of the WRG 13740.

In the preferred embodiment of the present invention the color control signal 13840 selects a different set of wavelengths (colors) for being converted by the TMWLC 13910 during each time frame. In an alternative embodiment the color control signal 13840 selects a different set of wavelengths for conversion by the TMWLC 13910 during each sub-time frame. The multiple WLC scheduling controller 13820 controls the color signal 13840, and ultimately the TMWLC 13910 responsive to the CTR 002 and to the multiple wavelength mapping table 13810 shown in FIG. 22A.

FIG. 23B shows the architecture of an alternative embodiment 13950 of tunable multiple wavelength conversion subsystem 13850 that can be used in the multiple WLC subsystem 13800 in FIG. 22A within the switching system 13700 presented in FIG. 21. The multiple tunable wavelength conversion subsystem 13950 in FIG. 23B comprises a wavelength division de-multiplexer (WDD) 10040, a wavelength division multiplexer (WDM) 10050, and a plurality of tunable wavelength conversion subsystems (TWLCS) 13150, one for each output 13920 of the WDD 10040 and respective one of the inputs 13930 of the WDM 10050. The TWLCSs 13150 can be implemented according to at least one of the embodiments presented in FIG. 16A, FIG. 17A, FIG. 18A, and FIG. 18C.

Each one of the wavelengths (e.g., green, blue, and red in the example depicted in FIG. 23B) comprised in the optical signal received on input line 13710 is separated by the WDD 10040 on a respective one of its outputs 13920. During each time frame, each one of the TWLCS 13150 converts the fixed wavelength received from its respective input 13920 in a selected wavelength emitted on its respective output 13930, responsive to the color signal 13840 from the MWLC scheduling controller 13820.

In generating the color signal 13840 the MWLC scheduling controller 13820 depicted in FIG. 22A ensures that during each time frame the wavelengths emitted by the plurality of TWLCSs 13150 are all different from each other in order to avoid conflicts on the output 13720 of the WDM 10050.

In the preferred embodiment of the present invention the color control signal 13840 selects a different set of wavelengths (colors) for being emitted by the TWLCSs 13150 and mapping with the corresponding incoming wavelengths during each time frame. In an alternative embodiment the color control signal 13840 selects a different set of wavelengths for being emitted by the TWLCSs 13150 and mapping with the corresponding incoming wavelengths during each sub-time frame. The multiple WLC scheduling controller 13820 in FIG. 22A controls the color signal 13840, and ultimately the TWLCSs 13150 responsive to the CTR 002 and to the multiple wavelength mapping table 13810.

The TWLCS 13150 can be implemented according to at least one of the embodiments disclosed in the present document in FIG. 16A, FIG. 17A, FIG. 18A, and FIG. 18C.

Figure 26:
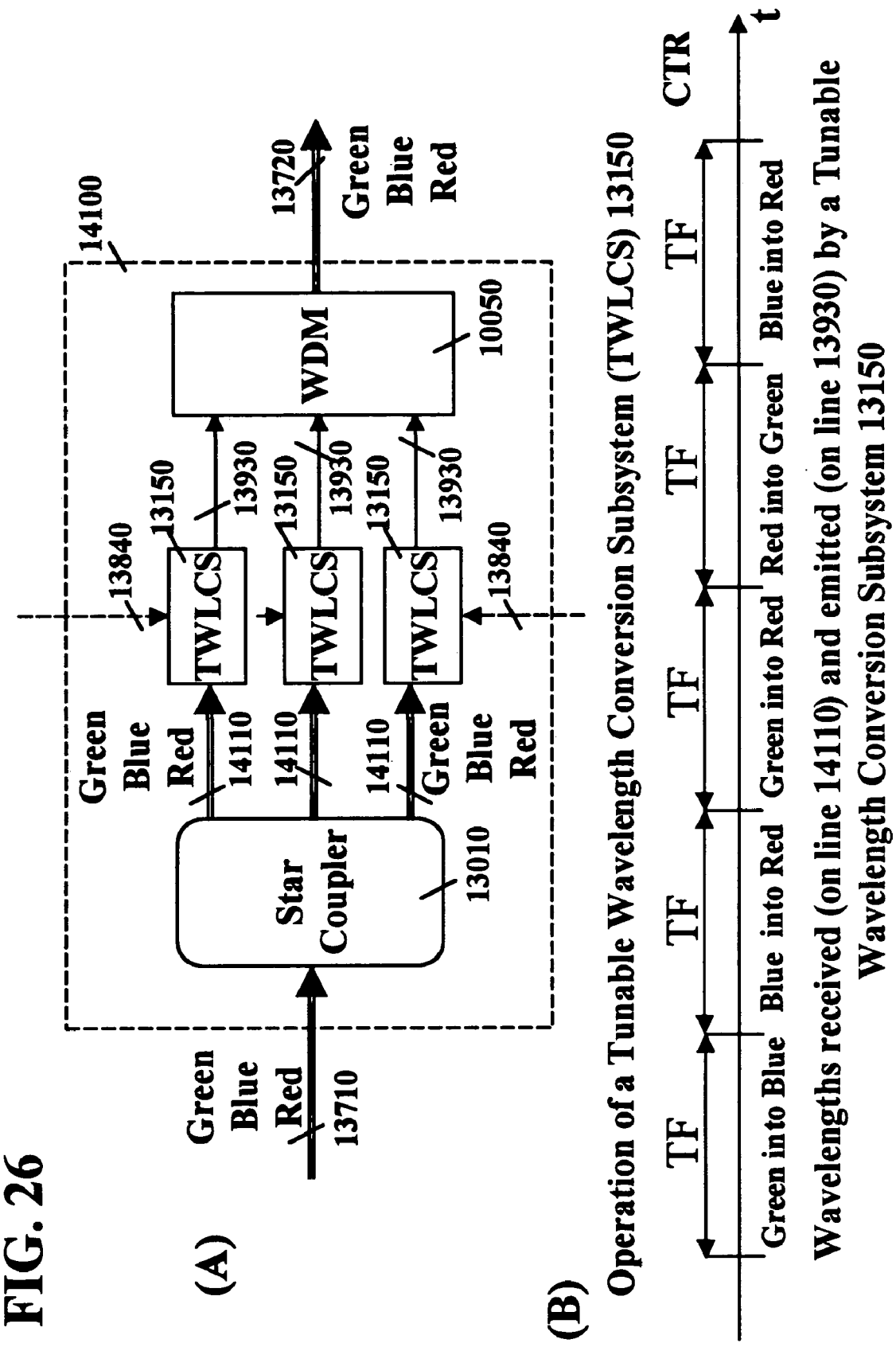
FIG. 26A is a block diagram of a possible embodiment of tunable multiple wavelength conversion subsystem comprising a star coupler, a plurality of tunable wavelength conversion subsystems, and a WDM.
FIG. 26B is a timing diagram showing the wavelengths conversions performed by a tunable wavelength conversion subsystem during subsequent time frames.

FIG. 26A shows the architecture of an alternative embodiment 14100 for a multiple tunable wavelength conversion subsystem 13850 that can be used in the multiple WLC subsystem 13800 within the switching system 13700 presented in FIG. 21. When the embodiment 14100 shown in FIG. 26A is deployed, the switching system 13700 has multicast capability.

The multiple tunable wavelength conversion subsystem 14100 comprises a star coupler 13010, a WDM multiplexer (WDM) 10050, and a plurality of tunable wavelength conversion subsystems (TWLCS) 13150, one for each output 14110 of the star coupler 13010 and respective one of the inputs 13930 of the WDM 10050.

The optical signal received on input line 13710 together with each one of the wavelengths (e.g., green, blue, and red in the example depicted in FIG. 23B) it comprises is replicated on each output line 14110 of the star coupler 13150. During each time frame, each one of the TWLCS 13150 converts a selected one of the plurality of wavelengths received from its respective input 14110 into a selected wavelength emitted on its respective output 13930, responsive to the color signal 13840 from the MWLC scheduling controller 13820 depicted in FIG. 22A.

In generating the color signal 13840 the MWLC scheduling controller 13820 ensures that during each time frame the wavelengths emitted by the plurality of TWLCSs 13150 are all different from each other in order to avoid conflicts on the output 13720 of the WDM 10050.

In the preferred embodiment of the present invention the color control signal 13840 selects a first wavelength (color) for being converted and a second wavelength to be emitted by the each TWLCS 13150 during each time frame, the first wavelength to be converted into the second wavelength. FIG. 26B is a timing diagram showing a sample operation of a TWLCS 13150 as shown in FIG. 26A.

In an alternative embodiment the color control signal 13840 selects a first wavelength for being converted and a second wavelength to be emitted by the TWLCSs 13150 during each sub time frame. The multiple WLC scheduling controller 13820 depicted in FIG. 22A controls the color signal 13840, and ultimately the TWLCSs 13150 responsive to the CTR 002 and to the multiple wavelength mapping table 13810.

The embodiment 14100 of multiple tunable wavelength conversion subsystem 13850 depicted in FIG. 26A enables multicasting capability in the switching system 13700 depicted in FIG. 21 since at least two of the plurality of TWLCSs 13150 within one multiple tunable wavelength conversion subsystem 14100 can be tuned to convert a first selected wavelength from the input line 13710 into a set of different selected wavelengths on their respective output lines 13930 during a selected time frame. The said set of different selected wavelengths are combined by the respective WDM 10050 on its respective optical output line 13720 and the WGR 13740 switches the different wavelengths to different respective outputs 10020. Since the set of different selected wavelengths carry the same information carried by the first selected wavelength, data units carried over the first selected wavelength through the respective input 10010 are forwarded through the different respective outputs 10020, over a respective one of the wavelengths of the set of different selected wavelengths on each output 10020.

Optical Programmable Delay System

In the optical domain data units flow at light speed through optical fibers and other transport media. In the optical domain memory is realized via optical fiber in which optical signals are stored for the time they take to cross the optical fiber. Consequently, the amount of data units stored and the time spent by data units inside the storage medium (i.e., the optical fiber) depend on the length of the fiber.

A random access memory in which data units can be stored for any amount of time regardless of the time spent in the memory by other data units, is approximated in the optical domain by using a number of different techniques. In the following two such techniques known in the art are briefly described: serial optical delay line and parallel optical delay line.

Figure 34:
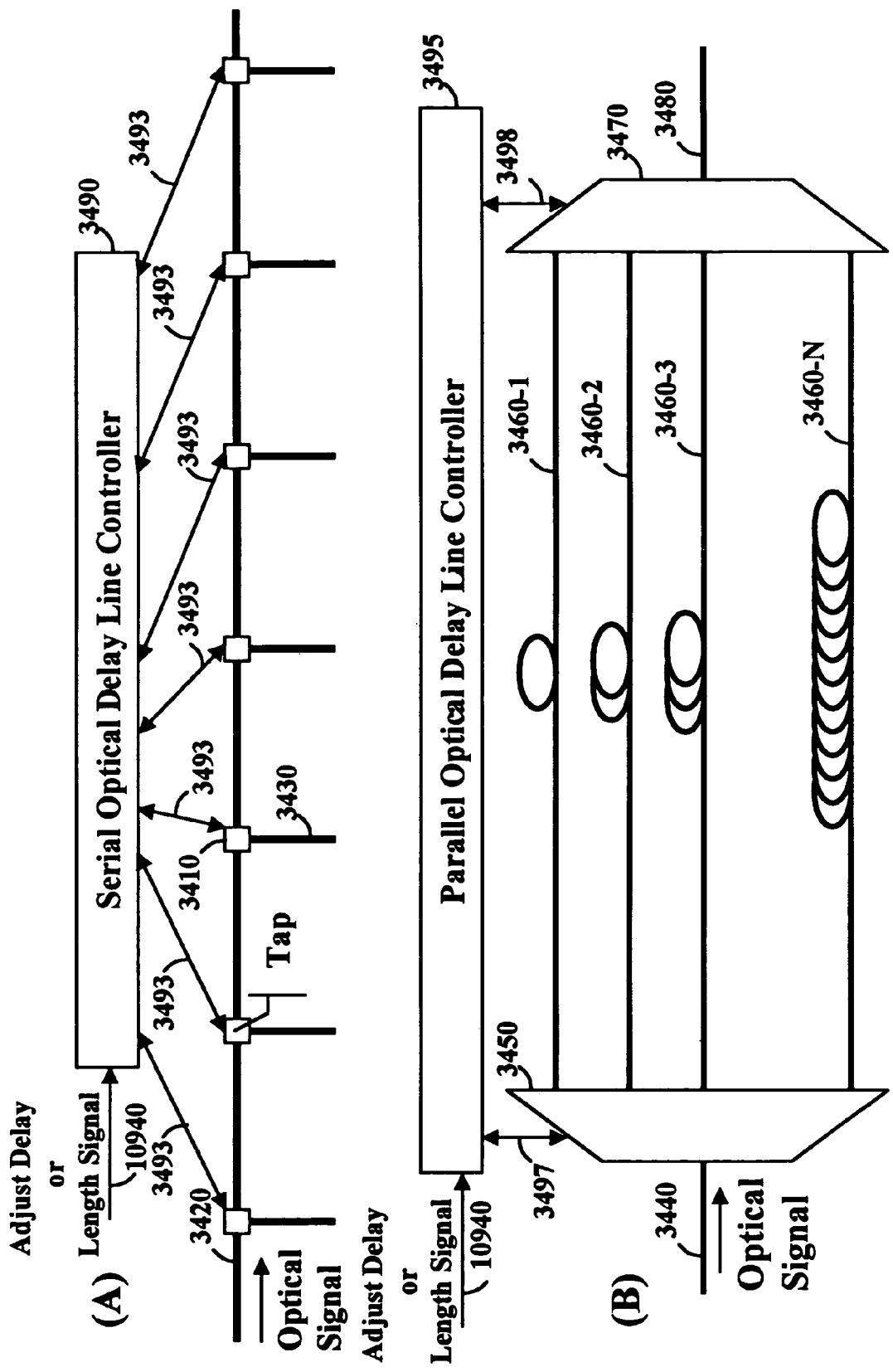
FIG. 34A shows a possible implementation of a serial optical delay line, with multiple tap points.
FIG. 34B shows a possible architecture of a fiber delay line realized as a parallel optical delay line, comprising a plurality of fibers of different length.

The architecture of a linear delay line, a.k.a. serial optical delay line, is shown in FIG. 34A. A plurality of taps 3410 are inserted at predefined intervals onto an optical fiber 3420. The tap 3410 is an optical switch that can let an optical signal pass through along the fiber 3420 or switch it out 3430. In order to better understand how a linear delay line works and the role of time, let us observe a data unit that was injected into the fiber 3420 at time t=0. In order to fetch this data unit at any later time the fiber should be filled with infinite number of taps 3410. Obviously, this is not feasible. In a possible realization taps 3410 are placed in regular intervals that are equally spaced in time. Let us call this time interval T. Consequently, a data unit that was injected into the fiber at time t=0 can be fetched from the fiber at times: t=1·T, 2·T, 3·T, etc. A serial optical delay line controller 3490 determines configures the taps 3410 through its bi-directional control lines 3493, responsive to the amount of time data units are to spend inside the optical delay line. The serial optical delay line controller 3490 receives control and status information from the taps 3410 through its bi-directional control lines 3493.

The architecture of a parallel optical delay line, more widely known as fiber delay line (FDL), is shown in FIG. 34B. Fibers 3460 of different lengths are deployed to delay data units for different amounts of time. The delay experienced by data units in a parallel optical delay line has predefined granularity depending on the length difference between the fibers 3460. The number of parallel fibers 3460 needed to realize a parallel optical delay line depends on the granularity and maximum storage time required. In a possible realization the length difference between fibers 3460 is constant such that the first fiber 3460-1 delays by 1·T, the second fiber 3460-2 delays by 2·T, the third fiber 3460-3 delays by 3·T, and so on. The optical signal injected in the parallel optical delay line through the input 3440 is split by an optical splitter 3450 over the plurality fibers 3460. Only one of the optical signals exiting the plurality of fibers 3460 is selected by an optical selector 3470 for emission on the output 3480 of the optical parallel delay line. The optical selector 3470 can be implemented by at least one of: a plurality of optical gates and an optical star, a plurality of optical gates and an optical multiplexer, an N-by-1 optical switch. A parallel optical delay line controller 3495 configures the optical splitter 3450 and the optical selector 3470 through bi-directional control lines 3497 and 3498, respectively, responsive to the amount of time data units are to spend inside the optical delay line. The parallel optical delay line controller 3495 receives control and status information from the optical splitter 3450 and the optical selector 3470 through the bidirectional control lines 3497 and 3498, respectively.

The Alignment Problem in FIG. 29 and FIG. 4

Each channel (j) of a plurality of incoming channels—possibly being an optical channel multiplexed with other channels on a single fiber—on a selected link (i) has a unique time reference (UTR(i)), as shown in FIG. 29, that is independent of the CTR 002, also shown in FIG. 29.

A timing diagram description of the alignment operation is provided in FIG. 29. The alignment operation as performed by an alignment subsystem 10100 with the architecture shown in FIG. 4, follows the following principle:

TF Alignment of UTR(i) to UTC-with at least three TF queues 1550-principle of operation: The same queue is not used simultaneously for:
1. Receiving data units from the serial link 10160—responsive to Selectin signal 10120 received from the alignment scheduler controller 10110, and
2. Forwarding data units to the switch through line 10165—responsive to Select-out signal 10130 received from the alignment scheduler controller 10110.

In the timing diagram example of FIG. 29 it is shown that a (sub)TF queue ((sub)TF Queue 1, (sub)TF Queue 2, (sub)TF Queue 3—1550), shown in FIG. 4, is not written into and read from at the same time. In other words, the Select-in signal 10120 and the Select-out signal 10130 will not select the same TF queue at the same time.

In the example in FIG. 4, the TF duration deployed on channel 10160 j of link i is TFi_j. Time frames of the common time reference and the UTR-i are divided in sub-time frames of duration subTF. In the examples presented in this disclosure the same sub-time frame duration is deployed on all input channels 10160 and for transfers through the switch fabric; a different sub-time frame duration could be deployed on different channels and for transfers through the switch fabric. The time frame duration on channel (j) is indicated as TF in the timing diagrams depicted in FIG. 29.

The Alignment Problem in the Optical Domain

The alignment operation can be performed in the optical domain. FIG. 12 shows a first possible embodiment of optical alignment subsystem 10900 based on a programmable delay system 10930 and comprising a delay controller 10990 further comprised of an optical alignment controller 10910 and a delineation controller 10920. The programmable delay system 10930 delays the optical signal from the input 10010 to the output 10320, responsive to the adjust delay control signal 10940. The delineation controller 10920 is responsible to devise the unique time reference (UTR-i) associated to input i 10010, and the optical alignment controller 10910 is responsible for determining, responsive to the CTR 002 and the UTR-i 10950, the delay needed to align to the CTR data units received from the input 10010.

Time frames on the input 10010 are aligned to the unique time reference (UTR) associated to the respective optical communication link I—UTR-i. The programmable delay system 10930 delays the optical signal received from the input 10010 in a way that time frames carried by the optical signal on the outgoing optical link 10320 are aligned with the common time reference (CTR). The optical programmable delay system 10930 can be realized, for example, through a serial optical delay line with multiple tap points—such as the one depicted in FIG. 34A—or through a fiber delay line comprising a plurality of fibers of different length—such as the parallel optical delay line depicted in FIG. 34B—or according to one of the embodiments presented below in this disclosure.

Figure 28:
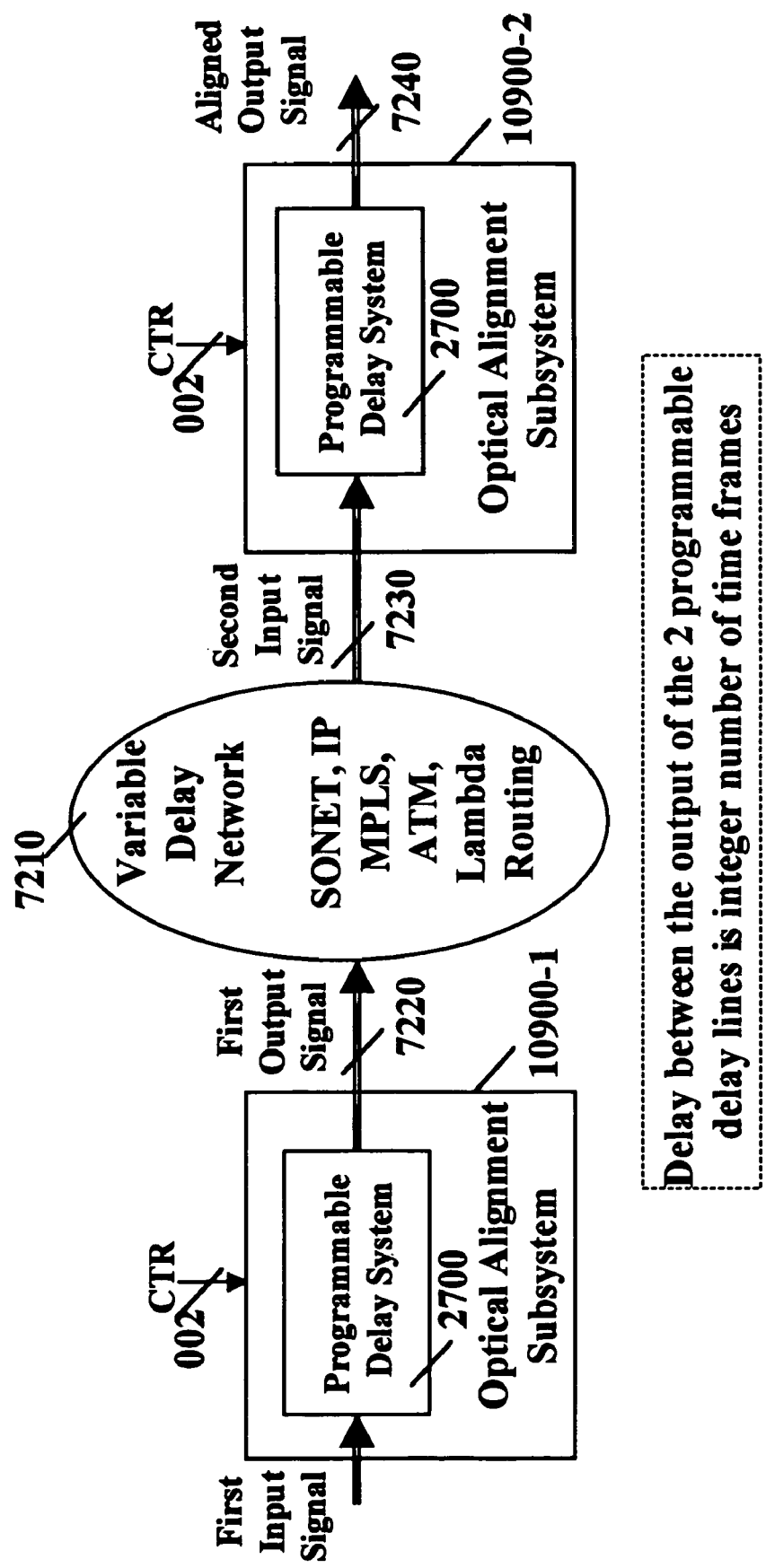
FIG. 28 shows a system in which two optical programmable delay systems are connected across a variable delay network, such as, SONET, ATM, IP, MPLS, all-optical with whole lambda switching, all-optical with fractional lambda switching.

The amount of delay that the programmable delay system 10930 has to introduce depends on the phase difference between the CTR and UTR-i. This phase difference can change over time as a result of changes in the propagation delay over the communications link coupled to input i 10010 in FIG. 12. FIG. 28 shows an example of deployment of optical alignment subsystems 10900. The output link 7220 of a first optical alignment subsystem 10900-1 is coupled to the input link 7230 of a second optical alignment subsystem 10900-2 through a variable delay network 7210 realized, for example, with at least, but not limited to, one of the following technologies: SONET, IP, MPLS, ATM, and Lambda Routing. The time frames on the output link 7220 of the first optical alignment subsystem 10900-1 are aligned to the CTR 002 but, due to the delay experienced across the network 7210, the time frames on the input link 7230 are not necessarily aligned to the CTR 002. Moreover, since the delay experienced through the network 7210 is not constant, the phase difference between the CTR 002 and the UTR of the input link 7230 changes over time.

The delay introduced by the programmable delay system 2700 in the second optical alignment subsystem 10900-2 is such that the overall delay experienced by data units carried by the optical signal when traveling from the output link 7220 of the first optical alignment subsystem 10900-1—through the variable delay network 7210, the input link 7230 of the second optical alignment subsystem 10900-2, and the programmable delay system 2700 of the second optical alignment subsystem 10900-2—to the output link 7240 of the second optical alignment subsystem 10900-2 is an integer number of time frames.

According to the embodiment of optical alignment subsystem 10900 depicted in FIG. 12, the optical alignment controller 10910 compares the UTR-i and the CTR to determine the proper delay that the programmable delay system 10930 should introduce. The optical alignment controller 10910 in FIG. 12 adjusts the delay introduced by the programmable delay system 10930 through the adjust delay control signal 10940. The optical alignment controller 10910 receives the CfR from an external device, such as, for example, a GPS receiver board, and the UTR-i through the UTR-i line 10950 from the delineation controller 10920.

With reference to FIG. 12, the delineation controller 10920 devises the UTR-i directly from the optical signal received through the input 10010. One way for the delineation controller 10920 to devise the UTR-i is through implicit or explicit time frame delimiters embedded in the flow of data units.

Explicit delimiters can be realized by at least one of a plurality of different methods. There can be a different delimiter control word to signal the beginning of a new TF (i.e., a time frame delimiter—TD), time cycle (i.e., a time cycle delimiter—TCD) and super cycle (i.e., a super cycle delimiter—SCD). The delimiter control word can be included in the stream of bits or symbols transmitted at the physical level, e.g., with an 8B/10B encoding. The explicit delimiter signaling can be realized by the SONET/SDH path overhead field that was designed to carry control, signaling and management information. Alternatively, the explicit delimiter signaling can be embedded in the PPP, HDLC, IP header, or in any protocol header exchanged over the communcations links between switches. An implicit delimiter can be realized by measuring the UTR-i time with respect to the CTR. An alternative way of implementing an implicit delimiter is by counting the number of bytes from an explicit delimiter.

Alternatively, time frame delineation can be based on time frame delimiters in the optical signal carried on the communications link coupled to input i. A possible embodiment of optical time frame delimiter consists of dedicating one of the wavelengths of the communications link for transmission of the delimiter. The delineation controller 10920 detects the delimiters on the dedicated wavelength and devises the UTR-i. In an alternative embodiment the time frame delimiter are realized by introducing a gap, i.e., a period of dark, in the optical signal on the boundary between two adjacent time frames, as shown in FIG. 33. In other words, for each time frame, after having transmitted all the data units belonging to the time frame, the laser transmitter of each wavelength is turned off before starting transmitting data units belonging to the next time frame. The delineation controller 10920 detects the gaps on at least one of the wavelengths of the input 10010 and uses the derived timing information to devise the link's UTR.

By using at least one of the above mentioned explicit and implicit delimiters, the delineation controller 10920 is capable of devising the UTR-i from the information received from input line 10010 and of generating the corresponding UTR-i signal 10950.

FIG. 30 shows a second possible embodiment of optical alignment subsystem 10900 based on an optical programmable delay system 10930 and comprising a delay controller 10990 further comprised of an optical alignment controller 10910 and a delineation controller 10920. The programmable delay system 10930 delays the optical signal from the input 10010 responsive to the adjust delay control signal 10940. The delineation controller 10920 is responsible for devising the aligned unique time reference (aUTR-i) 10960 associated to outgoing optical link 10320 corresponding to input i 10010. The optical alignment controller 10910 is responsible for determining, responsive to the CTR 002 and the aUTR-i 10960, the delay needed to align to the CTR data units received from the input 10010, i.e., to align the aUTR-i 10960 and the CTR 002.

Time frames on the input 10010 are aligned to the unique time reference (UTR-i) associated to the respective optical communication link I—UTR-i. The programmable delay system 10930 delays the optical signal received from the input 10010 in a way that time frames associated to data units carried by the optical signal on the outgoing optical link 10320 constituting the aUTR-i, are aligned to the common time reference (CTR). The optical programmable delay system 10930 can be realized, for example, through through an optical delay line with multiple tap points (a.ka. linear optical delay line)—such as the one depicted in FIG. 34A—or through a fiber delay line comprising a plurality of fibers of different length (a.k.a. parallel optical delay line)-such as the parallel optical delay line depicted in FIG. 34B—or according to one of the embodiments presented below in this disclosure (see FIG. 27, 31, 32, and 35).

The amount of delay that the programmable delay system 10930 has to introduce depends on the phase difference between the CTR and aUTR-i, i.e., ultimately the phase difference between CTR and UTR-i. This phase difference can change over time as a result of changes in the propagation delay over the communications link coupled to the input i 10010. The optical alignment controller 10910 compares the aUTR-i and the CTR to determine the proper delay that the programmable delay system 10930 should introduce in order to keep the aUTR-i signal 10960 aligned to the CTR 002. The optical alignment controller 10910 adjusts the delay introduced by the programmable delay system 10930 through the adjust delay control signal 10940. The optical alignment controller 10910 receives the CTR signal 002 from an external device, such as, for example, a GPS receiver board, and the aUTR-i through the aUTR-i line 10960 from the delineation controller 10920.

The delineation controller 10920 devises the aUTR-i directly from the optical signal transported by the outgoing optical link 10320. One way for the delineation controller 10920 to devise the aUTR-i is through implicit or explicit time frame delimiters embedded in the flow of data units. Explicit delimiters can be realized by one of a plurality of different methods. There can be a different delimiter control word to signal the beginning of a new TF (i.e., a time frame delimiter—TFD), time cycle (i.e., a time cycle delimiter—TCD) and super cycle (i.e., a super cycle delimiter—SCD). The delimiter control word can be included in the stream of bits or symbols transmitted at the physical level, e.g., with an 8B/10B encoding. The explicit delimiter signaling can be realized by the SONET/SDH path overhead field that was designed to carry control, signaling and management information. Alternatively, the explicit delimiter signaling can be embedded in the PPP, HDLC, IP header, or in any protocol header exchanged over the communications links between switches. An implicit delimiter can be realized by measuring the UTR-i time with respect to the CTR. An alternative way of implementing an implicit delimiter is by counting the number of bytes from an explicit delimiter.

Alternatively, time frame delineation can be based on time frame delimiters in the optical signal carried on the communications link coupled to input i. A possible embodiment of time frame delimiter consists of dedicating one of the wavelengths of the communications link for transmission of the delimiter. The delineation controller 10920 detects the delimiters on the dedicated wavelength and devises the aUTR-i. In an alternative embodiment time frame delimiters are realized by introducing a gap, i.e., a period of dark, in the optical signal on the boundary between two adjacent time frames, as shown in FIG. 33. In other words, for each time frame, after having transmitted all the data units belonging to the time frame, the laser transmitter of each wavelength is turned off before starting transmitting data units belonging to the next time frame, as shown in FIG. 33. The delineation controller 10920 in FIG. 30 detects the gaps on at least one of the wavelengths of the outgoing optical link 10320 and uses the derived timing information to devise the aUTR-i corresponding to input link i 10010.

Realization of an Optical Programmable Delay System

FIG. 34A shows a possible embodiment of optical programmable delay system 10930 based on a serial optical delay line comprising of an optical fiber 3420 interrupted by a plurality of tap points 3410 and a serial optical delay line controller 3490. In the preferred embodiment tap points 3410 are equally spaced; the distance between two subsequent tap points 3410 determines the granularity with which the delay introduced by the serial optical delay line can be adjusted.

In the preferred embodiment the tap point 3410 is implemented by a 1-by-2 optical switch. In an alternative embodiment tap points 3410 can be realized by means of optical stars, a.k.a. optical splitters and star couplers. A serial optical delay line controller 3490 determines the delay experienced by an optical signal entering the serial optical delay line through the input optical fiber 3420 and being switched by a selected one of the tap point 3410 to its output 3430 by selecting, through control signals 3493, one of the 1-by-2 optical switches for connecting its input with its output 3430. The serial optical delay line controller 3490 operates responsive to the adjust delay control signal 10940 that is also called length signal since it modifies the length of the fiber traveled by optical signals traversing the optical delay line.

FIG. 34B shows a possible embodiment of fiber delay line or parallel optical delay line comprising a plurality of different length optical fibers 3460-1 through 3460-N coupled to an input fiber 3440 through an input coupling device 3450 and to an output fiber 3480 via an output coupling device 3470. The input coupling device 3450 can be, but is not restricted to, a star coupler, or a 1-by-N switch. The output coupling device 3470 can be, but is not restricted to, one of the following: a star coupler, a plurality of optical gates and a star coupler, an optical multiplexer, a plurality of optical gates and an optical multiplexer, an N-by-1 switch.

A parallel optical delay line controller 3495 determines the delay experienced by an optical signal entering the serial optical delay line through the input optical fiber 3440 and exiting through the output optical fiber 3480 by selecting one of the N parallel different length optical fibers 3460 through the control signals 3497 and 3498. The parallel optical delay line controller 3495 operates responsive to the adjust delay control signal 10940 that is also called length signal since it modifies the length of the fiber traveled by optical signals traversing the optical delay line.

Figure 27:
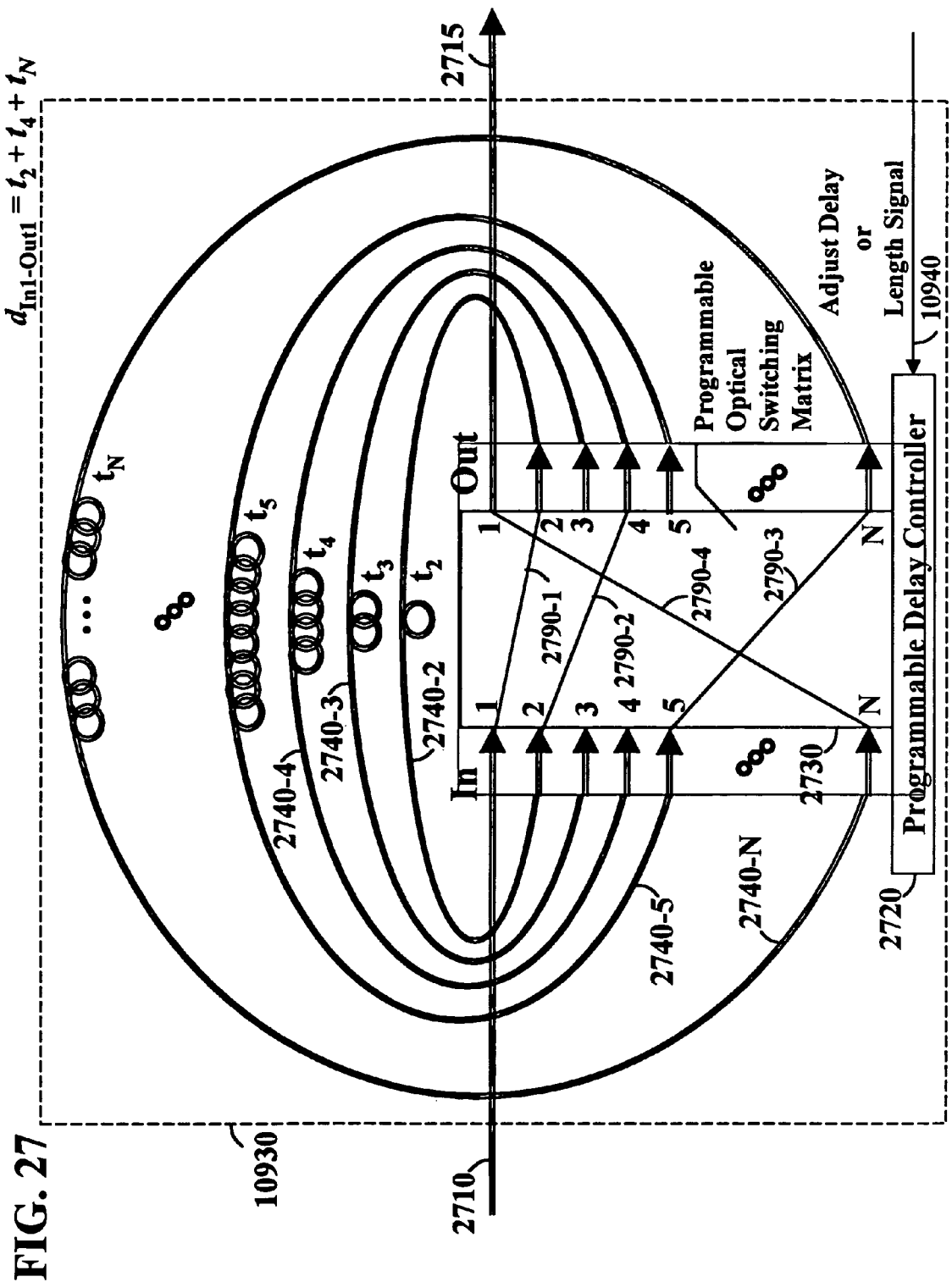
FIG. 27 shows a possible embodiment of optical programmable delay system based on a programmable optical switching matrix and a set of fiber connections between switch outputs and switch inputs.

A possible alternative embodiment of the programmable delay system 10930 is shown in FIG. 27 and includes a programmable optical switching matrix 2730 with a plurality of input ports and output ports (numbered from 1 to N); a programmable delay controller 2720; a plurality of optical fibers 2740-2 through 2740-N, each connecting one of the outputs to a respective one of the inputs, and an programmable delay controller 2720. One or more optical fibers can have the same length or have different lengths, wherein fiber i's length is given by $l_i = C \, t_i$, where C is the speed of light in the fiber and $t_i$ is the delay introduced by the corresponding optical fiber.

By properly configuring input/output connections 2790 across the programmable optical switching matrix an optical signal entering the programmable delay system from a mater input 2710 connected to switch input 1 is delayed, i.e., buffered, until it exists from switch output 1 2715, for a time corresponding to the sum of the propagation delay through a subset of the said plurality of optical fibers. For example, when the input/output connections 2790-1 through 2790-4 in FIG. 27 are configured, the delay experienced by an optical signal traveling from the master input 2710 to the master output 2715 of the programmable delay system 10930 is $t_2 + t_4 + t_N$, as expressed by the delay equation in FIG. 27. In other words, the optical programmable delay system 10930 presented in FIG. 27 provides a delay which is obtained as the sum of the time required by an optical signal to traverse an arbitrary subset of the plurality of optical fibers 2740 connecting the switch outputs to the switch inputs.

In the example configuration in FIG. 27, an optical signal entering the programmable delay system 10930 through its input 2710 is switched by input/output connection 2790-1 of the programmable optical switching matrix 2730 to output 2 and travels on the corresponding optical fiber 2740-2 to input 2, where it is switched to output port 4 by the input/output connection 2790-2. Then the optical signal enters optical fiber 2740-4 and travels to input 4 where it is switched to output port N by the input/output connection 2790-3. After having traveled through optical fiber 2740-N, the optical signal is switched to output port 1, connected to the programmable delay system output 2715, by the input/output connection 2790-4.

The programmable delay controller 2720 configures the programmable optical switching matrix 2730 to provide the input/output connections 2790 required to introduce the required delay between input 2710 and output 2715 of the programmable delay system 10930. The programmable delay controller 2720 can receive control and status information from the programmable optical switching matrix 2730. The programmable delay controller 2720 operates responsive to the adjust delay control signal 10940 that is also called length signal since it modifies the length of the fiber traveled by optical signals traversing the programmable delay system 10930.

In a possible embodiment, the length of each fiber in the set of fibers 2740 is chosen as a multiple of a base length, wherein the multiple is a power of 2. For example, if $C \cdot t_0$ is the base length, the length of each fiber in the set of N fibers can be chosen as $C \cdot t_0, 2 \cdot C \cdot t_0, 2^2 \cdot C \cdot t_0, 2^{N-1} \cdot C \cdot t_0$. The choice of this set allows the delay imposed by the programmable delay system 10930 to be varied between 0 and $(2^N - 1) \cdot t_0$, with a granularity $t_0$. The total amount of fiber needed is $(2^N - 1) \cdot C \cdot t_0$, which is the amount required by a tap-based optical delay line, and much smaller than the amount required by a traditional parallel fiber delay line. Given a maximum delay D, the total number of switch inputs/outputs N required to provide a granularity $t_0$ is ceil[$\log_2$ceil(D/$t_0$ + 1)], where ceil(x) is a function returning the smallest integer greater than or equal to x. Notice that an optical signal delayed by an optical programmable delay system 10930 according to this embodiment traverses the programmable optical switching matrix at most N times, while the optical signal delayed by a serial optical delay line traverses D/$t_0$ taps. In other words, assuming that a tap introduces the same attenuation as a programmable optical switching matrix (they are both switches), the attenuation (measured in dB) introduced by an optical programmable delay sir system 10930 according to this embodiment is roughly the base 2 logarithm of the attenuation (measured in dB) introduced by a serial optical delay line.

For example, given a basic delay $t_0 = 80$ ns, provided by 16 meters of fiber, and an 8-by-8 programmable optical switching matrix 2730, an programmable delay system can be realized which provides a variable delay between 0 and 10 microseconds with a granularity of 80 ns. The resulting programmable delay system requires a total of 2,032 meters of fiber. The programmable optical switching matrix 2730 in FIG. 27 is traversed at most 8 times by an optical signal, while an equivalent serial optical delay line contains 256 taps. Given that the insertion loss of a tap is the same as the one of a programmable optical switching matrix, the power loss (measured in dB) of an optical signal traversing the presented embodiment of programmable optical delay system is (measured in dB) 8 times lower than the one introduced by a serial optical delay line.

Figure 31:
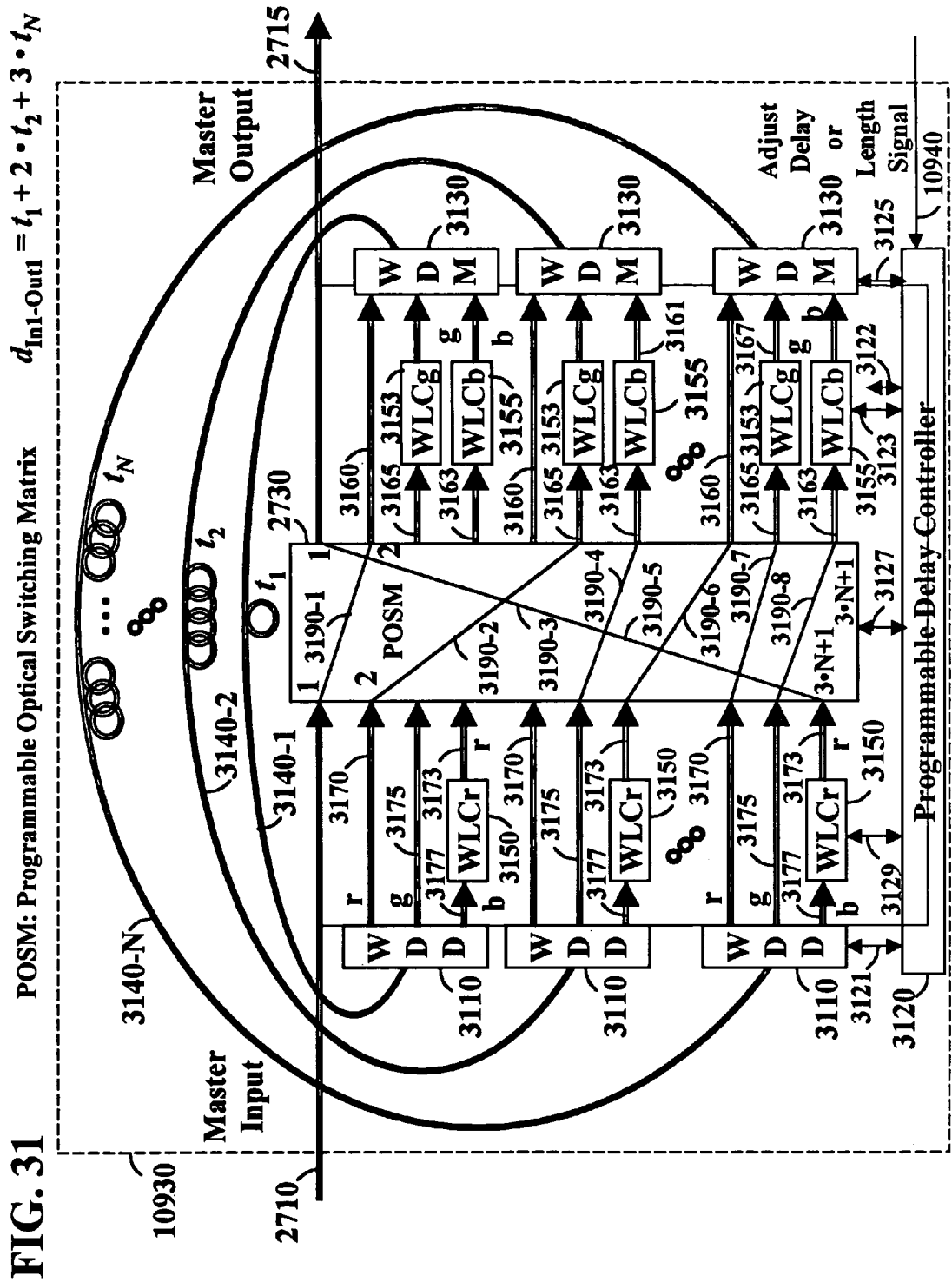
FIG. 31 shows a possible embodiment of optical programmable delay system, according to the present invention, that is based on a programmable optical switching matrix, a plurality of wavelength division de-multiplexers (WDDs), a plurality of wavelength converters (WLCs) in both inputs and outputs, and a plurality of wavelength division multi-plexers (WDMs), and comprises an programmable delay controller.

FIG. 31 shows an alternative embodiment of optical programmable delay system 10930 based on a programmable optical switching matrix (POSM) 2730 and comprising a programmable delay controller 3120, a plurality of wavelength converters (WLCs) 3150, 3153, 3155 connected to a subset of the switch inputs 3170, 3173, and 3175 and outputs 3160, 3163, and 3165, a plurality of wavelength division multiplexers (WDMs) 3130, a plurality of wavelength division de-multiplexers (WDDs) 3110, and a plurality of optical fibers 3140, each one connecting the output of a WDM 3130 to the input of a WDD 3110.

Deployment of WLCs 3150, 3153, 3155 enables an optical fiber to be traversed a plurality of times by the same data units, each time carried on a different wavelength. In the embodiment presented in FIG. 31, two WLCs (WLCg 3153 and WLCb 3155) are connected to a respective input 3167 and 3161 of each WDM 3130. Another embodiment uses two wavelengths and hence one WLC, e.g., WLCg 3153, connected to a respective input 3167 of each WDM 3130. An alternative embodiment uses a number of wavelengths w larger than 3 and hence w−1 WLCs are connected to the inputs of each WDM 3130. In another embodiment the number of WLCs connected to each WDM 3130 is not the same for all the WDMs 3130.

Each WLC converts an optical signal transmitted over a first predefined wavelength to an optical signal on a second predefined wavelength, wherein the optical signal before and after the conversion carry the same digital information.

As shown in the POSM connection example in FIG. 31, an optical signal entering the programmable delay system 10930 from its input 2710 on a first wavelength r is switched through input/output connection 3190-1 to POSM output 2, which is not connected to a wavelength converter. The optical signal travels once through the respective optical fiber 3140-1.

Then, input/output connection 3190-2 through the programmable optical switching matrix 2730 switches the signal, on a first wavelength r, to an output 3165 connected to a WLC (WLCg) 3153. The signal will travel twice through the corresponding fiber 3140-2. In fact, the WLC 3153 converts the incoming first wavelength r to an outgoing second wavelength g that is injected into the corresponding optical fiber 3140-2 by a corresponding WDM 3130.

When exiting from the fiber 3140-2, after the first travel, over the second wavelength g generated by WLCg 3153, the optical signal is separated by WDD 3110 on input 3175 of the programmable optical switching matrix 2730 and it is switched by input/output connection 3190-4 to an output 3163 connected to a WLC (WLCb) 3155. The WLC WLCb 3155 converts the incoming second wavelength g to an outgoing third wavelength b that is injected on the corresponding optical fiber 3140-2 by a corresponding WDM 3130.

After the second travel through the fiber 3140-2 over the third wavelength b generated by WLCb 3155, the optical signal is separated by the respective WDD 3110 on output 3177 connected to a WLC (WLCr) 3150 that converts the incoming third wavelength b to an outgoing first wavelength r on a connection 3173 to the programmable optical switching matrix 2730. Input/output connection 3190-6 switches the optical signal to an output 3160 connected to a WDM 3130 that injects the optical signal on a fiber 3140-N on which, due to the input/output connections 3190-7 and 3190-8, the optical signal is going to travel three times: as a first wavelength r, then as a second wavelength g, and finally as a third wavelength b. The optical signal exiting optical fiber 3140-N over wavelength b is separated by the corresponding WDD 3110 on line 3177, converted into wavelength r by WLCr 3150, enters the programmable optical switching matrix 2730 through the optical line 3173 connected to input 3−N+1, and, through the input/output connection 3190-5, it reaches POSM output 1 that is connected to the output 2715 of the programmable delay system 10930.

The delay introduced by the programmable delay system 10930 with the programmable optical switching matrix configuration shown in FIG. 31 3190 is $t_1 + 2 \cdot t_2 + 3 \cdot t_N$.

The programmable delay controller 3120 in FIG. 31 is responsible for changing the configuration of the programmable optical switching matrix 2730 through control signal 3127. In a possible embodiment, the WDDs 3110, WDMs 3130, and the wavelength converters WLCr 3150, WLCg 3153, and WLCb 3155 operate in a static way. In another embodiment, the programmable delay controller 3120 in FIG. 31 changes the configuration of the WDDs 3110, of the WDMs 3130, and of the wavelength converters WLCr 3150, WLCg 3153, and WLCb 3155, through control signals 3121, 3125, 3129, 3122, and 3123, respectively. The programmable delay controller 3120 can receive control information from the programmable optical switching matrix 2730, the WDDs 3110, the WDMs 3130, and the wavelength converters WLCr 3150, WLCg 3153, and WLcb 3155, through the bidirectional control signals 3127, 3121, 3125, 3129, 3122, and 3123, respectively. The programmable delay controller 3120 operates responsive to the adjust delay control signal 10940 that is also called length signal since it modifies the length of the fiber traveled by optical signals traversing the programmable delay system 10930.

In a possible embodiment, the length of each fiber in the set of fibers 3140 is chosen as a multiple of a base length, wherein the multiple is a power of 2. For example, if $C \cdot t_0$ is the base length, the length of each fiber in the set of N fibers can be chosen as $C \cdot t_0$, $2^{floor[log(w)]} \cdot C \cdot t_0$, $2^{floor[2 \cdot log(w)]} \cdot C \cdot t_0$, ..., $2^{floor[(N-1) \cdot log(w)]} \cdot C \cdot t_0$, where floor(x) is a function returning the largest integer smaller than or equal to x, log(x) is a function returning the base 2 logarithm of x, and w+1 is the total number of wavelengths per optical fiber. The choice of this set allows the delay imposed by the programmable delay system 10930 to be varied between 0 and $(2^{floor[N \cdot log(w)]} - 1) \cdot t_0$, with a granularity $t_0$. The total amount of fiber needed is smaller than the amount required by the previous embodiments (e.g., the one shown in FIG. 27) of programmable delay system. The total number of POSM inputs (outputs) is $N \cdot (w+1) + 1$.

For example, given a basic delay $t_0 = 80$ ns, provided by 16 meters of fiber, a 21-by-21 programmable optical switching matrix and five wavelengths (w=4) on each fiber 3140 enable the realization of a programmable delay system that provides a variable delay between 0 and 10 microseconds with a granularity of 80 ns. The resulting programmable delay system requires four fibers having an overall length of 1,360 meters, wherein the lengths of the four fibers are 16 meters, 16·4=64 meters, 16·16=256 meters, and 16*64=1,024 meters.

Figure 32:
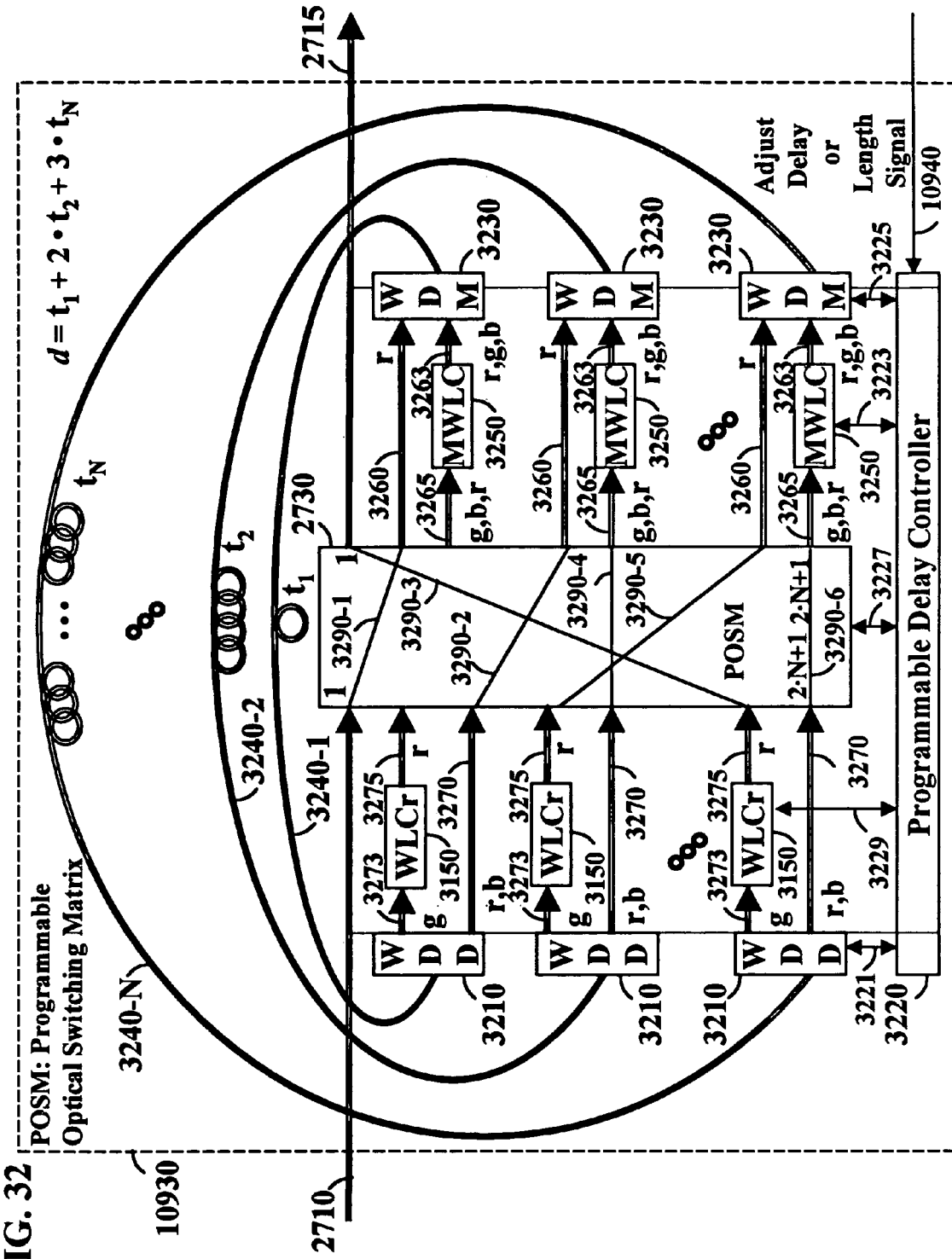
FIG. 32 shows a possible embodiment of optical programmable delay system, according to the present invention, that is based on a programmable optical switching matrix, a plurality of wavelength division de-multiplexers (WDDs), a plurality of multiple wavelength converters (MWLCs) only at the outputs, and a plurality of wavelength division multiplexers (WDMs), and comprises a programmable delay controller.

FIG. 32 shows an alternative embodiment of programmable delay system 10930 utilizing a programmable optical switching matrix (POSM) 2730 and multiple wavelengths on each fiber. The embodiment of programmable delay system 10930 depicted in FIG. 32 comprises a programmable delay controller 3220, a programmable optical switching matrix (POSM) 2730, a plurality of wavelength converters (WLCr) 3150, a plurality of multi-wavelength converters (MWLCs) 3250, one for each optical fiber 3240 connecting a respective one of a plurality of WDMs 3230 to a respective one of a plurality of WDDs 3210. Each MWLC 3250 converts a first selected one of a plurality of wavelengths (e.g., wavelength g, wavelength b, wavelength r) presented at its input 3265 into a second selected one of a plurality of wavelengths (e.g., wavelength b, wavelength r, wavelength g) emitted from its output 3263 in such a way that the digital information carried by the second selected wavelength is the same as the one carried by the first selected wavelength.

Deployment of MWLCs 3250 enables an optical fiber 3240 to be traversed a plurality of times by the same data units, each time carried on a different wavelength (e.g., wavelength g, wavelength b, wavelength r).

Given the POSM configuration shown in the example in FIG. 32, an optical signal entering the programmable delay system 10930 from its input 2710 is switched through input/output connection 3290-1 to a POSM output 3260 which is not connected to a MWLC 3250. The optical signal travels once through the respective optical fiber 3240-1 and is separated by the corresponding WDD 3210 on POSM input 3270.

Then, input/output connection 3290-2 through the programmable optical switching matrix 2730 switches the signal, on a first wavelength r, to an output 3260 where the optical signal is injected into a second optical fiber 3240-2 by the respective WDM 3230. The signal will travel twice through the fiber 3240-2.

When exiting from optical fiber 3240-2, after a first travel on the first wavelength r, the optical signal is separated by the corresponding WDD 3210 on POSM input 3270. The input/output connection 3290-4 through the programmable optical switching matrix 2730 switches the signal to an output 3265 connected to a MWLC 3250 that converts the signal to an outgoing second wavelength g sent to the corresponding WDM 3230 through line 3263. The WDM 3230 injects the second wavelength g into the optical fiber 3240-2 for a second travel. The optical signal travels for the second time through the respective optical fiber 3240-2 as wavelength g and it is separated by the corresponding WDD 3210 on line 3273 connected to a WLCr 3150 that converts the second wavelength g into an outgoing first wavelength r sent to switch input 3275.

Input/output connection 3290-5 through the programmable optical switching matrix 2730 switches the signal, on the first wavelength r, to an output 3260 where the optical signal is injected into a third optical fiber 3240-N by the respective WDM 3230. The signal will travel three times through the fiber 3240-N.

The optical signal exits optical fiber 3140-N for the first time over the first wavelength r and is separated by the respective WDD 3210 on input 3270 of the programmable optical switching matrix 2730. Through the input/output connection 3290-6 the optical signal is switched to output 3265 connected to a respective MWLC 3250 that converts the incoming first wavelength r to an outgoing third wavelength b emitted on line 3263. A WDM 3230 injects the optical signal into the optical fiber 3240-N and the optical signal propagates through it for the second time until it reaches the respective WDD 3210 that separates the third wavelength b on input 3270 of the programmable optical switching matrix 2730.

Through the input/output connection 3290-6 the optical signal is switched to output 3265 connected to the respective MWLC 3250 that converts the incoming third wavelength b to an outgoing second wavelength g emitted on line 3263. A WDM 3230 injects the optical signal into the optical fiber 3240-N and the optical signal propagates through it for the third time until the respective WDD 3210 that separates the second wavelength g on line 3273 connected to a WLCr 3150. The WLCr 3150 converts the second wavelength g to a first wavelength r emitted on line 3275 connected to input 2-N of the programmable optical switching matrix 2730. The optical signal is switched through input/output connection 3290-3 to output 1 of the programmable optical switching matrix 2730 connected to the output 2715 of the programmable delay system.

The delay provided by the programmable delay system 10930 with the programmable optical switching matrix configuration shown in FIG. 32 3290 is $t_1 + 2 \cdot t_2 + 3 \cdot t_N$.

The programmable delay controller 3220 in FIG. 32 is responsible for changing the configuration of the programmable optical switching matrix 2730 through control signal 3227. In a possible embodiment, the WDDs 3210, WDMs 3230, the wavelength converters WLCr 3150, and MWLCs 3250 operate in a static way. In another embodiment, the programmable delay controller 3220 in FIG. 32 changes the configuration of the WDDs 3210, the WDMs 3230, the wavelength converters WLCr 3150, and MWLCs 3250 through control signals 3221, 3225, 3229, and 3223, respectively. The programmable delay controller 3220 can receive control and status information from the programmable optical switching matrix 2730, the WDD 3210, the WDM 3230, the wavelength converters WLCr 3150, and MWLC 3250, through the bidirectional control signals 3227, 3221, 3225, 3229, and 3223, respectively. The programmable delay controller 3220 operates responsive to the adjust delay control signal 10940 that is also called length signal since it modifies the length of the fiber traveled by optical signals traversing the programmable delay system 10930.

In a possible embodiment, the length of each fiber in the set of fibers 3140 is chosen as a multiple of a base length, wherein the multiple is a power of 2. For example, if $C \cdot t_0$ is the base length, the length of each fiber in the set of N fibers can be chosen as $C \cdot t_0$, $2^{floor[log(w)]} \cdot C \cdot t_0$, $2^{floor[2 \cdot log(w)]} \cdot C \cdot t_0, \ldots, 2^{floor[(N-1) \cdot log(w)]} \cdot C \cdot t_0$, where floor(x) is a function returning the largest integer smaller than or equal to x, log(x) is a function returning the base 2 logarithm of x, and w+1 is the total number of wavelengths per optical fiber. The choice of this set allows the delay imposed by the programmable delay system 10930 to be varied between 0 and $(2^{floor[(N \cdot log(w)]} - 1) \cdot t_0$, with a granularity $t_0$. The total amount of fiber needed is smaller than the amount required by the previous embodiments (e.g., the one shown in FIG. 27) of programmable delay system. The total number of POSM inputs (outputs) is N·2+1, i.e., the size of the programmable optical switching matrix 2730 deployed in the embodiment presented in FIG. 32 is fixed—independent of the number of channels per optical fiber—and smaller than the size of the programmable optical switching matrix 2730 required in the embodiment presented in FIG. 31.

For example, given a basic delay $t_0 = 80$ ns, provided by 16 meters of fiber, and a 9-by-9 programmable optical switching matrix, if five wavelengths are used (w=4) on each fiber 3140, a programmable delay system can be realized which provides a variable delay between 0 and 10 microseconds with a granularity of 80 ns. The resulting programmable delay system requires four fibers having an overall length of 1,360 meters, wherein the lengths of the four fibers are 16 meters, 16·4=64 meters, 16·16=256 meters, and 16*64=1,024 meters.

FIG. 35 shows an alternative embodiment of programmable delay system 10930 utilizing a programmable optical wavelength switching matrix (POWSM) 3510 and multiple wavelengths on each fiber. The embodiment of programmable delay system 10930 depicted in FIG. 35 comprises a programmable delay controller 3520, a plurality of multi-wavelength converters (MWLCs) 3250, one for each optical fiber 3240 connecting a respective one of the MWLCs 3250 to a respective one of programmable optical wavelength switching matrix (POWSM) 3510. Each MWLC 3250 converts a first selected one of a plurality of wavelengths (e.g., wavelength g, wavelength b, wavelength r) presented at its input 3565 into a second selected one of a plurality of wavelengths (e.g., wavelength r, wavelength g, wavelength b) emitted from its output 3540 in such a way that the digital information carried by the second selected wavelength is the same as the one carried by the first selected wavelength. Deployment of MWLCs 3250 enables any one of the plurality of optical fibers 3540 to be traversed a plurality of times by the same data units, each time carried on a different wavelength (e.g., wavelength g, wavelength b, wavelength r).

The POWSM 3510 deployed in this embodiment is capable of independently switching any wavelength channel received on any one of the plurality of optical fibers 3540 coupled to its inputs 1 through N+1 to any of its outputs 1 through N+1. Wavelength channels switched from different POWSM inputs to a selected one of the POWSM outputs are multiplexed on the respective output line 2715 and 3540.

With the POWSM configuration shown in the example in FIG. 35, the r wavelength comprised in an optical signal entering the programmable delay system 10930 from its input 2710 is switched through input/output connection 3590-1 to a POWSM output 3565 connected to a respective MWLC 3250. The respective MWLC 3250 converts wavelength r into wavelength g emitted on the optical fiber 3540-1. The optical signal travels once through the respective optical fiber 3540-1 as wavelength g and, when it reached POWSM input 2, it is switched to output 3 by the input/output connection 3590-2.

Wavelength g emitted on the respective line 3565 is converted by the respective MWLC 3250 into wavelength b that is injected in the optical fiber 3540-2 through which the optical signal travels a first time until the corresponding POWSM input number 3. Input/output connection 3590-3 through the programmable optical wavelength switching matrix 3510 switches the optical signal, on wavelength b, to output 3 where the optical signal is sent through the respective line 3565 to a MWLC 3250 that converts it to an outgoing wavelength r injected into the optical fiber 3540-2 for a second travel of the optical signal. The optical signal travels for the second time through the respective optical fiber 3540-2 as wavelength r. Upon arrival to the corresponding input 3 the optical signal on wavelength r is switched to POWSM output N+1 through input/output connection 3590-4.

Here the optical signal on wavelength r is emitted on the respective line 3565 and wavelength r is converted by the corresponding MWLC 3250 into wavelength g that is injected on the optical fiber 4530-N on which the optical signal is going to travel three times, first over wavelength g, then over wavelength b, and finally over wavelength r.

When the optical signal exits optical fiber 3140-N for the first time over wavelength g, it is switched to POWSM output N+1 by input/output connection 3590-5. When the optical signal exits optical fiber 3140-N for the second time-over wavelength b, it is switched to POWSM output N+1 by input/output connection 3590-5. Finally, when the optical signal exits optical fiber 3140-N for the third time over wavelength r, it is switched to POWSM output 1 by input/output connection 3590-6 and emitted on the programmable delay system output 2715.

The delay provided by the programmable delay system 10930 with the programmable optical wavelength switching matrix configuration shown in FIG. 35 3590 is $t_1 + 2 \cdot t_2 + 3 \cdot t_N$.

The programmable delay controller 3520 in FIG. 35 is responsible for changing the configuration of the programmable optical wavelength switching matrix 3510 through control signal 3525. In a possible embodiment, MWLCs 3250 operate in a static way. In another embodiment, the programmable delay controller 3520 in FIG. 35 changes the configuration of the MWLCs 3250 through control signals 3523. The programmable delay controller 3520 can receive control and status information from the programmable optical wavelength switching matrix 3510 and MWLC 3250 through the bidirectional control signals 3525 and 3523. The programmable delay controller 3520 operates responsive to the adjust delay control signal 10940 that is also called length signal since it modifies the length of the fiber traveled by optical signals traversing the programmable delay system 10930.

In a possible embodiment, the length of each fiber in the set of fibers 3540 is chosen as a multiple of a base length, wherein the multiple is a power of 2. For example, if $C \cdot t_0$ is the base length, the length of each fiber in the set of N fibers can be chosen as $C \cdot t_0$, $2^{floor[log(w)]} \cdot C \cdot t_0$, $2^{floor[2 \cdot log(w)]} \cdot C \cdot t_0, \ldots, 2^{floor[(N-1) \cdot log(w)]} \cdot C \cdot t_0$, where floor(x) is a function returning the largest integer smaller than or equal to x, log(x) is a function returning the base 2 logarithm of x, and w+1 is the total number of wavelengths per optical fiber. The choice of this set allows the delay imposed by the programmable delay system 10930 to be varied between 0 and $(2^{floor[(N \cdot log(w)]} - 1) \cdot t_0$, with a granularity $t_0$. The total amount of fiber needed is smaller than the amount required by previous embodiments (e.g., the one shown in FIG. 27) of programmable delay system. The total number of POWSM inputs (outputs) is N+1, ie., the size of the programmable optical wavelength switching matrix 3510 deployed in the embodiment presented in FIG. 35 is fixed—independent of the number of channels per optical fiber—and smaller than the size of the programmable optical switching matrix 2730 required in the embodiments presented in FIG. 31 and FIG. 32. However, the POWSM 3510 used in the embodiment presented in FIG. 35 must be capable of independently switching single wavelengths, while the POSMs 2730 deployed in the previous embodiments (FIG. 27, FIG. 31, and FIG. 32) switch to the same output all the wavelength carried on each one of the plurality of input fibers.

For example, given a basic delay $t_0 = 80$ ns, provided by 16 meters of fiber, and a 5-by-5 programmable optical wavelength switching matrix, if five wavelengths are used (w=4) on each fiber 3540, a programmable delay system can be realized which provides a variable delay between 0 and 10 microseconds with a granularity of 80 ns. The resulting programmable delay system requires four fibers having an overall length of 1,360 meters, wherein the lengths of the four fibers are 16 meters, 16·4=64 meters, 16·16=256 meters, and 16*64=1,024 meters.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A switching system having an input and an output, the switching system further comprising:
    a first communications switch and a second communications switch connected by at least one communications link, comprising at least one channel, for transmitting a plurality of data units through said communications link to the output of the switching system;
    a common time reference (CTR);
    means for deriving the CTR from a Coordinated Universal Time (UTC) standard;
    wherein each of the communications switches is further comprised of a plurality of input ports and a plurality of output ports, each of the input ports connected to and receiving data units from the communications link over at least one of the channels, and each of the output ports connected to and transmitting data units to the communications link over at least one of the channels;

wherein each of the communications switches has a switch controller, coupled to the CTR, the respective input ports, and the respective output ports;

wherein each of the communications switches has an optical interconnection subsystem coupled to the respective switch controller, the respective input ports, and the respective output ports;

wherein the CTR is divided into a plurality of contiguous periodic super cycles (SCs) each comprised of at least one time cycle (TC) each comprised of at least one time frame (TF);

wherein the super cycle is one of a single UTC second, a predefined integer number of UTC seconds, and a fraction of one UTC second;

wherein each of the switch controllers defines the coupling from each one of the respective input ports for data units received during any one of the time frames, on a respective one of the channels, for output during a predefined time frame to at least one selected one of the respective output ports on at least one selected respective one of the channels; and wherein each of the switch controllers is responsive to the CTR for configuring the optical interconnection subsystem wherein the optical interconnection subsystem is coupled to the input ports via a wavelength conversion subsystem.

2. The system as in claim 1, wherein the data units output during a first predefined time frame on a selected respective one of the channels through the respective output port of the first communications switch are forwarded through the respective output port of the second communications switch during a second predefined time frame on a selected respective one of the channels responsive to the CTR.

3. The system as in claim 1, the optical interconnection subsystem further comprising at least one of:

a plurality of star couplers, a plurality of tunable receivers, a plurality of lasers, and a plurality of wavelength division inultiplexers WDM MUXs; and wherein each of the switch controllers is responsive to the CTR for receiving data units on a predefined optical channel.

4. The system as in claim 3, the optical interconnection subsystem, further comprising:

a plurality of star couplers, a plurality of tunable receivers, a plurality of lasers, and a plurality of wavelength division multiplexers WDM MUXs;

wherein the communications links are coupled to the star couplers;

wherein the star couplers are coupled to the tunable receivers;

wherein the tunable receivers are coupled to the lasers; and wherein the lasers are coupled to the WDM MUXs.

5. The system as in claim 3, the optical interconnection subsystem further compnsing:

a plurality of star couplers;

wherein the communications links are divided into a plurality of subsets; and wherein each of the subsets of the communications links is coupled to each of the star couplers.

6. The system as in claim 5, wherein each of said subsets of the communications links is coupled to a respective star coupler coupled to a respective WDM for the output.

7. The system as in claim 3, the optical interconnection subsystem, further comprising:

a plurality of star couplers and a plurality of tunable receivers;

wherein each star coupler has a plurality of outgoing optical links; and wherein each of said outgoing optical links is connected to a selected at least one of the plurality of tunable receivers.

8. The system as in cJaixn 3, the optical interconnection subsystem, further comprising:

a plurality of lasers and a plurality of wavelength division ,nultiplcxcrs WDM MUXs;

wherein each of the WDM MXDC has a plurality of incoming optical links; and wherein each of said incoming optical links is connected to a selected at least one of the plurality of lasers.

9. The system as in claim 3, wherein each input port is further comprised of at least one star coupler.

10. The system as in claim 3, the optical interconnection subsystem, further comprising:

a plurality of star couplers; and wherein each star coupler is used by at least one input port.

11. The system as in claim 3, wherein eacb output port is further comprised of at least one WDM MUX.

12. The system as in claim 3, wherein each WDM MUX is used by at least one output port.

13. The system as in claim 3, the optical interconnection subsystem, further comprising:

a plurality of lasers; and wherein a selected at least one of the plurality of lasers is a tunable laser; and wherein each of the switch controllers is responsive to the CTR for tuning the tunable lasers for transmitting data units on a predefined optical channel.

14. The system as in claim 3, the optical interconnection subsystem, further comprising:

a plurality of tunable receivers; and wherein for each time frame within the time cycle, at least one of the plurality of tunable receivers is tuned by the switch controllers for receiving data units on a predefined optical channel.

15. The system as in claim 3, the optical interconnection subsystem, further comprising:

a plurality of tunable receivers; and wherein for each time frame within the super cycle, at least one of the plurality of tunable receivers is tuned by the switch controllers for receiving data units on a predefined optical channel.

16. The system as in claim 13, wherein for each time frame within the time cycle at least one of the plurality of tunable lasers is tuned by the switch controllers for transmitting data units on a predefined optical channel.

17. The system as in claim 13, wherein for each time frame within the super cycle at least one of the plurality of tunable lasers is tuned by the switch controllers for transmitting data units on a predefined optical channel.

18. The system as in claim 3, wherein the plurality of input ports each receives data units over at least one of a plurality of incoming channels (j); and wherein each of the incoming channels (j) has a unique time reference (UTR-j) that is phase independent of the CTR.

19. The system as in claim 18, further comprising:
a plurality of alignment subsystems;
wherein the UTR-j is divided into UTR-j super cycles (SC); wherein the UTR-j super cycles are divided into UTR-j time cycles (TC); and wherein the UTR-j time cycles are divided into UTR-j time frames (TF); and
wherein a respective one of the alignment subsystems aligns UTR-j to CTR, according to at least one of the following: UTR-j TF to CTR TF, UTR-j TC to CTR TC, UTR-j SC to CTR SC.

20. The system as in claim 19, the optical interconnection subsystem, further comprising:
a plurality of star couplers; and
wherein at least one of the plurality of alignment subsystems is located before each input of at least one of the plurality of star couplers.

21. The system as in claim 19, the optical interconnection subsystem, further comprising:
a plurality of tunable receivers and a plurality of lasers; and
wherein at least one of the plurality of alignment subsystems is located between the output of at least one of the plurality of tunable receivers and the input of at least one of the plurality of lasers.

22. The system as in claim 1, the means for obtaining the UTC, further comprising at least one of: a Global Positioning System (GPS), Global Navigation Satellite System—GLONASS, and Galileo.

23. The system as in claim 1, the optical interconnection subsystem further comprising:
a plurality of optical alignment subsystems, a plurality of star couplers, a plurality of wavelength converters (WLC), and a plurality of WDM MUXs; and
wherein each of the switch controllers is responsive to the CTR for tuning the WLCs for converting from a first predefined wavelength to a second predefined wavelength.

24. The system as in claim 23,
wherein the communications links are coupled to the optical alignment subsystems;
wherein the optical alignment subsystems are coupled to the star couplers;
wherein the star couplers are coupled to the WLCs; and
wherein the WilDs are coupled to the WDM MLCs.

25. The system as in claim 1, the optical interconnection subsystem, further comprising:
a plurality of optical alignment subsystems, a plurality of star couplers, a plurality of tunable receivers, a plurality of lasers, a plurality of optical cross connects (OXCs), and a plurality of WDM MUXs;
wherein each of the switch controllers is responsive to the CTR for tuning the tunable receivers for receiving data units on a predefined optical channel; and
wherein each of the switch controllers is responsive to the CTR for configuring the OXCs.

26. The system as in claim 25,
wherein said at least one communications link is coupled to one of the plurality of optical alignment subsystems;
wherein at least one of the plurality of optical alignment subsystems is coupled to one of the plurality of star couplers;
wherein at least one of the plurality of star couplers is coupled to one of the plurality of tunable receivers;
wherein at least one of the plurality of tunable receivers is coupled to one of the plurality of lasers;
wherein at least one of the plurality of lasers is coupled to one of the plurality of OXCs; and
wherein at least one of the plurality of OXCs is coupled to one of the plurality of WDM MUXs.

27. The system as in claim 25, wherein one of the plurality of OXCs is at least one of: an optical cross-bar, an optical banyan network, a Lithium-Niobate optical switch, an Indium Phosphate optical switch, a 2-D MEMS optical switch, a 3-D MEMS optical switch, a semiconductor optical amplifier (SOA) based optical switch, an holographic optical switch, and babble optical switch.

28. The system as in claim 1, further comprising:
a plurality of optical alignment subsystems, a plurality of star couplers, a plurality of wavelength converters (WLC), a plurality of star couplers for broadcast a plurality of first WDM MUXs, a plurality of filters, and a plurality of second WDM MUXs;
wherein each of the switch controllers is responsive to the CTR for tuning the WLCs for converting from a first predefined wavelength to a second predefined wavelength; and
wherein each of the switch controllers is responsive to the CTR for configuring the optical interconnection subsystem.

29. The system as in claim 28,
wherein said at least one communications link is coupled to one of the plurality of optical alignment subsystems;
wherein at least one of the plurality of optical alignment subsystems is coupled to one of the plurality of star couplers;
wherein at least one of the plurality of star couplers is coupled to one of the plurality of WLCs;
wherein at least one of the plurality of WLCs is coupled to one of the plurality of star couplers;
wherein at least one of the plurality of star couplers is coupled to one of the plurality of first WDM MUXs;
wherein at least one of the plurality of first WDM MUXs coupled to said at least one star couplers is coupled to one of the plurality of filters; and
wherein at least one of the plurality of filters is coupled to one of the plurality of second WDM MUXs.

30. The system as in claim 28, wherein at least one of the plurality of WLCs is further comprised of a tunable receiver and a tunable laser; and
wherein the tunable receiver and the tunable laser are controlled responsive to the CTR.

31. A switching system comprising:
a common time reference (CTR);
means for deriving the CTR from a Coordinated Universal Time (UTC) standard;
wherein the CTR is divided into a plurality of contiguous periodic super cycles;
wherein the super cycle is one of a single UTC second, a predefined integer number of UTC seconds, and a fraction of one UTC second;
a plurality of optical links, each carrying a plurality of optical channels, wherein each of the optical channels is carried on a defined first wavelength;
a plurality of wavelength conversion subsystems each coupled to a respective one of the plurality of optical links;
wherein each wavelength conversion subsystem selectively converts from the first wavelength to a second wavelength, responsive to the CTR, to provide a respective output of a second optical link carrying the second wavelength;
a plurality of wavelength division multiplexers (WDMs), each having a plurality of optical channel inputs;

an optical interconnection subsystem for coupling the second optical links to selected ones of the optical channel inputs of an associated one of the WDM's; and wherein each of the WDMs multiplexes its respective plurality of optical channel inputs to at least one respective output optical link.

32. The system as in claim 31, wherein the CTR is comprised of a plurality of time frames, wherein the wavelength conversion subsystem is further comprised of:
a Wavelength Conversion (WLC) scheduling controller comprising a wavelength mapping table defining the associative mapping between the first wavelength and the second wavelength for each of the time frames; and
a tunable wavelength conversion subsystem for converting, for each of the time frames, the first wavelength into the second wavelength, responsive to the WLC scheduling controller.

33. The system as in claim 32, wherein the tunable wavelength conversion subsystem is further comprised of:
a tunable receiver, responsive to the WLC scheduling controller, for providing an electrical signal output representative of the first wavelength; and
a laser, responsive to the electrical signal output, for transmitting as an output an optical signal of the second wavelength representative of the first wavelength.

34. The system as in claim 33, wherein the laser is a tunable laser, responsive to the WLC scheduling controller, for providing an optical output of to second wavelength.

35. The system as in claim 32, further comprising:
an alignment subsystem coupled between the tunable receiver and the laser, responsive to the CTR, for aligning a beginning of each of the time frames with the CTR.

36. The system as in claim 31, wherein the optical interconnection subsystem is a fixed set of fiber connections.

37. The system as in claim 31, wherein the optical interconnection subsystem is programmable.

38. The system as in claim 37, wherein the programmable optical interconnection subsystem is comprised of an optical cross-connect (OXC), and is responsive to the CTR.

39. The system as in claim 38, wherein each of the OXCs is at least one of: an optical cross-bar, an optical banyan network, a Lithium-Niobate optical switch, an Indium Phosphate optical switch, a 2-D MEMS optical switch, a 3-D MEMS optical switch, a semiconductor optical amplifier (SOA) based optical switch, an holographic optical switch, and bubble optical switch.

40. A switching system comprising:
a common time reference (CTR);
means for deriving the CTR from a Coordinated Universal Time (UTC) standard;
wherein the CTR is divided into a plurality of contiguous periodic super cycles;
wherein the super cycle is one of a single UTC second, a predefined integer number of UTC seconds, and a fraction of one UTC second;
a plurality of wavelength division multiplexing (WDM) optical links, each carrying a plurality of optical channels, wherein each of the optical channels is carried on a defined first wavelength;
a plurality of multiple wavelength conversion subsystems (MWLCs) each coupled to a respective one of the plurality of optical links;
wherein each of the plurality of MWLCs selectively converts from a plurality of first wavelengths to a respective plurality of second wavelengths, responsive to the CTR,
wherein each of the plurality of MWLCs provides a respective output of a second optical link carrying a plurality of the second wavelengths; and
a wavelength grating router (WGR) for coupling each of the plurality of wavelengths carried on the respective second optical link to at least one respective optical link output.

41. The system as in claim 40, wherein the CTR is comprised of a plurality of time frames, the MWLC further comprising:
a MWLC scheduling controller responsive to the CTR for defining the associative mapping between at least one of the plurality of first wavelengths with associated respective time frames and at least one of the plurality of second wavelengths with associated respective time frames; and
a tunable multiple wavelength conversion subsystem for converting, for each of the associated respective time frames, at least one of the plurality of first wavelengths into at least one of the plurality of second wavelengths responsive to the MWLC scheduling controller.

42. The system as in claim 41, the tunable multiple wavelength conversion subsystem further comprising:
a wavelength division demultiplexer (WDD), a plurality of tunable wavelength conversion subsystems (TWLCs), and a wavelength division multiplexer (WDM); and
wherein at least one of the plurality of tunable wavelength conversion subsystems converts, for each of the time frames, a first wavelength into a second wavelength responsive to the MWLC scheduling controller.

43. The system as in claim 42, the tunable wavelength conversion subsystem further comprising:
a tunable receiver, responsive to the WLC scheduling controller, for providing an electrical signal output representative of at least one of the plurality of first wavelengths; and
a laser, responsive to the electrical signal output, for transmitting as an optical signal output of at least one of the plurality of second wavelengths representative of at least one of the plurality of first wavelengths.

44. The system as in claim 43, wherein the laser is a tunable laser for providing an optical output of at least one of the plurality of second wavelengths.

45. The system as in claim 43, further comprising:
an alignment subsystem coupled between the tunable receiver and the laser, responsive to the CTR, for aligning a beginning of each of the plurality of time frames wit the CTR.

46. The system as in claim 41, wherein the tunable multiple wavelength conversion subsystem is further comprised of:
a star coupler, a plurality of tunable wavelength conversion subsystems (TWLCs), and a wavelength division multiplexer (WDM); and
wherein at least one of the plurality of tunable wavelength conversion subsystems converts, for each of the time frames, a first wavelength into a second wavelength responsive to the MWLC scheduling controller.

47. The system as in claim 46, wherein the tunable wavelength conversion subsystem is further comprised of:

a tunable receiver, responsive to the WLC scheduling controller, for providing an electrical signal representative of the first wavelength; and a laser, responsive to the electrical signal output, for transmitting an optical signal output of the second wavelength, wherein the bptical signal output of the second wavelength is representative of the first wavelength.

48. The system as in claim 47, wherein the laser is a tunable laser for providing an optical output of the second wavelength.

49. The system as in claim 47, further comprising:
an alignment subsystem coupled between the tunable receiver and the laser, responsive to the CTR, for aligning a beginning of each of the plurality of time frames with the CTR.

50. A switching method for a switching system having an input and an output, said method comprising:
coupling a first communications switch and a second communications switch with at least one communications link comprising at least one of a plurality of channels, wherein the first communications switch and the second communications switch are further comprised of a plurality of input ports and a plurality of output ports and an optical interconnection subsystem;
transmitting a plurality of data units trough said communications link to the output of the switching system;
coupling each of the plurality of input ports for receiving data units from the communications link over at least one of the channels;
coupling each of the plurality of output ports for transmitting data units to the communications link over at least one of the channels;
coupling the optical interconnection subsystem of the respective communications switches to the respective switch controller, the respective input ports, and the respective output ports;
the method further comprising:
providing a common time reference (CTR) derived from a Coordinated Universal Time (UTC) standard; dividing the CTR into a plurality of contiguous periodic super cycles (SCs) each comprised of at least one time cycle (TC) each comprised of at least one time frame (TF);
defining the coupling from each of the respective input ports for data units received during at least one of the plurality of time frames, on a respective one of the channels, for output during a predefined time frame to at least one selected one of the said respective output ports on at least one selected respective one of the plurality of channels; and
configuring the optical interconnection subsystem for coupling to the input ports via a wavelength conversion subsystem.

51. The method as in claim 50, further comprising:
outputting the data units during a first predefined time frame via a selected respective one of said at least one plurality of the channels from the respective output port of the first communications switch; and
forwarding the data units from the respective output port of the second communications switch during a second predefined time frame via a selected respective one of the channels responsive to the CTR.

52. The method as in claim 50, wherein the optical interconnection subsystem is further comprised of a plurality of tunable receivers, the method further comprising:
tuning the tunable receivers for receiving data units on a predefined optical channel responsive to the CTR.

53. The method as in claim 52, further comprising:
coupling the at least one of the plurality of communications links to one of the plurality of star couplers;
coupling at least one of the plurality of star couplers to one of the plurality of tunable receivers;
coupling at least one of the plurality of tunable receivers to one of a plurality of lasers; and
coupling at least one of the plurality of lasers to one of a plurality of Wavelength Division Multiplexers (WDM MUXs).

54. The method as in claim 53, further comprising:
dividing the communications links into a plurality of subsets; and
coupling each of the subsets of the communications links to each of the star couplers.

55. The method as in claim 53, wherein each of the plurality of star couplers has a plurality of outgoing optical links, the method further comprising:
connecting each of said outgoing optical links to a selected one of the plurality of tunable receivers.

56. The method as in claim 53, wherein at least one of the plurality of WDM MUXs has a plurality of incoming optical links, the method further comprising:
connecting each of said incoming optical links to a selected one of the plurality of lasers.

57. The method as in claim 53, further comprising:
tuning, for each time frame within the time cycle, each of the tunable receivers for receiving data units on a predefined optical channel.

58. The method as in claim 50, wherein the optical interconnection subsystem is further comprised of a plurality of optical alignment subsystems, a plurality of star couplers, a plurality of wavelength converters (WLCs), and a plurality of WDM MUXs, the method further comprising:
tuning the WLCs for converting from a first predefined wavelength to a second predefined wavelength responsive to the CTR.

59. The method as in claim 58, further comprising:
coupling at least one of the plurality of communications links to one of the plurality of optical alignment subsystems;
coupling at least one of the plurality of optical alignment subsystems to one of the plurality of star couplers;
coupling at least one of the plurality of star couplers to one of the plurality of WLCs; and
coupling at least one of the plurality of WLCs to one of the plurality of WDM MUXs.

60. The method as in claim 50, wherein the optical interconnection subsystem is further comprised of a plurality of optical alignment subsystems, a plurality of star couplers, a plurality of tunable receivers, a plurality of lasers, a plurality of optical cross connects (OXCs), and a plurality of WDM MUXs, the method further comprising:
tuning the tunable receivers for receiving data units on a predefined optical channel responsive to the CTR; and
configuring the OXCs responsive to the CTR.

61. The method as in claim 60, further comprising:
selectively coupling the plurality of communications links to the plurality of optical alignment subsystems;
selectively coupling the plurality of optical alignment subsystems to the plurality of star couplers;
selectively coupling the plurality of star couplers are coupled to the plurality of tunable receivers;

selectively coupling the plurality of tunable receivers to the plurality of lasers; selectively coupling the plurality of lasers to tbe plurality of OXCs; and selectively coupling the plurality of OXCs to the plurality of WDM MUXs.

62. The method as in claim 50, wherein the optical interconnection subsystem is further comprised of a plurality of optical alignment subsystems, a plurality of star couplers, a plurality of wavelength converters (WLCs), a plurality of star couplers for broadcast, a plurality of first WDM MUXs, a plurality of filters, and a plurality of second WDM MUXs, the method farther comprising:

tuning the WLCs for converting from a first predefined wavelength to a second predefined wavelength responsive to the CTR; and configuring the optical interconnection subsystem responsive to the CTR.

63. The method as in claim 62, selectively coupling the plurality of communications links to the plurality of optical alignment subsystems;

selectively coupling the plurality of optical alignment subsystems to the plurality of star couplets;

selectively coupling plurality of the star couplers to the plurality of WLCs;

selectively coupling the plurality of WLCs to tbe plurality of star couplers for broadcast;

selectively coupling the plurality of star couplers for broadcast to the plurality of first WDM MUXs;

selectively coupling the plurality of first WDM MUXs to the plurality of filters; and selectively coupling the plurality of filters to the plurality of second WDM WUXs.

64. The method as in claim 62, wherein each of the plurality of WLCs are further comprised of a tunable receiver and a tunable laser, the method further comprising;

controlling the tunable receiver and the tunable laser responsive to the CTR.

* * * * *